United States Patent [19]

Hoyt

[11] Patent Number: 4,920,882
[45] Date of Patent: May 1, 1990

[54] ELECTRONIC LABELER WITH PRINTHEAD AND WEB SENSOR COMBINED FOR CONCURRENT TRAVEL, AND ASSEMBLIES OF IDENTIFICATION DEVICES THEREFOR

[75] Inventor: Steven D. Hoyt, Lake Geneva, Wis.

[73] Assignee: W. H. Brady Co., Milwaukee, Wis.

[21] Appl. No.: 258,266

[22] Filed: Oct. 14, 1988

Related U.S. Application Data

[63] Continuation-in-part of Ser. No. 92,961, Sep. 3, 1987, Pat. No. 4,844,629.

[51] Int. Cl.[5] .................... B41J 15/00; B41J 29/42
[52] U.S. Cl. ............................... 400/708; 400/64
[58] Field of Search .............. 400/62, 70, 73, 61, 400/64, 582, 583.2, 583.3, 581, 708, 708.1; 101/288; 226/45, 27

[56] References Cited

U.S. PATENT DOCUMENTS

| | | | |
|---|---|---|---|
| 3,253,544 | 5/1966 | Von Hofe | 101/66 |
| 3,503,834 | 3/1970 | Schroter | 400/583.3 |
| 3,566,132 | 2/1971 | Walker | 226/45 |
| 3,567,091 | 3/1971 | Woolard | 226/45 |
| 3,949,856 | 4/1976 | Ulber et al. | 226/45 |
| 4,025,025 | 5/1977 | Bartel et al. | 226/45 |
| 4,120,245 | 10/1978 | Karp et al. | 101/288 |
| 4,255,064 | 3/1981 | Kelly | 400/708 |
| 4,264,396 | 4/1981 | Stewart | 101/93.04 |
| 4,272,204 | 9/1981 | Quinn, Jr. et al. | 400/708 |
| 4,314,757 | 2/1982 | Anderson et al. | 226/45 |
| 4,364,503 | 12/1982 | Ivary et al. | 226/45 |
| 4,386,860 | 6/1983 | Price et al. | 101/288 |
| 4,485,949 | 12/1984 | Gebhart et al. | 226/45 |
| 4,540,299 | 9/1985 | Yamada | 400/708 |
| 4,579,466 | 4/1986 | Sato et al. | 400/693 |
| 4,598,780 | 7/1986 | Iwasaki et al. | 101/288 |
| 4,655,129 | 4/1987 | Wirth et al. | 400/70 |
| 4,737,645 | 4/1988 | Lahr | 400/708 |
| 4,743,129 | 5/1988 | Keryhuel et al. | 400/708 |

FOREIGN PATENT DOCUMENTS

| | | | |
|---|---|---|---|
| 118891 | 9/1981 | Japan | 101/288 |
| 7985 | 1/1986 | Japan | 400/61 |
| 211073 | 9/1986 | Japan | 400/708 |
| 2114060 | 8/1983 | United Kingdom | 400/61 |

OTHER PUBLICATIONS

Perkins, "Paper Edge Sensor" IBM Technical Disclosure Bulletin vol. 23, No1 7a, pp. 2695-2696, 12/80.
Wipke, "Right Hand Margin . . . " IBM Technical Disclosure Bulletin vol. 20, No. 10, pp. 3396-3397, 3/78.

Primary Examiner—William Pieprz
Attorney, Agent, or Firm—Quarles & Brady

[57] ABSTRACT

An electronic labeling machine is disclosed which includes a printing mechanism with a carriage adapted for horizontal travel across assemblies of identification devices to be imprinted. A web sensor is attached to the carriage for concurrent travel therewith. In traversing horizontally across the assembly, the web sensor provides a signal to a microprocessor which indicates the presence or absence of the assembly under the current position of the sensor. The microprocessor also receives a timing signal from the printing mechanism indicative of the position of the carriage. Based on the timing signal and the signal from the web sensor, the microprocessor measures a current width of the assembly. The assembly is especially adapted for use with the invention, and includes notched portions having a width difference than the nominal assembly width, each notched portion being in a fixed relative position with respect to one of the identification devices. The microprocessor is thereby able control feeding of the assembly to register the identification devices for printing by discriminating the current measured width of the assembly between the nominal width and the width at a notch.

5 Claims, 32 Drawing Sheets

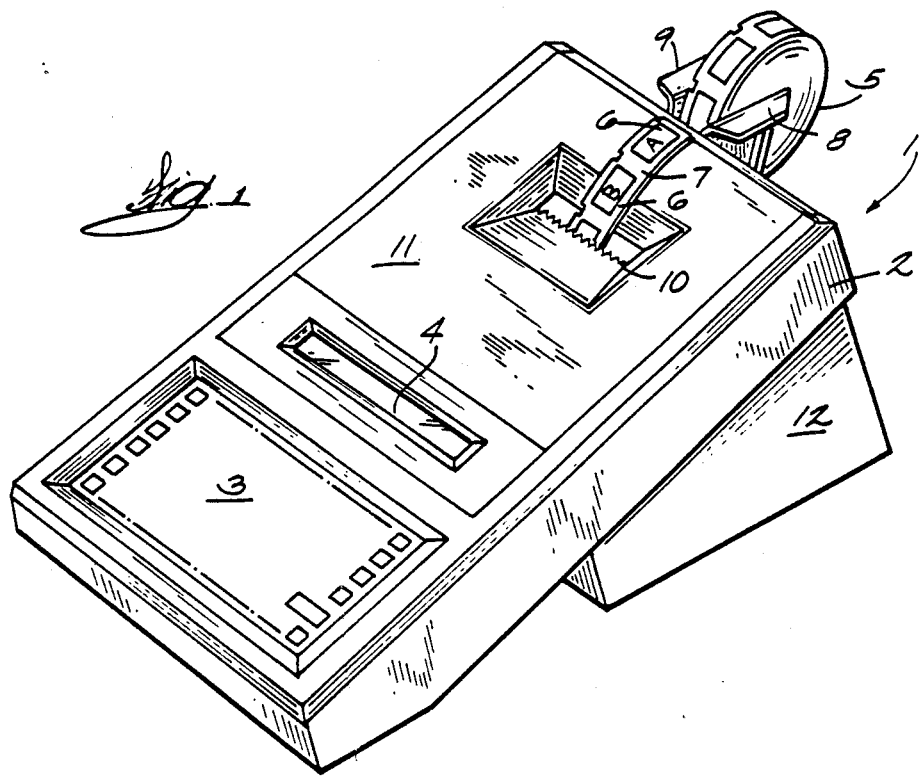
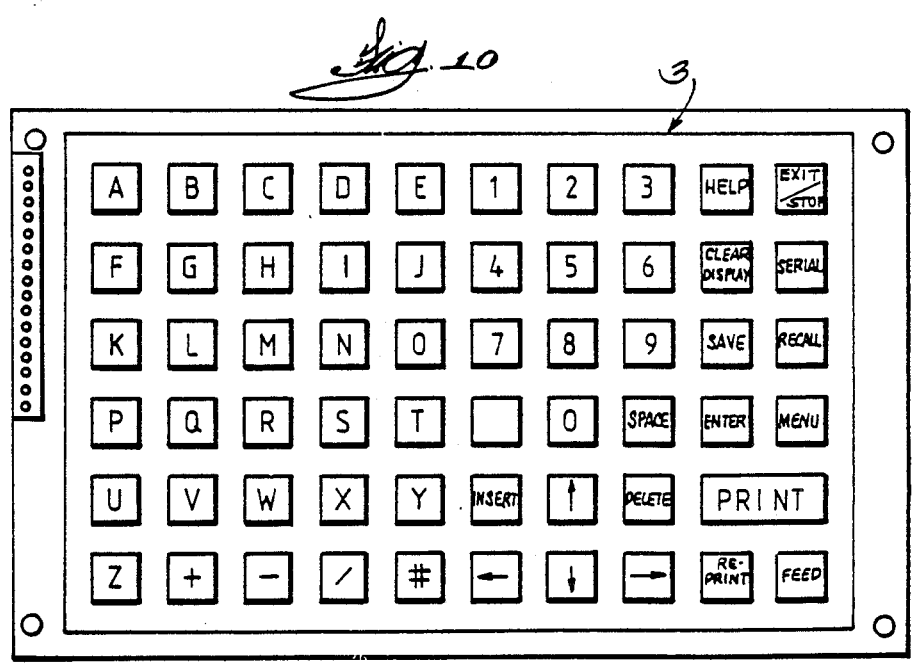

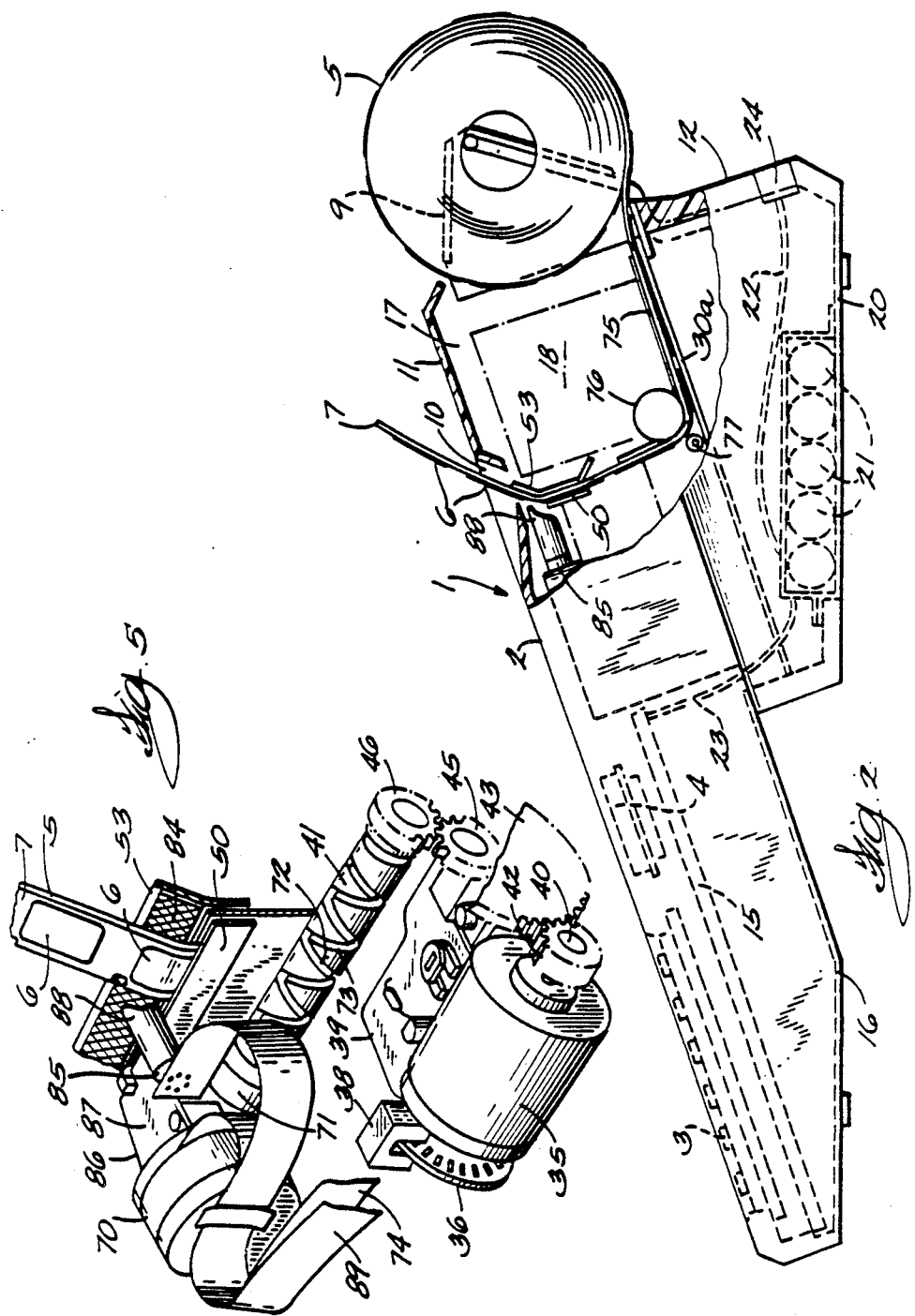

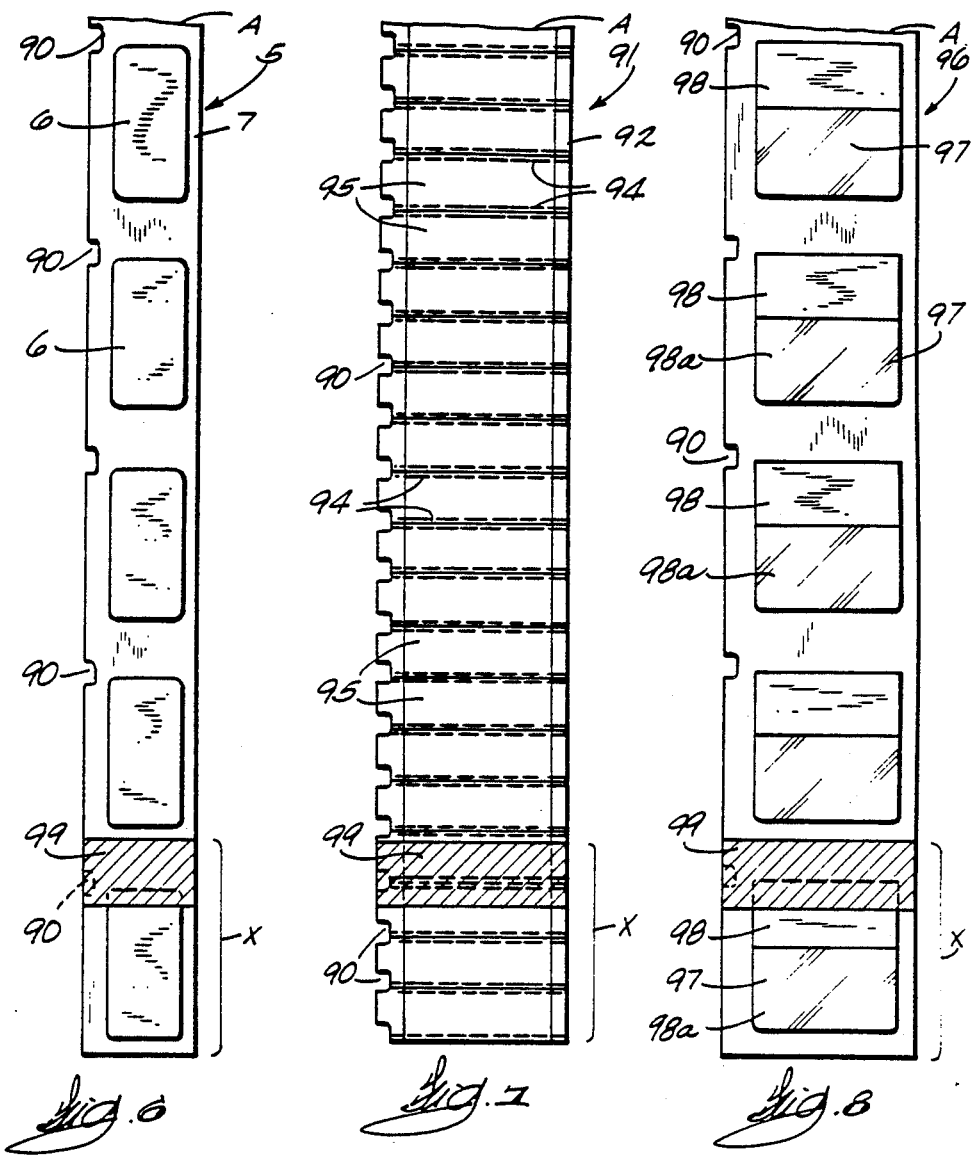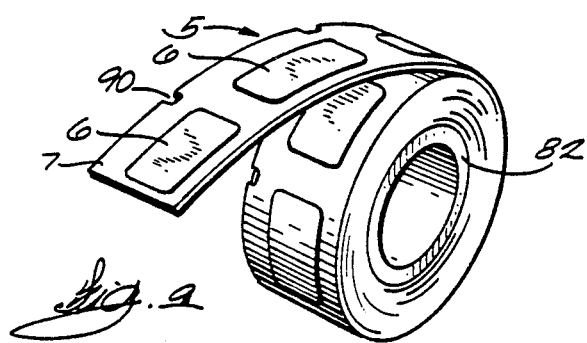

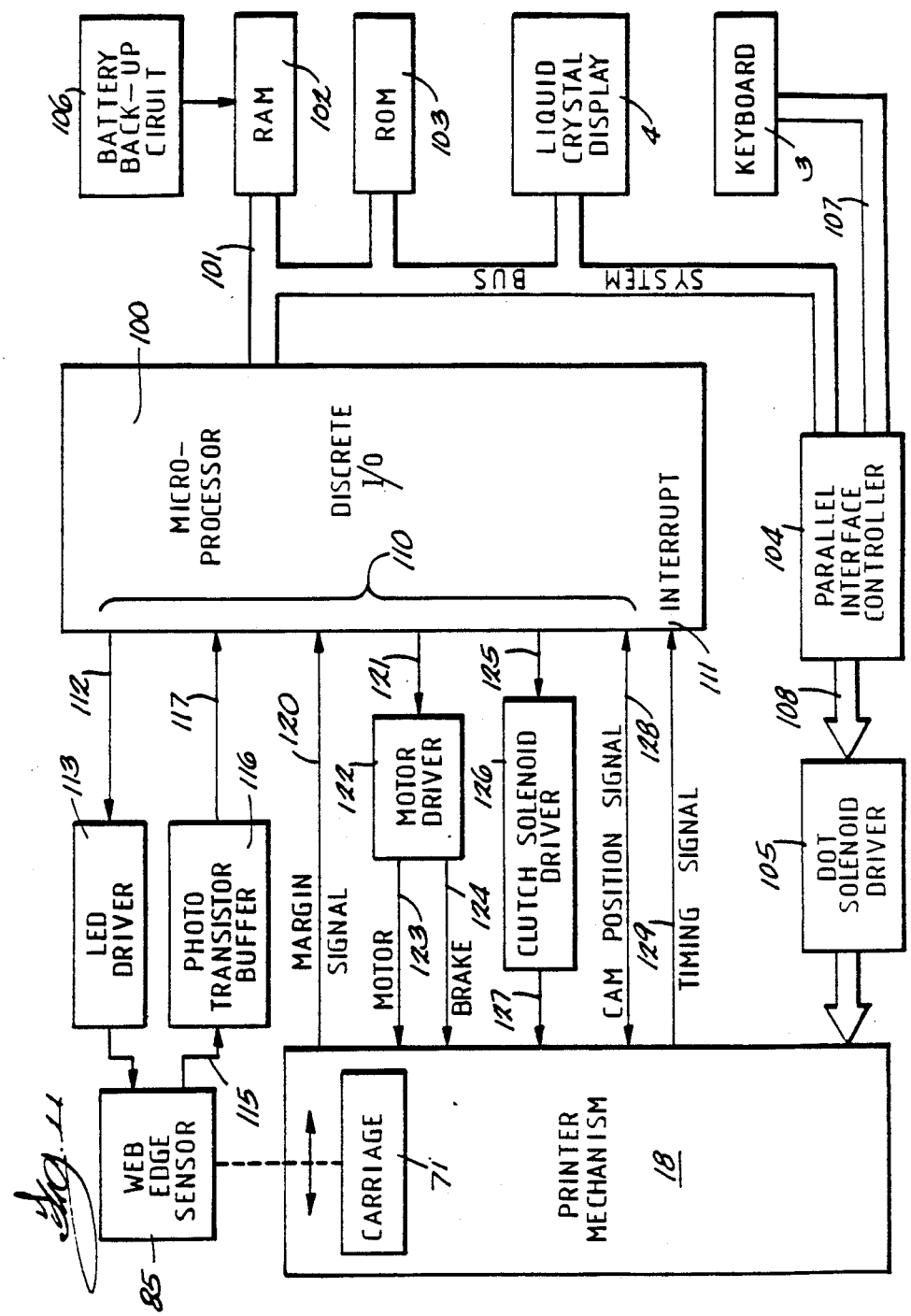

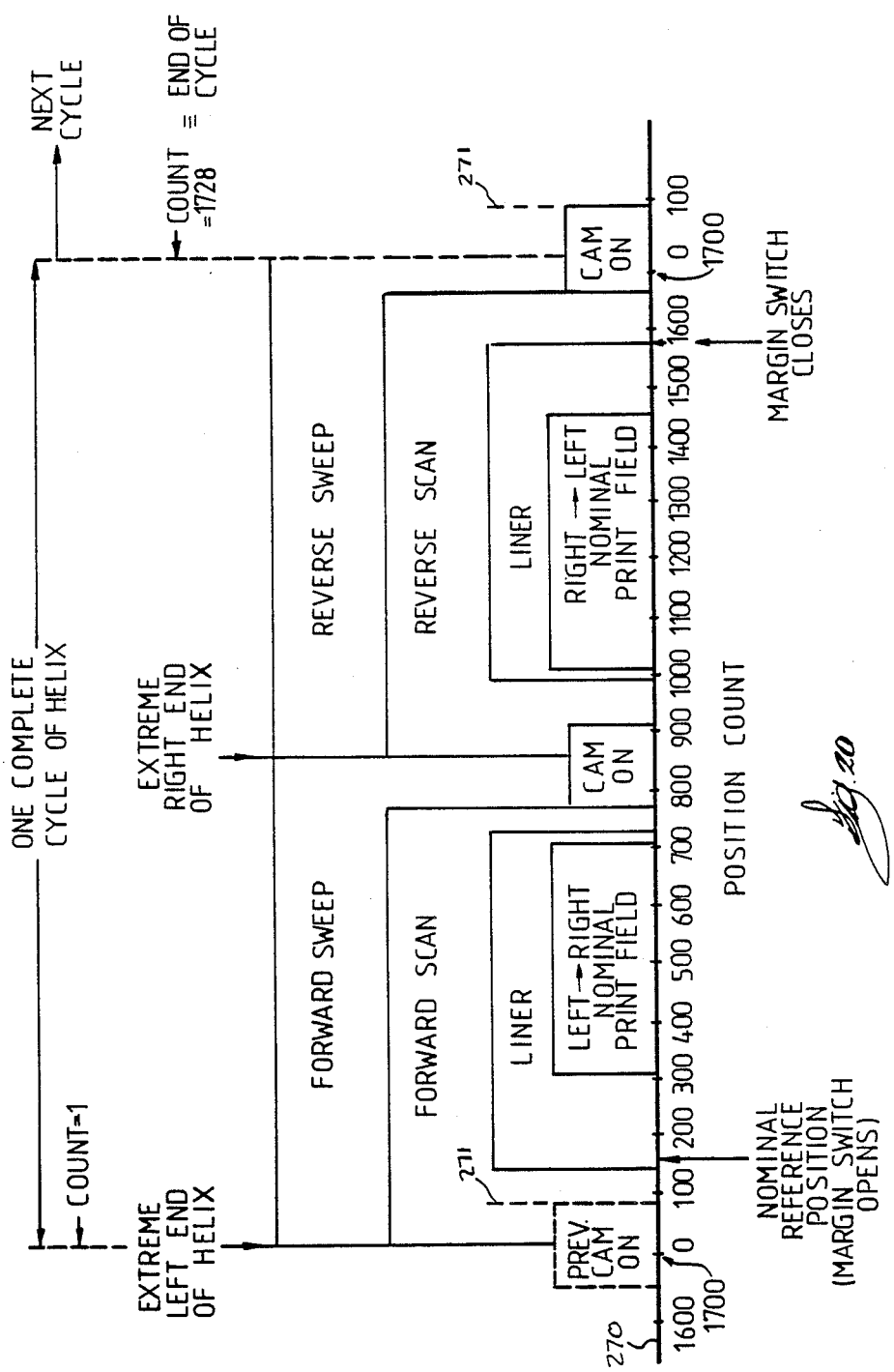

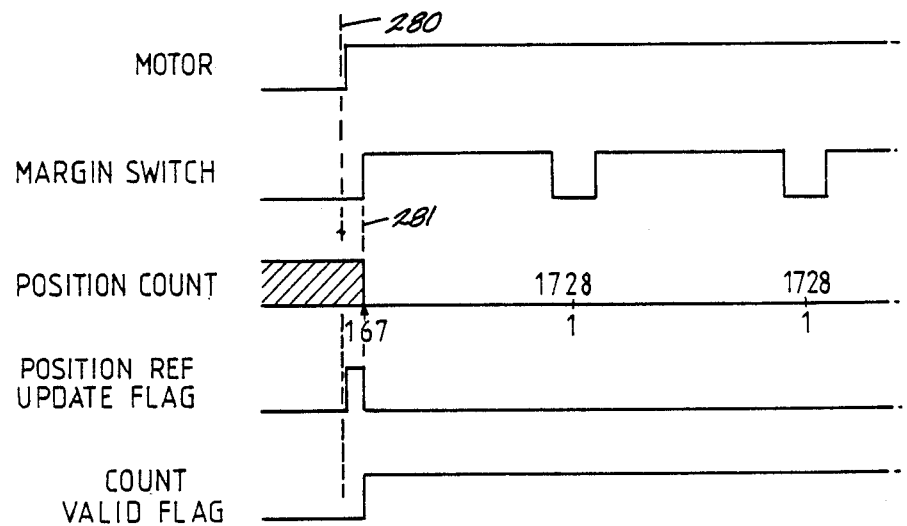
Fig. 21  ESTABLISH REFERENCE-NORMAL
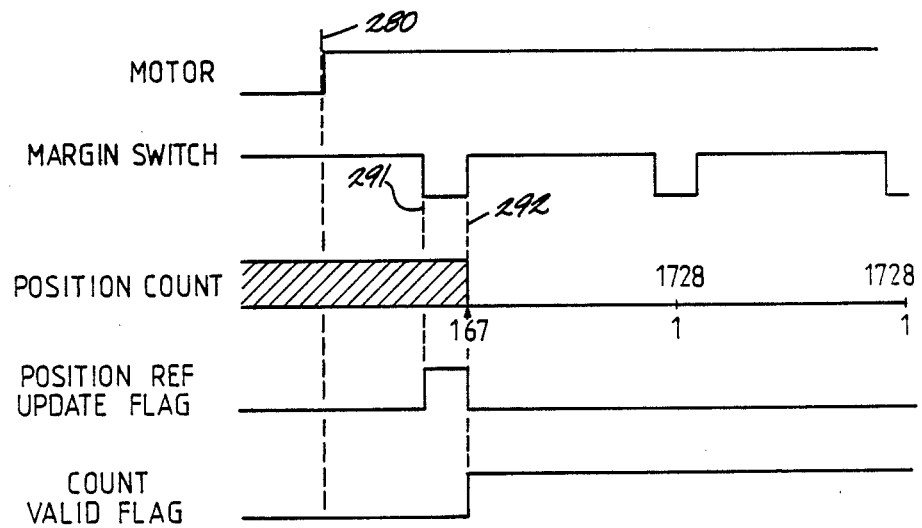
Fig. 22  ESTABLISH REFERENCE-ABNORMAL

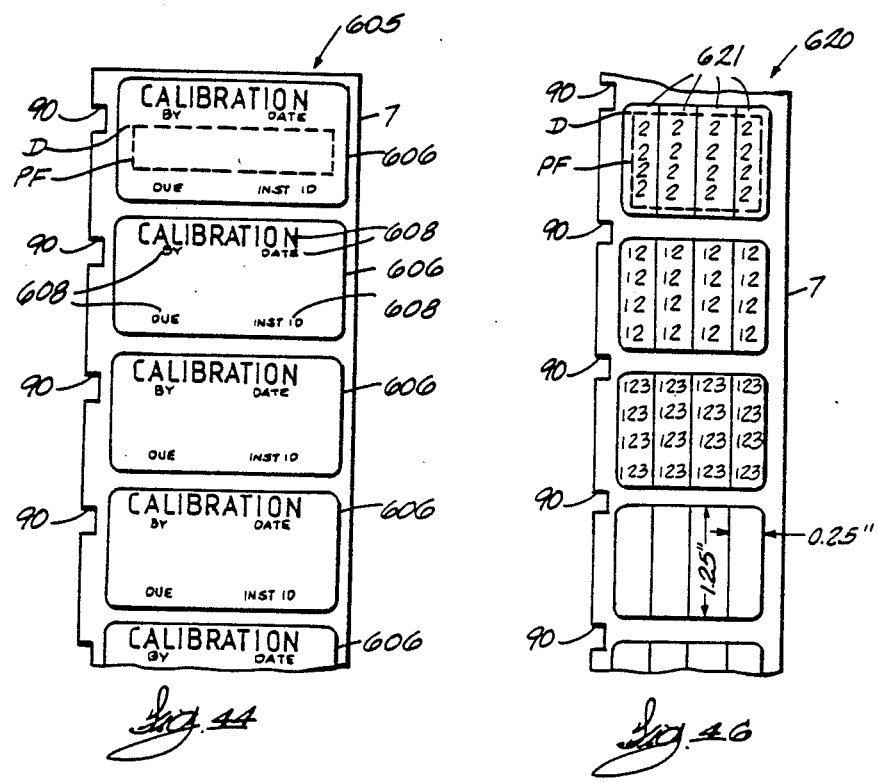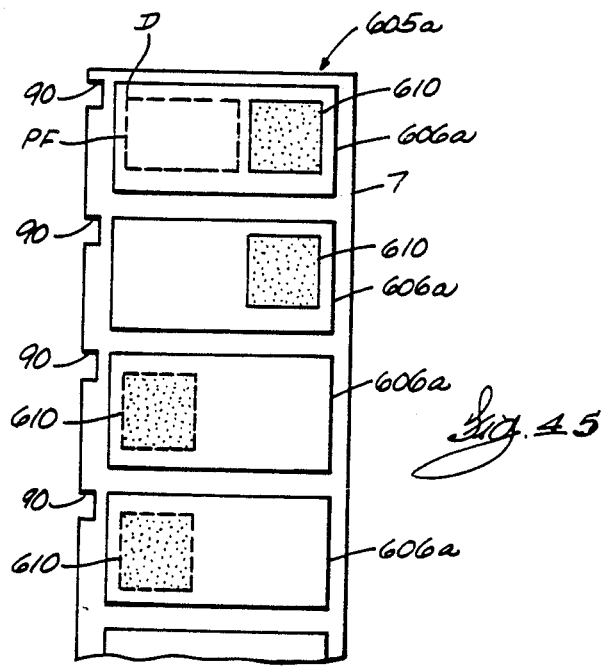

ELECTRONIC LABELER WITH PRINTHEAD AND WEB SENSOR COMBINED FOR CONCURRENT TRAVEL, AND ASSEMBLIES OF IDENTIFICATION DEVICES THEREFOR

CROSS REFERENCE

This application is a Continuation-In-Part of U.S. patent application Ser. No. 07/092,961, filed Sept. 3, 1987, now U.S. Pat. No. 4,844,629.

TECHNICAL FIELD

This invention relates to the art of microprocessor controlled apparatus for printing indicia on identification devices such as labels, wire markers, marker sleeves and the like.

BACKGROUND

There are a number of U.S. patents that disclose electronic apparatus for printing indicia on labels, some of which are restricted to hand held units and others that disclose tabletop units. The patents known to the applicants at the time of filing this application for patent are as follows. There are a large number of patents assigned to Monarch Marking Systems, Inc., all of which are restricted to hand held labeling machines: U.S. Pat. Nos. 4,264,396, Stewart; 4,407,692*, Torbeck; 4,473,426*, Goodwin et al.; 4,477,305*, Hamisch, et al; 4,479,843*, Newhard et al.; 4,488,671*, Hamisch; 4,490,206*, Makley; 4,497,682*, Hamisch; 4,498,947*, Hamisch et al; 4,511,422*, Hamisch et al.; 4,544,434*, Mistyurik; 4,556,442*, Torbeck; 4,561,926*, Hamisch et al.; 4,584,047*, Vanderpool et al.; 4,584,048*, Hamisch et al.; and 4,680,078, Vanderpool et al. Tabletop units for this general purpose, some of which are portable, are described in U.S. Pat. Nos. 4,440,248, Teraoka; 4,501,224, Shibayama; 4,630,538, Cushing; and 4,655,129, Wirth et al., assigned to the assignee of this application for patent, which relates to a marker sleeve printing apparatus developed for use with a communication terminal such as a computer. Equipment of this type that is or has been sold commercially for printing labels is represented by Monarch's Pathfinder labeler, the E-Z-Coder ® printer sold by Thomas & Betts Corporation, and the Bradywriter ® and Bradywriter II ® industrial printers sold by the assignee of this application for patent.

The electronic machines for printing labels of this type all include the same general combination of elements, a printhead, means for feeding a web of stock to be printed past the printhead, a microprocessor, a read only memory programmed with appropriate instructions, a random access memory, a keyboard with letter, number and function keys for the entry of alphanumeric information and instructions concerning the indicia to be printed, and a visual display such as an LED or LCD unit to assist the operator in using the machine. This type of equipment is preferred by many users concerned with marking electrical wires, electrical devices such as EPROM's, IC's and other components, and various types of articles with specific identifying indicia such as a serial number or code because it allows the user to generate the required printed markers at or near the job site as needed instead of utilizing preprinted marker devices.

The present invention is concerned with a machine of this general type that includes a novel arrangement of printhead and web sensor elements to facilitate accurate registration of a marker device and the printing to be applied thereto. One of the systems for accomplishing this function as shown in the prior art represented by the above patents and commercial devices involves a tractor feed system in which the machine has a feed wheel with teeth or a sprocket that engages holes, cuts or other apertures formed in the web of labels that is to be printed. This type of system for obtaining registration between labels and a printhead is disclosed in the nine patents listed above that are marked with an asterisk and employed in the Bradywriter and Bradywriter II machines. U.S. Pat. No. 4,680,078 describes what appears to be a variation of the tractor feed that utilizes a slotted timing disk and a mating web feed roller. The disk is coded with small slots for each dot line of print and large slots for the beginning of the label. The timing disk senses the position of the web feed roller, not the web to be printed, and it appears that the feed roller must be of the type that engages apertures or other cuts in the web such as with a tractor transport in order for the device to operate properly.

Other of the listed prior art discloses the use of photoelectric sensors in this type of equipment. Thus, the electronic labeler of U.S. Pat. No. 4,264,396 includes an optical sensor spaced from and located upstream of the printhead; the sensor is to detect an ink strip or other mark printed on the web and registered with each individual label. U.S. Pat. No. 4,440,248 discloses a bar code printing apparatus that also includes a photoelectric sensor spaced from and upstream of a printhead that is said to function as a label detector to control web advancement, but details of its operation are not disclosed in the patent. The system of U.S. Pat. No. 4,501,224 has a photosensor spaced from and upstream of a printhead that detects an aperture formed in the web of stock being printed and generates an output signal that is used for timing of the printing and cutting operations. The optical sensing systems disclosed in these latter patents have two features in common: the optical sensor is a stationary element and the sensor is spaced from or separate from the printhead element of the machine.

SUMMARY OF THE INVENTION

The present invention provides a microprocessor controlled electronic apparatus for printing indicia on identification devices including means for feeding an assembly including a plurality of identification devices past a printing position, a printhead arranged for transverse movement back and forth across the width of the assembly, and a web edge sensor for travel concurrently with the printhead. This feature in a device of the present invention provides for accurate positioning of individual identification devices of the assembly to thereby enable indicia to be suitably printed thereon; the provision of an apparatus with this capability is a main object of this invention. Furthermore, another advantage of the foregoing arrangement of printhead and web edge sensor is that an electronic apparatus for printing identification devices is provided that is capable of printing on several different widths of assemblies, i.e. resulting in the ability to print on different sizes of identification devices. Another main object of this invention was to provide this functionality in a microprocessor controlled apparatus for printing identification devices. Still another advantage of this construction is that it enables accurate positioning of printing on individual identification devices even though utilizing a feed mechanism for the assembly of the feed roller type which is subject to inherent inaccuracies in advancement of the assembly through the apparatus; this eliminates the need to employ a tractor feed system, which is another objective of this invention. In another aspect, the present invention provides assemblies of identification devices such as labels, wire markers, marker sleeves, etc., that are of a particular configuration especially adapted for use in an apparatus of the foregoing type. This feature is provided in assemblies of identification devices that have a first preselected width and means defining a second preselected width that is less than the first preselected width, thereby providing two different widths for detection by the web edge sensor associated with the printhead. Another feature of the assemblies of identification devices of the present invention is means defining an end of the assembly that is detectable by the web edge sensor to thereupon terminate printing operations. Another principal object of this invention was to provide assemblies of identification devices having these structural features. A still further main object of the invention was to develop microprocessor controlled electronic apparatus for printing identification devices that can utilize off-the-shelf mechanisms to thereby reduce its costs and enhance its utility.

DESCRIPTION OF THE DRAWINGS

The foregoing and other objects and advantages of the invention will appear from the following description. In the description, reference is made to the accompanying drawings which form a part hereof, and in which there are shown by way of illustration two preferred embodiments of the invention. The embodiments do not necessarily represent the full scope of the invention, however, and reference is made therefore to the claims herein for interpreting the scope of the invention. In the drawings:

FIG. 1 is a perspective view of a machine for applying legends to identification devices constructed in accordance with the present invention;

FIG. 2 is a side view, with portions broken away, of the machine of FIG. 1;

FIG. 5 is a perspective view of a portion of the printer mechanism of FIG. 3;

FIG. 6 is a top view of an assembly of identification labels of a type useful with the machine of FIG. 1;

FIG. 7 is a top view of a second assembly of sleeve marker identification devices of a type useful with the machine of FIG. 1;

FIG. 8 is a top view of a third assembly of label identification devices of a type suitable for use with the machine of FIG. 1;

FIG. 9 is a view of the assembly of FIG. 6 in roll form;

FIG. 10 is a plan view showing details of the keyboard element of the machine of FIG. 1;

FIG. 11 is an electrical schematic diagram of the machine of FIG. 1;

FIG. 20 is a diagram illustrating the manner in which a reference position is established in a second embodiment of a machine for applying legends to identification devices constructed in accordance with the present invention;

FIG. 21 is a timing diagram illustrating the normal case for establishment of a reference position in the second embodiment;

FIG. 22 is a timing diagram illustrating an abnormal case for establishing the reference position in the second embodiment;

FIG. 23 is a flow chart of the printer-on utility routine;

FIG. 24 is a flow chart of the "timing signal interrupt" routine;

FIG. 25 is a flow chart of the "check for reference established" routine;

FIG. 26 is a flow chart of the "forward scan check" routine;

FIG. 27 is a flow chart of the "left line feed terminate check" routine;

FIG. 28 is a flow chart of the "forward print initialize check" routine;

FIG. 29 is a flow chart of the "end of forward print field check" routine;

FIG. 30 is a flow chart of the "right line feed initialize check" routine;

FIG. 31 is a flow chart of the "direction change" routine;

FIG. 32 is a flow chart of the "right line feed terminate check" routine;

FIG. 33 is a flow chart of the "reverse print initialize check" routine;

FIG. 34 is a flow chart of the "end of reverse print field check" routine;

FIG. 35 is a flow chart of the "left line feed initialize check" routine;

FIG. 36 is a flow chart of the "end of cycle check" routine;

FIG. 37 depicts an assembly of identification devices to illustrate the scan procedure of the second embodiment;

FIG. 38 is a flow chart of the "scan" routine;

FIG. 39 is a flow chart of the "process scan data" routine;

FIG. 40 is a flow chart of the "edge data check" routine;

FIG. 41 is a flow chart of the "index check" routine;

FIG. 42 is a flow chart of the "skew check" routine;

FIG. 43 is a flow chart of the "indexing error" routine;

FIG. 44 is a top view of an assembly of preprinted identification labels of a type which can be further printed with a machine of the second embodiment;

FIG. 45 is a top view of a second assembly of preprinted identification labels of a type which can be further printed with a machine of the second embodiment; and FIG. 46 is a top view of an assembly of wire markers that can be printed with a machine of the second embodiment.

DESCRIPTION OF PREFERRED EMBODIMENTS

Figure 3:
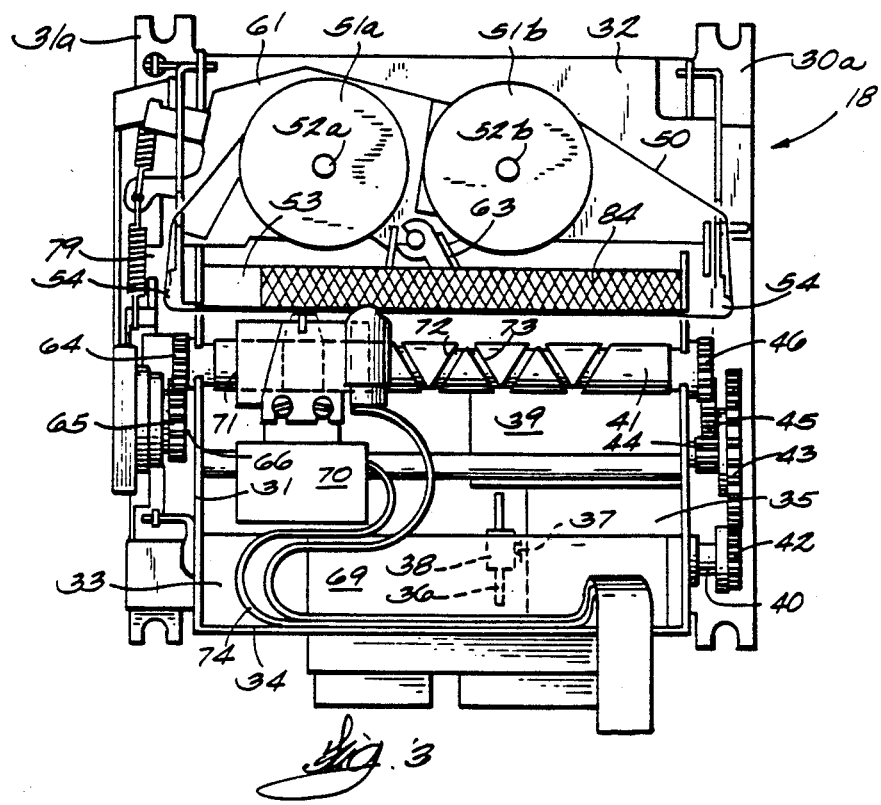
FIG. 3 is a top view of a printer apparatus incorporated in the machine of FIG. 1.

The following describes presently-developed embodiments of a machine according to the present invention that are particularly adapted to print legends on identification devices, such as wire markers, labels, marker sleeves, etc. Parts (a) and (b) are a general description of the illustrative machines, part (c) is a detailed description of the novel printhead and sensor assembly of the present invention, part (d) describes novel identification devices suitable for use with the machine, parts (e)–(g) provide a detailed description of the electronics of first embodiment of a machine and its operation, and part (h) provides a detailed description of a second embodiment and its operation.

(a) General Machine Description, FIGS. 1 and 2

FIG. 1 illustrates a machine 1 of the present invention comprising a wedge-shaped housing 2, such as of molded plastic, that supports the several elements of the machine. A keyboard 3 is at the front of the machine 1 and a liquid crystal display 4 is positioned just above the keyboard, both of these elements being secured to appropriate supporting structure within the housing. An assembly 5 of identification devices, shown in FIG. 1 as a series of adhesive labels 6 supported on a liner or carrier web 7, in the form of a roll is supported between brackets 8 and 9 at the rear of the machine. Brackets 8 and 9 are attached to housing 2 so as to be adjustable (see FIG. 2) so that the machine 1 can accommodate assemblies of identification devices of various selected widths. The end of the carrier web 7 is led between the feed rollers of a printer mechanism (described in part (b) below) and exits through a slot 10 defined in a cover 11 arranged over a printer compartment of the housing The cover 11 can be detached from the housing to allow access to the printer mechanism.

The exemplary machine 1 is illustrated in the form of a portable tabletop apparatus, and the housing 2 includes an integral rear base portion 12 that is designed to present the top surface of the machine at an angle to the user to facilitate comfortable operation of the machine. It is pointed out, however, that a machine according to the present invention can be made in the form of a handheld unit as well as a tabletop unit such as described herein.

The sectional view of FIG. 2 shows further details of the machine 1. A printed circuit board (PCB) 15 is supported inside the housing 2 along the front portion thereof underneath the keyboard 3 and display 4. PCB 15 supports most of the electronic components of the machine and is described below in greater detail. A front bottom cover 16 is attached to the housing to close off part of the bottom of the housing. The rear section of housing 2 defines a printer compartment 17 in which a printing mechanism 18 is supported. The printing mechanism 18 is illustrated in dashed line in FIG. 2 and will be described in further detail below. Rear bottom cover 20 encloses the bottom of rear base portion 12 of the housing and supports a set of rechargeable batteries 21 that are held in place on the rear bottom cover by means of battery clamp 22. The batteries are connected to PCB 15 through appropriate wiring illustrated schematically by wiring 23. An external transformer, not shown, can be plugged into an AC power source and connected to plug 24 retained in the rear wall of the housing to recharge the batteries 21 in the usual manner, and the machine 1 can be operated from either battery power or AC power as desired by the user. An on-off switch, not shown, is located on the left side of machine 1.

Figure 4:
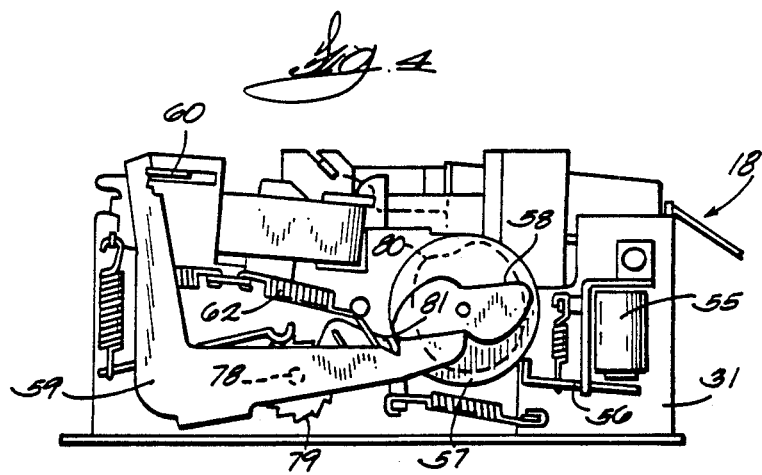
FIG. 4 is a left-hand side view of the printer mechanism of FIG. 3.

(b) General Description of Printer Mechanism, FIGS. 3 and 4

An advantage of a machine of the present invention is that commercially available printer mechanisms can be incorporated in the machine without special modifications except as described in part (c) below. The specific printing mechanism 18 illustrated with machine 1 is a model DP834-12 dot matrix printer mechanism available from Star Micronics Inc. A general description of the printing mechanism is presented in this part in order to fully understand the operation of a machine of the present invention, although the specific printer structure now described is not a part of the present invention. A more detailed description of the structure and operation of the printing mechanism 18 will be found in Star Micronics' Technical Manual for the DP834-12 and its Specification and Operation Manual, both of which are incorporated herein by reference.

(i) Drive System. Referring first to FIG. 3, the printer mechanism 18 includes spaced side plates 30 and 31 connected by end plates 32, 33 and 34 that form a frame to support its various elements. A motor 35 is attached to the frame and carriers a slotted timing disk 36 on a shaft 37 extending from one end of the motor. The timing disk is rotated through a photosensor 38 also supported at an end of the motor 35. (See also FIG. 5). Slotted disk 36 and photosensor 38, together with a waveform shaping circuit, not shown, form a timing detector that generates timing signal pulses which are employed to control printer operation. An electronic governor 39 controls the speed of motor 35 so that characters will be printed at constant speed regardless of torque load, source voltage and ambient temperature. A motor output shaft 40 extends from an opposite end of of motor 35 and is connected through a reduction gear train to drive shaft 41 rotatably supported between plates 30 and 31. The reduction gear train includes a motor pinion 42 supported on shaft 40 and meshed with primary gear 43 that includes an integral pinion 44 which is meshed with secondary gear 45 that is meshed with drive shaft gear 46.

(ii) Ribbon Feed. An inked ribbon 50 is carried in a pair of spools 51 supported on spool shafts 52 extending from end plate 32. The inked ribbon 50 extends from one spool 51a, across platen 53 to the other spool 51b, the ribbon passing through appropriate slots in the side plates 30 and 31 and across ribbon guides 54 secured thereto. The side view of FIG. 4 best illustrates the ribbon feed mechanism. When clutch solenoid 55 is energized, clutch trigger 56 is disengaged from a control cam 57. Rotation of control cam 57 results in rotation of ribbon feed cam 58 formed as an integral element on the outer surface of cam 57 to thereby actuate cam lever 59. Movement of cam lever 59 is transferred to ribbon feed lever 60 that includes ribbon feed pawl 61 (FIG. 3) that engages a ratchet, not shown, secured to spool shaft 52a. Return movement of cam lever 59 is effectuated by cam lever spring 62. This feed mechanism provides for incremental movement of the ribbon 50, and a detection lever 63 rotates in accordance with the diameter of the ribbon on spool 51b so that when the ribbon feed pawl 61 engages along the bottom of the ribbon detection lever 63 and the pawl is thereby engaged with another ratched, not shown, attached to spool shaft 52b. For operation of the ribbon feed, the control cam 57 is rotated by pinion 64 on the end of drive shaft 41 that meshes with gear 65 pinned to shaft 66 on which the control cam is supported, and gear 65 drives the control cam through a clutch, not shown.

(iii) Printhead. The printer mechanism 18, returning now to FIG. 3, includes a printhead 70 supported on a carriage 71 that is driven right and left transversely across the assembly 5 of identification devices by drive shaft 41. As shown in FIG. 3, drive shaft 41 includes double helical grooves 72 and 73 and forms a cylindrical cam for transporting the carriage 71. The printhead 70 in the exemplary embodiment is a dot matrix printer consisting of nine needle wires and nine solenoids. When a solenoid is energized, a needle wire is driven towards the platen 53 to print a single dot on an identification device present between the inked ribbon 50 and the platen 53 upon appropriate instruction by the program described in detail below. When a print solenoid is de-energized, a needle wire is returned to its original position. A cable 74 connects the printhead 70 to a terminal PC board 69 mounted on end plate 33.

(iv) Web Feed. Referring first to FIG. 2, the assembly 5 of identification devices is led around a chute 75 of the printer mechanism 18 and between a feed roller 76 and idler roller 77 supported from the chute 75, following which the assembly 5 is led between inked ribbon 50 and platen 53 to thereafter exit through slot 10 of cover 11. The feed roller 76, returning now to FIG. 4, is carried on a shaft 78 rotatably supported between side plates 30 and 31, and the shaft carries a feed ratchet 79 on an end outside of side plate 31. When clutch solenoid 55 is energized and clutch trigger 56 disengaged from control cam 57, the control cam starts to rotate. The inner surface of control cam 57 includes an integral single lobe web feed cam 80 which operates web feed lever 81 that engages the teeth of feed ratchet 79. When lever 81 is operated, the feed ratchet is moved one tooth position to thereby rotate feed roller 76 and advance the assembly 5 a selected distance; in the illustrative embodiment, the assembly 5 is feed ⅛th of an inch (3.17 mm) upon each incremental rotation of feed roller. The web feed system also includes a detector for ascertaining the position of the web feed cam comprising a permanent magnet mounted on web feed lever 81 and a Hall effect IC, both not shown, to enable accurate detection of the web feed cam.

The printer mechanism 18 as described in this part (b) is an example of a specific type of printer mechanism that can be employed with a machine of the present invention. The structural details of the printer 18 as described so far do not form a part of the present invention except that the printer mechanism as defined in the claims is to include a printhead 70 that is transported transversely back and forth across the assembly of identification devices that are to be printed. Any form of printhead 70 other than the dot matrix printer described above can be used in the machine, as long as it has this transverse movement feature. However, the arrangement of printhead 70 and web edge sensor 85 as described next in part (c) is a novel feature of a machine of this invention.

(c) Web Edge Sensor, FIG. 5

Turning now to FIG. 5, a feature of a machine of this invention is a web edge detector 85 mounted directly on the printhead 70 so that the sensor will be transported back and forth transversely of assembly 5 concurrently with transport of the printhead 70 back and forth across the web 7. The sensor 85 is attached to the printhead 70 by means of a bracket 86 that includes a flat panel 87 attached to the printhead 70 and a cylindrical element 88 in which the sensor 85 is supported.

In the specific illustrative embodiment of the machine 1, the web edge sensor 85 is a Hewlett Packard HBCS-1100 high resolution optical reflective sensor. The sensor system includes a source of optical flux, transmission path and a receiving detector. Specifically, the sensor element 85 includes an LED photo emitter that directs light through a lens towards the platen 53 of the printer mechanism, a photo-transistor detector and a signal amplifier that interfaces with an appropriate logic circuit. This provides a sensor that converts physical parameters into electrical signals that can be directly interfaced to a digital system. Full details of the structure and operation of the HBCS-1100 sensor are set forth in Hewlett Packard Application Note 1008 entitled Optical Sensing for the HEDS-1000, which is incorporated herein by reference. Briefly, the sensor measures the ratio between the optical flux directed through the lens of the device towards the platen 53 and the incident flux reflected from the platen 53 or a web 7 as detected by the receiving detector of the unit.

Thus, the web edge sensor 85 when mounted to the printhead 70 scans horizontally with each pass of the printhead 70. The retro-reflective optical sensor is to be positioned to focus on the surface of the assembly 5. The surface of the platen 53 facing the sensor is covered with a dark non-reflective surface to prevent or greatly reduce reflection of light when the printhead is outside the edge boundaries of the assembly 5; this is indicated by panel 84 in FIG. 5 which may comprise a non-reflective coating or black film adhered to the platen 53. The sensor 85 is connected through cable 89 to appropriate circuitry carried on PC board 15 as discussed in greater detail below.

The feature of mounting a web edge sensor 85 directly on a transversely moving printhead provides accurate registration of an individual identification device with the printhead so that the user-selected indicia to be printed can be accurately positioned on an individual identification device.

(d) Identification Device Assemblies, FIGS. 6-9

Three specific forms of new identification device assemblies are illustrated in these drawings that have been particularly developed for use with machine 1.

FIG. 6 is a detailed view of the assembly 5 of identification devices previously illustrated. Individual die-cut labels 6 are spaced from one another along a carrier web 7. Each label 6 includes a layer of pressure sensitive adhesive on its lower surface that is releasably adhered to the carrier web 7. A notch 90 is die cut along an edge of carrier web 7, there being one notch 90 positioned at a preselected distance from an end of a label 6. Also, the exposed outer surface of each label 6 is to be printable, and an appropriate printable coating may be applied to the material of each label if it is not suitably receptive to printing ink.

FIG. 7 illustrates an assembly 91 of marker sleeves suitable for use with a machine 1. The assembly 91 is formed of a base web 92 and a top web 93 that are seamed together along transverse seams 94 to form individual tubular marker sleeves 95, each separable from the assembly along a perforated line formed in each seam 94. The base web 92 is wider than top web 93, and notches 90 are defined along a marginal portion of base web 92. There is one notch 90 located at a preselected position relative to each marker sleeve 95. Each marker sleeve 95 is to have a printable surface.

FIG. 8 illustrates an assembly 96 of marker labels 97 each consisting of a printable first portion 98 and transparent second portion 98a. The labels 96 each have a layer of adhesive on their bottom surface and each label is releasably adhered to a carrier web 7 along the layer of pressure sensitive adhesive. Notches 90 are defined along an edge of the carrier web 7, there being one notch 90 located a preselected distance from an end of a label 96. After indicia are printed on printable first portion 98 of a label 97, the transparent second portion 99 can be wrapped around and laminated over printed first portion 98 along the adhesive layer so as to cover and protect the printed indicia; identification devices such as labels 96 can be used, for example, to identify tubular shaped articles such as wires and other products.

As illustrated in FIGS. 6, 7 and 8, the assemblies 5, 91 and 96 each include a non-reflective end of roll marker 99. A marker 99 covers a notch 90 in each assembly and extends across the width of an assembly from one longitudinal side edge to the other. The height of a marker 99 in the longitudinal direction of an assembly should be at least equal to that of a notch 90. Further, the leading edge of a marker 99 is spaced a distance X from the end of an assembly that is greater than the distance between the feed means of an apparatus and the web edge sensor. With specific reference to machine 1, the distance X in the illustrated assemblies is equal to ⅛ inch (3.17 mm) (the line feed) plus the distance between the nip of feed roller 76 and idler roller 77 and the center line of web edge sensor 85. A marker 99 can comprise a black or otherwise dark colored nonreflective coating applied to an assembly such as by printing or, in the illustrative embodiments, a strip of black or other dark colored pressure sensitive adhesive tape applied at the specified position. The purpose of an end of roll marker 99 is described in detail below in part (g) of this description.

Assemblies of identification devices suitable for use with the apparatus 1 are supplied to the user as an assembly including a plurality of individual identification devices arranged end-to-end in the form of a web and wound into roll form. This is illustrated in FIG. 9 shown schematically as assembly 5 wound onto a core 82.

Assemblies of identification devices such as assemblies 5, 91, and 96 can be of any material appropriate for use as labels or marker sleeves, such as paper, plastic film or synthetic nonwoven web. Various plastic films can be used, including, for example, polyolefin films such as polyethylene and polypropylene, polyester films, vinyl films, fluorocarbon films, etc. Most plastic films will require a printable coating so as to receive and retain the indicia applied by the printhead of the apparatus 1; many types of printable coatings are known in the art, and usually include an absorbent filler such as silica or calcium carbonate dispersed in a polymeric binder such as a polyester or vinyl polymer. Labels 6 of assembly 5 and labels 97 of assembly 96 each include a layer of pressure sensitive adhesive along their bottom surface. Many types of suitable pressure sensitive adhesives are known in the art, and typically comprise a synthetic or natural rubber, or a synthetic polymer or copolymer, compounded with compatible resin tackifiers such as terpene resins, ester gum, and the like, and dispersed in an organic solvent or water. The labels 6 and 97 are also to be "releasably adhered" to a carrier web 7, which means that the labels can be readily removed from the carrier web without the pressure sensitive adhesive delaminating from the labels and transferring to the carrier web. If a carrier web is not of a material that is inherently releasable with respect to the pressure sensitive adhesive, the carrier web can be coated or impregnated with a suitable release material; silicone coatings, carbamate coatings, and other types of other release coatings are well known in the art. Carrier webs, labels and webs for the sleeve markers of assembly 91 will be thin flexible materials usually in the range of about 0.001 inch to 0.020 inch (about 0.025 to 0.25 mm) thick being preferable as suitable for most uses and for reasons of economy.

(e) Keyboard and Machine Functions, FIG. 10

Referring to FIG. 10, the keyboard 3 includes keys representing the letters of the alphabet A–Z, the numerals 0–9, a set of special symbols ("<space>", "<period>", "+", "−", and "#"), and a set of function keys. Using these keys, an operator can program the content of the legends to be printed on the identification devices in a manner similar to that used in prior machines of this kind. The programming operation is performed on a menu driven basis, also well known in the art. The operator is provided instructions in the form of menus, or prompts, on the display 4 and responds by pressing the appropriate key(s) to choose a menu selection. The general capabilities afforded by the machine 1 are as follows.

There are two basic modes in which identification devices may be printed, Single Label Mode and Batch Mode. As the names imply, the Single Label Mode prints a single legend, while the Batch Mode may print a group of predefined legends. In the Batch Mode, each "group" of legends is referred to as a "LIST". Up to 26 LISTs of legends may be defined, each LIST consisting of one or more legends. The only limit on the length of a LIST is that the combined length of all 26 LISTs is limited to the memory space available, 6656 characters in this exemplary embodiment.

In either the Single Label or Batch modes, two additional options are available, serialization and multiple copies. Serialization means to produce a sequence of identifying devices, as in serial numbers, etc., in which one or more fields of the legend, e.g. characters or numerals, is incremented on successive devices. The other option, multiple copies, allows the print cycle to be repeated a specified number of times. Both of these features have been known and used in prior devices.

A brief description of the operation of the function keys can now be given.

(i) EDITING KEYS

An INSERT key is included to change the editing mode between an insertion mode, where entered characters are inserted at a cursor position, and a replacement mode, where entered characters replace the character at the cursor position. A DELETE key allows characters at the cursor position to be deleted. A set of cursor movement keys (<up arrow> ↑, <down arrow> ↓, <left arrow> ←, and <right arrow> →) allow the cursor to be positioned within the display 4. These cursor movement keys are used for editing the text in legends and for making menu selections.

(ii) PRINTING CONTROL KEYS

A PRINT key causes the machine 1 to begin printing in the selected mode, e.g. Single or Batch. An EXIT/STOP Key causes the printing to be terminated, while a REPRINT key causes the PRINT sequence just previously executed to be repeated. A FEED key causes the feed mechanism to advance the web either after printing or when loading a new web into the machine 1.

While a feed function has generally been known and used in prior machines, the feed function employed in the machine 1 described herein is an important aspect of this invention. The feeding operation of this invention is described in detail below, but basically provides the capability to both check the size of an assembly of identification devices installed in the machine 1 and to accurately register each identification device 6, 95 or 97 into a position to be printed.

(iii). MENU SELECTION KEYS

A MENU key is provided which, when pressed, causes the Main Menu to be entered on the display. The cursor can then be moved to the desired menu selection with the cursor movement keys described above. Alternatively, the first letter of the desired menu item can be entered using the alphabetic keys. In either event, pressing an ENTER key then causes the selected menu item to be invoked, for example, a command to change mode (Single vs. Batch).

(iv). LIST MODIFICATION KEYS

In the Batch mode, new LISTs are created by entering a legend and then pressing the SAVE key to add the legend to the LIST. A RECALL key is provided to select a previously entered LIST for printing or editing.

(v). SERIALIZATION

A SERIAL key, when pressed, causes a normal character or numeral at the current cursor position to become a "serialized" field, as described above. If the character or numeral at the current cursor position is already "serialized", then pressing the SERIAL key causes it to toggle back to a normal (e.g. non-serialized) field.

(vi). MISCELLANEOUS

A CLEAR DISPLAY key is provided as a convenient means of deleting an entire legend in the display 4. A HELP key causes a message to be displayed on the display 4 directing the operator to the appropriate documentation for the current mode of operation.

(f) Electrical Hardware Description, FIG. 11

Referring now to FIG. 11, the operation of the machine 1 is based on a microprocessor 100. The particular microprocessor now preferred is a type 80C31 manufactured by Intel Corp. The microprocessor interfaces through a system bus 101 to a random access memory (RAM) 102, a read only memory (ROM) 103, the display 4, and a parallel interface controller 104. The microprocessor 100 and the peripheral circuits listed above are all of the Complementary/Symmetry Metal Oxide Semiconductor (CMOS) variety in order to minimize power drain on the batteries 21.

The RAM 102 is an 8K by 8 bit CMOS device available from multiple sources, and is powered through a battery back-up circuit 106 to maintain a minimum voltage required for retention of data. The battery back-up circuit 106 normally channels power from either the batteries 21 or an external AC source (not shown) to the RAM 102, but also contains a high energy lithium cell (not shown) for keeping a minimum memory retention voltage on the RAM 102 if the batteries 21 are exhausted and an AC source is not connected. The RAM 102 is therefore essentially nonvolatile, so that legends, LISTs of legends, and other control variables stored therein are retained indefinitely.

The ROM 103 is a 32K by 8 bit CMOS device available from multiple sources, and is used to store the operating programs for the microprocessor 100. Many of the functions performed by these programs are to implement the features common to prior label printing systems as described briefly above. As these features are well known by those skilled in the art, a detailed description of the programs implementing them is not provided herein. However, certain new operating programs are used to implement this invention, and the function of these programs is described in detail below.

The display 4 is a type HD44780 manufactured Hitachi Co., and includes an integral controller (not shown) for accepting characters and command information from the system bus 101 in well known fashion. The display medium is of the liquid crystal type, again to minimize battery drain, and contains an area of two character lines by twenty characters per line.

The parallel interface controller 104 is a type 82C55 manufactured by Intel Corp., and provides three banks of Input/Output (I/O) lines with eight I/O lines per bank. The parallel interface controller interfaces to the system bus 101 in well known fashion to allow the microprocessor 100 to configure and address all I/O lines.

Two banks of I/O lines 107 connect to the keyboard 3. The keyboard 3 is composed of a standard switch matrix which is scanned using the I/O lines 107 in well known fashion.

The third bank of I/O lines 108 from the parallel interface controller 104 is connected to a set of dot solenoid drivers 105. The dot solenoid drivers 105 are individual transistor amplifiers for providing drive currents to the individual dot solenoids in the printhead 70 of the printer mechanism 18. Printing may thereby be performed by instantaneously energizing the dot solenoids in an appropriate sequence as the printhead 70 scans across the assembly of markers 5. This printing process is well known in the art.

The microprocessor 100 also interfaces to the printer mechanism 18 via a set of discrete I/O lines 110 and an interrupt input 111. As described above, the web edge sensor 85 is mounted on the carriage 71 and moves horizontally therewith across the platen 53.

The web edge sensor 85 contains an LED emitter and a photo-transistor detector to detect the amount of light reflected from the surface directly in front of the sensor 85. One output line 112 of discrete I/O 110 is applied through an LED driver circuit 113 to supply power to the LED emitter. To conserve battery power, the LED emitter may be energized only when needed.

The photo-transistor produces an output signal 115 which is applied through a buffer amplifier 116 to an input line 117 of discrete I/O 110. The microprocessor 100 can thereby determine the presence of the web 7 by reading the photo-transistor output 117.

The use of a moving web edge sensor 85 is an important aspect of this invention. As will be described in detail below, the microprocessor 100 maintains the current position of the carriage 71 as it moves horizontally across the platen 53. By sensing the photo-transistor output 117, the microprocessor 100 is able to determine the points during the horizontal travel where an assembly 5, 91 or 96 begins and ends, e.g. measure the width of an assembly across the horizontal line just scanned.

The measurement of the width of the assembly provides two important pieces of information. First, the machine 1 is capable of printing on assemblies of various widths. The width of the assembly that is supposed to be loaded is based upon information entered by the operator through the keyboard 3. This operation is referred to herein as "configuring" the machine 1 for the width specified by the operator entry.

The configured width is used by the microprocessor 100 to determine the maximum number of characters per line in the legend and the position of the legend, for centering purposes, on the identification device to be printed. If the width of the assembly actually loaded, as measured by the moving web edge sensor 85, is different than the width configured by the operator, an error is generated and printing is terminated. This prevents waste that may otherwise occur by inadvertently printing on the wrong size identification devices.

Second, the width measurement is used to register an assembly of identification devices vertically so that printing always begins at the top of an identification device 6, 95 or 97. This is accomplished by allowing the assembly to advance vertically as long as the measurement of the horizontal width is within a predetermined tolerance range of the nominal web width configured by the operator. The reduced horizontal width at a notch 90 is then detected and vertical advancement terminated.

Still referring to FIG. 11, a reed switch (not shown) is mounted on the printer mechanism 18 near the extreme left margin of travel of the carriage 71. The carriage 71 includes a magnet (not shown) mounted such that when the carriage is at the extreme left margin of travel, the reed switch closes to indicate that the carriage is indeed at the left margin. The output of the reed switch is connected as a MARGIN signal to an input line 120 of discrete I/O 110. The microprocessor 100 can thereby determine the precise position of the carriage 71 by detecting a change in the MARGIN signal 120.

Output line 121 from discrete I/O 110 connects to a motor driver circuit 122. The motor driver circuit 122 converts the ON/OFF state represented on line 121 into two separate drive signals, MOTOR 123 and BRAKE 124. MOTOR signal 123 supplies power to the motor 35, and is activated when line 121 is "ON". When line 121 is "OFF", MOTOR signal 123 is deactivated and BRAKE signal 124 is activated. The BRAKE signal 124, when activated, places a short circuit across the input of the motor 35, causing the motor 35, and the carriage 71 driven thereby, to stop quickly instead of continuing to glide past the desired stopping point.

Output line 125 from discrete I/O 110 connects to a clutch solenoid driver circuit 126. The output 127 of clutch solenoid driver circuit 126 supplies current, when activated, to energize the clutch solenoid 55. As described above, a sensor (not shown) detects the position of the web feed cam and produces a CAM POSITION signal 128. The CAM POSITION signal 128 is connected as an input to discrete I/O 110 and indicates if the single lobed web feed cam 80 is in a position to cause web feed when the clutch solenoid 55 is next engaged.

Detector 38 positioned over the slotted timing disk 36 on the motor 35 produces a string of periodic timing pulses whenever the motor 35 is running. The output of the sensor 38 is connected as a TIMING signal 129 to the interrupt input 11 of microprocessor 100.

Since the carriage 71 is mechanically linked to the motor 35, the TIMING signal 129 is also related to the relative position of the carriage 71. In other words, each pulse on the TIMING signal 129 corresponds to a certain amount of movement of the carriage along the helices 72 and 73.

The basic mechanism for tracking the position of the carriage 71 is as follows. The MARGIN signal 120 serves as a reference indicating that the carriage is at the left margin. When the carriage 71 encounters the left margin, e.g. the MARGIN signal 120 first becomes true, a predetermined number of pulses on the TIMING signal 129 will be generated as the carriage 71 moves out to the right margin in a forward direction and back to the left margin again in a reverse direction.

While traveling in either the forward or reverse direction, the position of the carriage 71 is maintained in the software, described below, by counting the number of pulses which occur on the TIMING signal 129. The result is a HEAD POSITION count which is the basic measure of head position. The HEAD POSITION count is initialized to a value of "1" each time the MARGIN signal 120 is activated. The HEAD POSITION count is then incremented for each pulse of the TIMING signal 129 in both the forward and reverse directions.

The HEAD POSITION count therefore indicates the position of the carriage 71 throughout a forward-/reverse cycle, with lower numbers corresponding to positions during forward motion, mid-range numbers corresponding to the turning point at the right margin, and higher numbers corresponding to positions during reverse motion.

In the linear range of the helices 72 and 73, each increment of the HEAD POSITION count is equal to a fixed increment of distance determined by the number of slots on the timing disk 36, the ratios of the gearing used, and the pitch of the helices 72 and 73. In this exemplary embodiment, each increment of the HEAD POSITION count corresponds to 0.0035 inches (0.09 mm) of travel of carriage 71.

(g) Software Description, FIGS. 12-19

The following description pertains to those portions of the software which implement the functions unique to this invention. Software which implements functions known and used in prior machines is understood to be included in the machine 1, although not described herein.

The following description refers specifically to assembly 5 comprising adhesive labels 6 on carrier web 7, as previously described, for clarity of description. It will be understood, however, that the same procedures are employed with assemblies 91 and 96 described above.

One important function of the software peculiar to this invention is to advance the web 7 to a position where one of the labels 6 is in registration for printing. That function is referred to herein as "indexing", and can be performed in two different ways.

First, indexing can be performed upon completion of printing the text lines on a label 6. In that case, the indexing operation advances the web 7 from wherever the printing of the prior label left off to the beginning, or registration point, of the next label. If another label is to be printed immediately after printing the prior label, the printing can commence without delay, as the indexing operation insures that the next label is properly aligned and registered for printing.

The second type of indexing can then be used to verify that the web 7 is still correctly positioned for printing. This function is useful, for example, when the machine 1 stops after printing one or more labels 6. In that case, the web 7 is left at the registration point by the first type of indexing operation described above after the last label was printed. However, the web 7 may be moved out of alignment while the machine 1 is stopped, for example, by the operator manipulating the web 7 to remove the label 6.

The second type of indexing can then be used to verify correct positioning of the web 7. If the positioning is correct, the web 7 is not advanced. Otherwise, the web 7 is advanced as in the first type of indexing operation to position the next label 6 at a registration point for printing.

Figure 12:
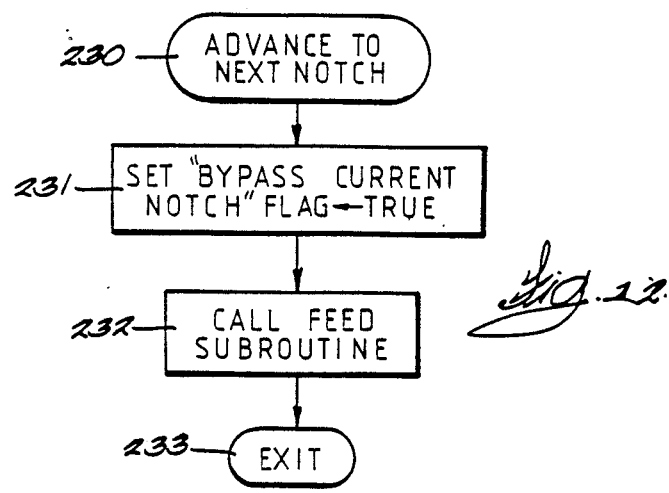
FIG. 12 is a flow chart of the ADVANCE TO NEXT NOTCH subroutine which executes on the microprocessor depicted in FIG. 11.
Figure 13:
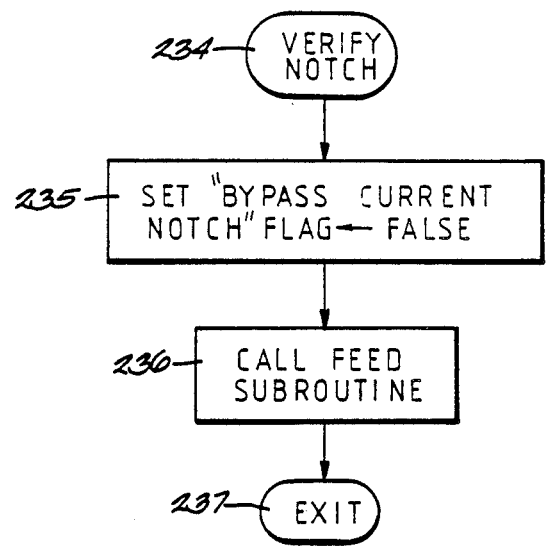
FIG. 13 is a flow chart of the VERIFY NOTCH subroutine which executes on the microprocessor depicted in FIG. 11.

Referring to FIGS. 12 and 13, the two types of indexing described above are implemented, respectively, as an ADVANCE TO NEXT NOTCH subroutine 230 and a VERIFY NOTCH subroutine 234. These subroutines 230 and 234 may be called by printing routines such as, for example, those known in the prior art, to invoke the respective indexing operations of this invention.

The ADVANCE TO NEXT NOTCH and VERIFY NOTCH subroutines 230 and 234 operate similarly. The only difference between them is the setting of a BYPASS CURRENT NOTCH flag. If the BYPASS CURRENT NOTCH flag is set TRUE, as in block 231 of the ADVANCE TO NEXT NOTCH subroutine, then the web 7 is advanced to the next label 6 even if a label 6 is currently at the registration point.

Alternatively, if the BYPASS CURRENT NOTCH flag is set FALSE, as in block 235 of the VERIFY NOTCH subroutine, then a measurement is first made to determine if a label is currently positioned at the registration point. If so, then the web 7 is not advanced. Otherwise, the web is advanced until a label 6 is correctly positioned at the registration point ready for printing.

After setting the BYPASS CURRENT NOTCH flag appropriately, both the ADVANCE TO NEXT NOTCH subroutine 230 and the VERIFY NOTCH subroutine 234 call a FEED subroutine at blocks 232 and 236, respectively, to instigate the indexing operation. The FEED subroutine returns when the indexing operation is complete. The ADVANCE TO NEXT NOTCH subroutine exits at 233 and the VERIFY NOTCH subroutine exits at 237.

Figure 14:
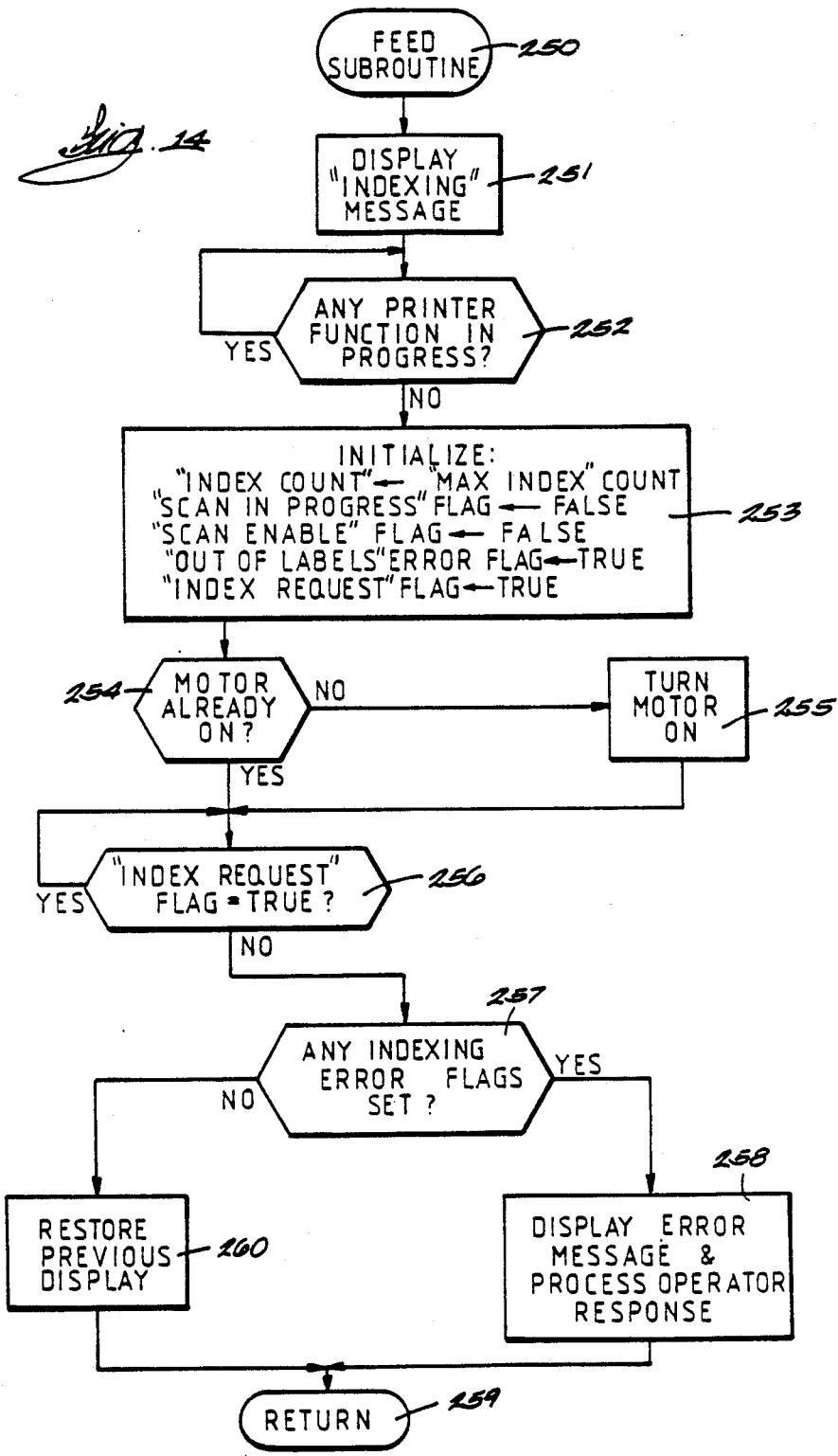
FIG. 14 is a flow chart of the FEED subroutine which is called by the routines depicted in FIGS. 12 and 13.

Referring to FIG. 14, the FEED subroutine enters at 250 and proceeds to block 251. In block 251, a message is displayed on the display 4 to indicate that the machine 1 is in the indexing mode. From block 251, processing proceeds to decision block 252.

At decision block 252, a wait loop is performed to insure that no printer functions, e.g. printing or line feeding, are currently in progress. When all outstanding printer functions have been completed, processing continues at block 253.

In block 253, a set of parameters are initialized to begin the indexing process. The parameters to be initialized include an INDEX count, SCAN IN PROGRESS and SCAN ENABLE flags, an OUT OF LABELS error flag, and an INDEX REQUEST FLAG. The INDEX REQUEST flag is used for communication with interrupt driven routines described below to indicate that an indexing operation is in progress. The function of the remainder of these parameters is described in detail below in the sections pertinent to their use.

After performing the initializations in block 253, processing continues at decision block 254. In decision block 254, a test is made to determine if the motor 35 is already running. If it is not, then a branch is taken to block 255 where the motor 35 is energized. Processing then continues at decision block 256 either after turning the motor on in block 255 or if the motor 35 was already on in decision block 254.

In decision block 256, a test is made to determine if the INDEX REQUEST flag is still true. The control of the index processing is carried out by the TIMING SIGNAL INTERRUPT routine, described in detail below, which responds to interrupts from the TIMING signal 129. The INDEX REQUEST flag is initialized to TRUE in block 253. When the indexing process is completed by the TIMING SIGNAL INTERRUPT routine, the INDEX REQUEST flag is set FALSE.

At decision block 256, a wait loop is performed, continually testing the INDEX REQUEST flag. When the INDEX REQUEST flag is changed to FALSE upon completion of the indexing operation, a branch is taken to decision block 257.

In decision block 257, a test is made to determine if any of a number of indexing error flags have been set. The exact types of indexing error flags implemented by this invention are described in detail below. The indexing error flags are set by the interrupt driven routines to indicate errors detected during the indexing operation.

If any of the indexing error flags are found set at decision block 257, control transfers to block 258 where an appropriate error message is displayed on the display 4, instructing the operator to take corrective action. The operator may then respond with one or more of the function keys described above. From block 258, the FEED subroutine returns at 259.

If at decision block 257, no indexing error flags are set, then the indexing operation has been completed successfully. Control then transfers to block 260, where the text that was displayed prior to the "indexing" message is restored to the display 4. The FEED subroutine then returns at 259.

As mentioned above, the INDEX REQUEST flag is monitored in the TIMING SIGNAL INTERRUPT routine to determine when an indexing operation is to be performed. The TIMING SIGNAL INTERRUPT routine, in conjunction with other routines which it invokes, then carries out the actual process of indexing, clearing the INDEX REQUEST flag when done.

Figure 15:
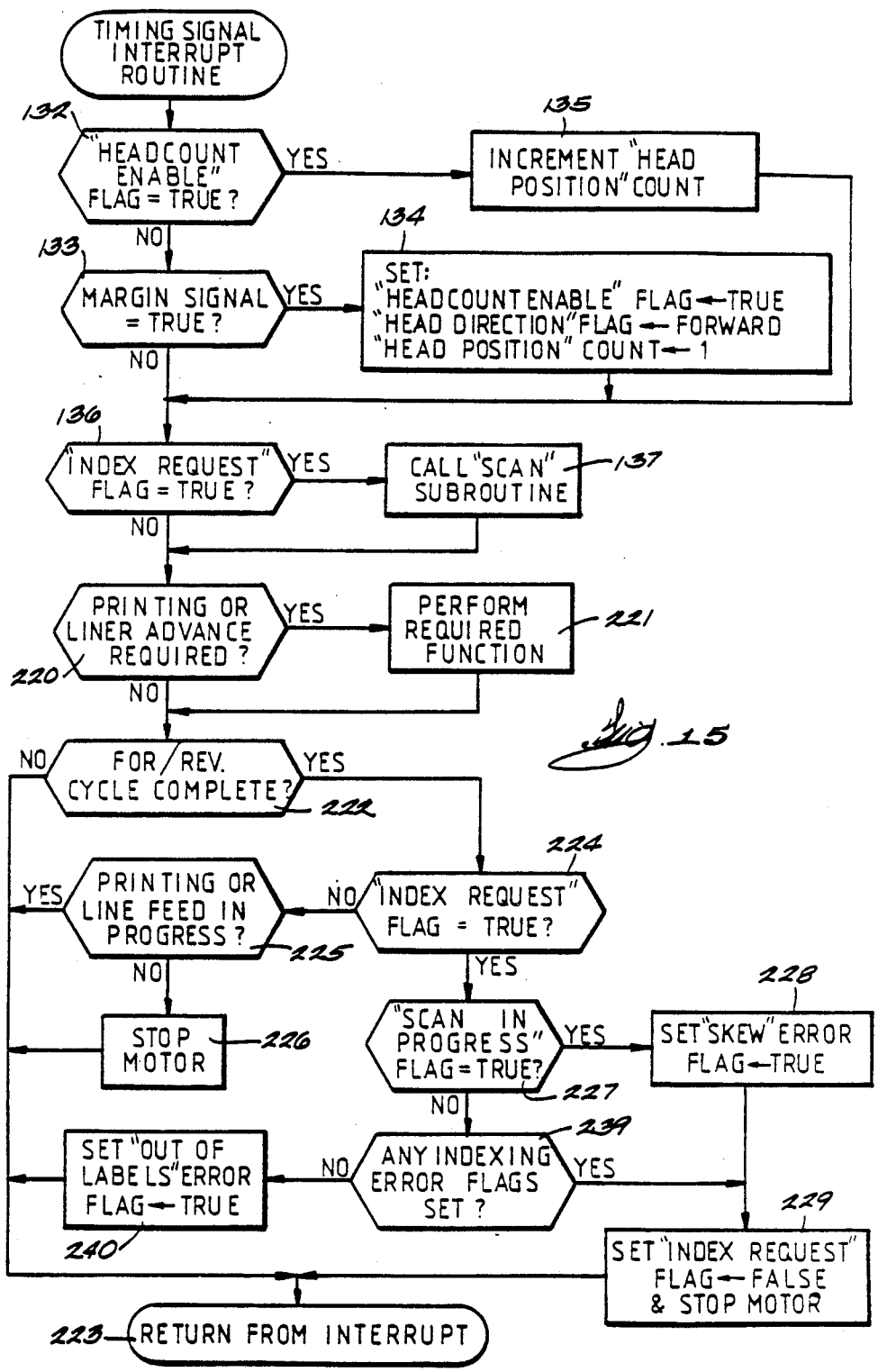
FIG. 15 is a flow chart of the TIMING SIGNAL INTERRUPT routine which executes on the microprocessor depicted in FIG. 11.

Referring to FIG. 15, the TIMING SIGNAL INTERRUPT service routine is entered at 130. From entry point 130 processing proceeds to block 132 where a HEAD COUNT ENABLE flag is tested. The HEAD COUNT ENABLE flag is used to indicate that the HEAD POSITION count has been initialized by detecting a MARGIN signal 120 at the left margin. Using this procedure, the HEAD POSITION count is always initialized at the same, precise reference position indicated by the activation of the margin signal 120.

If the HEAD COUNT ENABLE flag is not true, then the left margin has not yet been detected. In that case, processing proceeds to decision block 133 where the MARGIN signal 120 is tested to see if it has now become true. If so, processing proceeds to block 134 where the HEAD COUNT ENABLE flag is set true, a HEAD DIRECTION flag is set to "FORWARD" and the HEAD POSITION count is initialized to a value of "1".

If at decision block 132 the HEAD POSITION count had previously been initialized, the HEAD COUNT ENABLE flag will be true, and a branch to process block 135 is taken. In process block 135, the HEAD POSITION count is incremented.

After processing the HEAD POSITION count in blocks 132-135, a common exit is taken to decision block 136. In decision block 136 the INDEX REQUEST flag is examined. If at decision block 136, the INDEX REQUEST flag is true, a call is made to the SCAN subroutine 137. The SCAN subroutine 137 is a principle part of this invention which performs the actual width measurement of the web 7, checks the width of the web 7 against the configured size of the web 7, and controls indexing of the web to the beginning of the next label 6.

Figure 16:
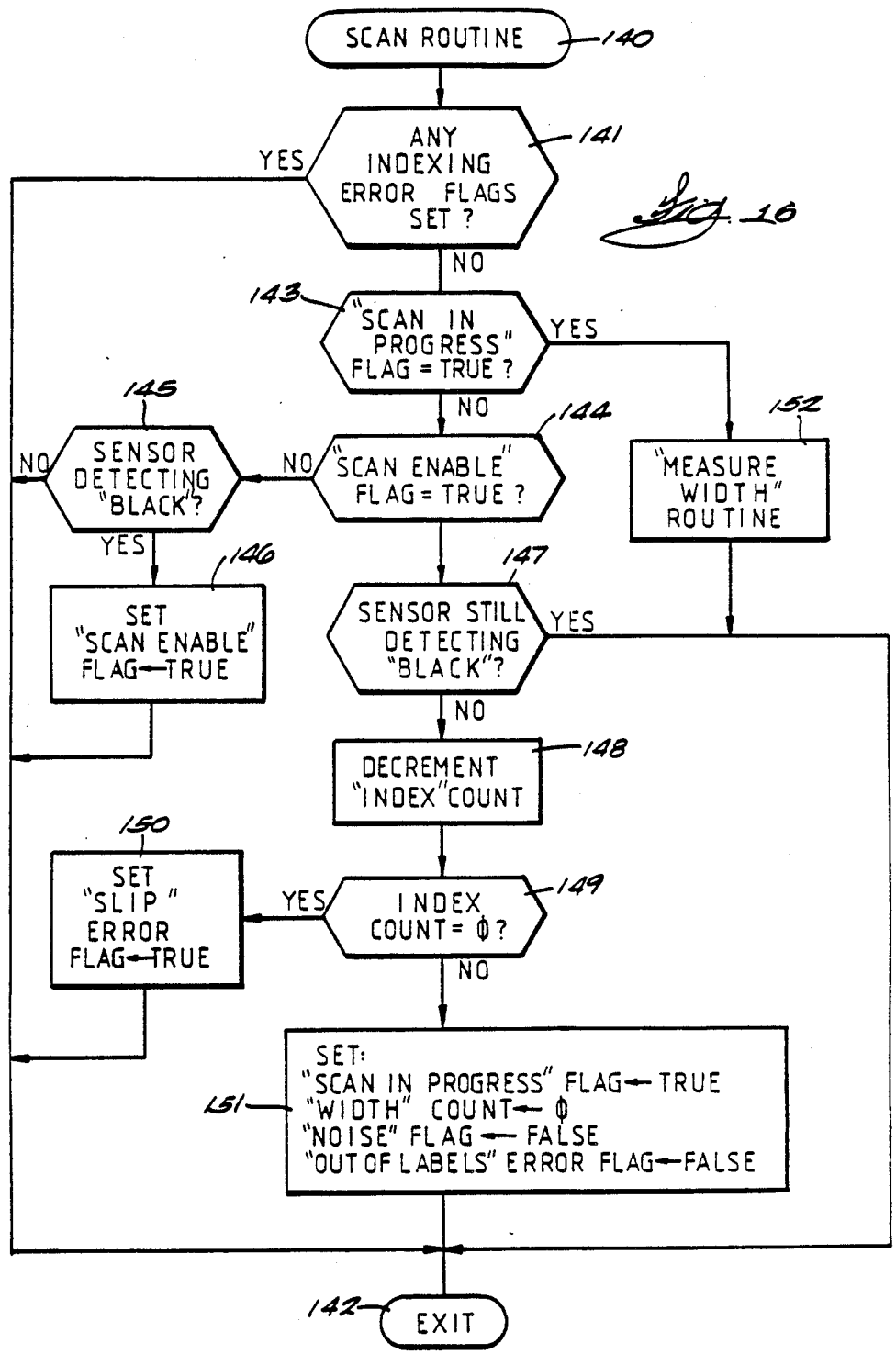
FIG. 16 is a flow chart of the SCAN subroutine which is called by the routine depicted in FIG. 15.

Referring now to FIG. 16, processing of the SCAN subroutine begins at block 140 and proceeds to decision block 141. At decision block 141 a test is made to determine if any of the indexing error flags are set. If so, the entire scan routine is bypassed to exit at 142. The indexing error flags are each described in detail below, and include:

A. SLIP error flag,
  B. UNDERSIZE error flag,
  C. OVERSIZE error flag,
  D. OUT OF LABELS error flag, and
  E. SKEW error flag.

If none of the indexing error flags are set, processing proceeds to decision block 143. At decision block 143, a test is made to see if a SCAN IN PROGRESS flag is set. The SCAN IN PROGRESS flag is used to indicate that a scan has been initialized.

A scan is the process of measuring the width of the web 7. Before the scan can begin, the web edge sensor 85 must first be detecting "black" before the leading edge of the web 7 is encountered. Then, upon detecting the "black" to "white" transition at the leading edge of the web 7, the scan is initialized and the SCAN IN PROGRESS flag is set.

If at decision block 143, the SCAN IN PROGRESS flag is not set, then the leading edge of the web 7 has not yet been detected, and processing continues at decision block 144. At decision block 144, a SCAN ENABLE flag is tested. The SCAN ENABLE flag is used to indicate that the first requirement for starting a scan has been fulfilled, e.g. that the web edge sensor 85 has detected "black" before encountering the web 7.

If the SCAN ENABLE flag is not set, it indicates that the web edge sensor 85 has not yet detected "black", and processing proceeds to decision block 145.

At decision block 145 the web edge sensor 85 is tested to determine if it is now detecting "black". If it is not, then the SCAN ENABLE flag remains reset, and a branch is taken to exit 142. If at decision block 145 the web edge sensor 85 is now detecting "black", then the SCAN ENABLE flag is set TRUE at process block 146. After process block 146, no further action is necessary for this pass through the SCAN subroutine, and a branch is taken to exit 142.

Back at decision block 144, if the SCAN ENABLE flag is set, then it indicates that the web edge sensor 85 had previously detected "black", and processing transfers to decision block 147. At decision block 147, a test is made to determine if the web edge sensor 85 is still detecting "black", e.g. whether the "black" to "white" transition at the edge of the web 7 has occurred.

If the web edge sensor 85 is still detecting "black", then the edge of the web 7 has not yet been encountered, and a branch is taken to exit 142. If at decision block 147 the web edge sensor 85 is no longer detecting "black", then a "black" to "white" transition has occurred at the edge of the web 7, and processing continues at process block 148.

In process block 148, an INDEX count is decremented. The INDEX count is initialized by the FEED subroutine in block 253 (FIG. 14) to a MAX INDEX count. The MAX INDEX count is a value equal to the maximum number of lines between notches 90 of the assembly. In this exemplary embodiment, that maximum value is 20, corresponding to the longest identification devices 6, 95 or 97 intended for use on the machine 1. The INDEX count is used to detect slippage of the web 7. If the INDEX count is decremented down to zero without finding a notch 90, then a SLIP error is flagged.

After decrementing the INDEX count in block 148, processing continues to decision block 149. In decision block 149, the INDEX count is tested to see if it has been decremented down to zero, e.g. the maximum number of lines have been scanned without finding a notch 90. If so, processing transfers to process block 150, where the SLIP error flag is set TRUE. From process block 150 a branch is taken to exit 142.

If at decision block 149, the INDEX count has not expired, then another scan is allowed. The new scan is initialized in process block 151 as follows. The SCAN IN PROGRESS flag is set to indicate that a scan is now in progress. A WIDTH count is used to contain the actual measurement of the width of the web 7, and is initialized to zero. As described above, each count of the WIDTH count corresponds to a distance of 0.0035 (0.09 mm) inches horizontally across the web 7.

Also in process block 151, a NOISE flag and NOISE count are initialized. The NOISE flag is used in a manner described in detail below to distinguish between the true opposite edge of the web 7 and a false indication of the web edge such as, for example, a tear in the web 7 or dark debris on the web 7 as represented at 215 in FIG. 18. Other false indications may arise from the edges of the labels 6 themselves on the web 7 if the label 6 is very thick. At this point, the NOISE flag is cleared and the NOISE count is initialized to zero. From process block 151, the SCAN subroutine exits at 142.

Finally, in block 151, the OUT OF LABELS error flag is set FALSE. As described above, the OUT OF LABELS error flag is initialized to TRUE. If an end of roll marker 99 is in place under the path of the web edge sensor 85, then a leading edge of the web 7 will not be detected, and the OUT OF LABELS error flag will remain TRUE. Since at block 151 a leading edge of the web 7 has been detected, the OUT OF LABELS error flag is set FALSE for this scan.

Once a scan has been initialized, on the next pass through the SCAN subroutine at decision block 143, the SCAN IN PROGRESS flag will be found to be set, and a branch is taken to a MEASURE WIDTH routine 152.

Figure 17:
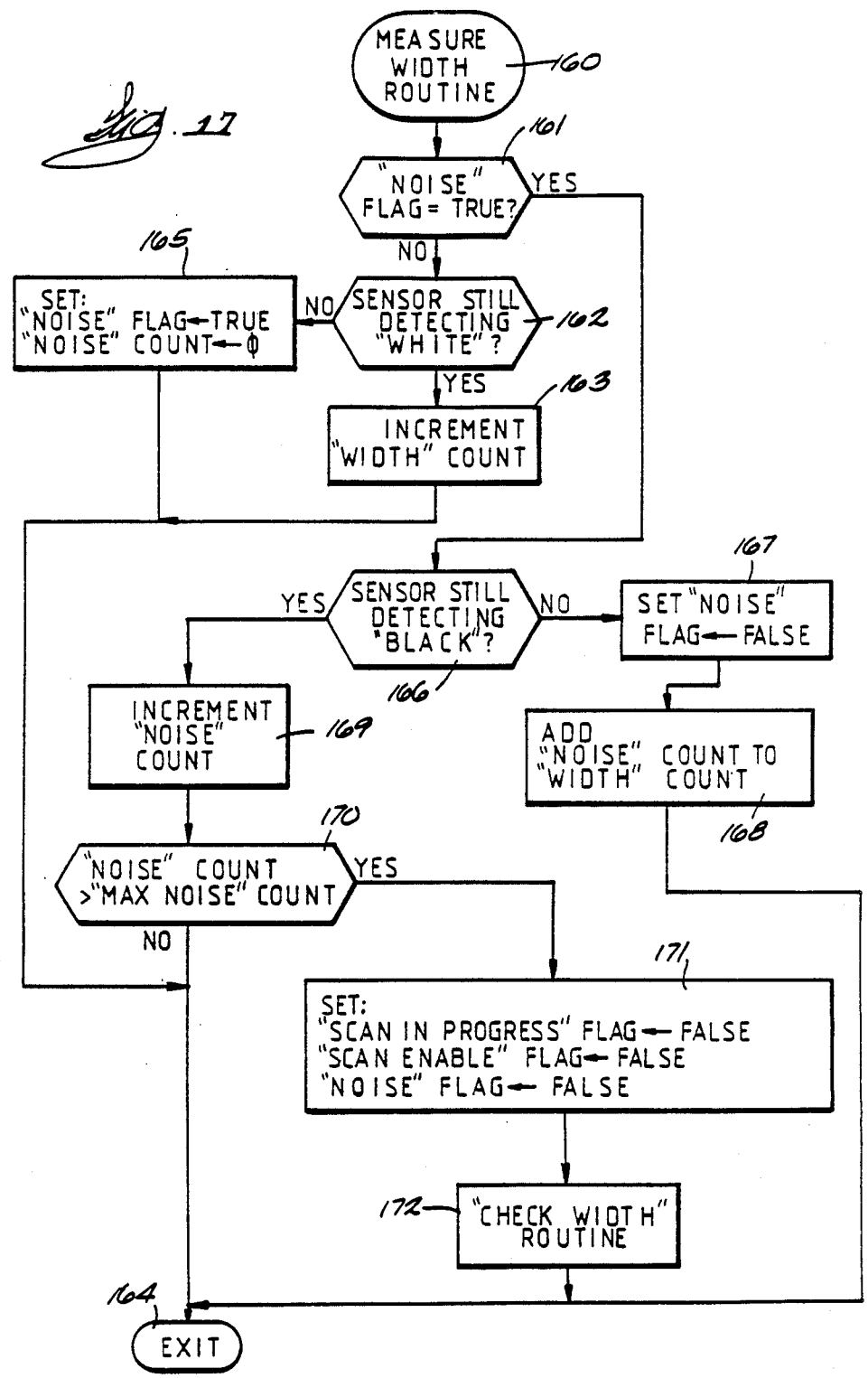
FIG. 17 is a flow chart of the MEASURE WIDTH routine which forms a part of the routine depicted in FIG. 16.

Referring to FIG. 17, the MEASURE WIDTH routine performs the actual measurement of the width of the web 7. Processing in the MEASURE WIDTH routine enters at block 160 and proceeds to decision block 161. At decision block 161 a test is made to determine if the NOISE flag is set. The noise detection logic operates as follows.

Upon first detecting a "white" to "black" transition, it has not been determined whether the "white" to "black" transition was caused by "noise", or the true trailing edge of the web 7. If the output of the web edge sensor 85 remains "black" for a predetermined number of counts, then it is assumed that the "white" to "black" transition was the true edge of the web 7.

Figure 18:
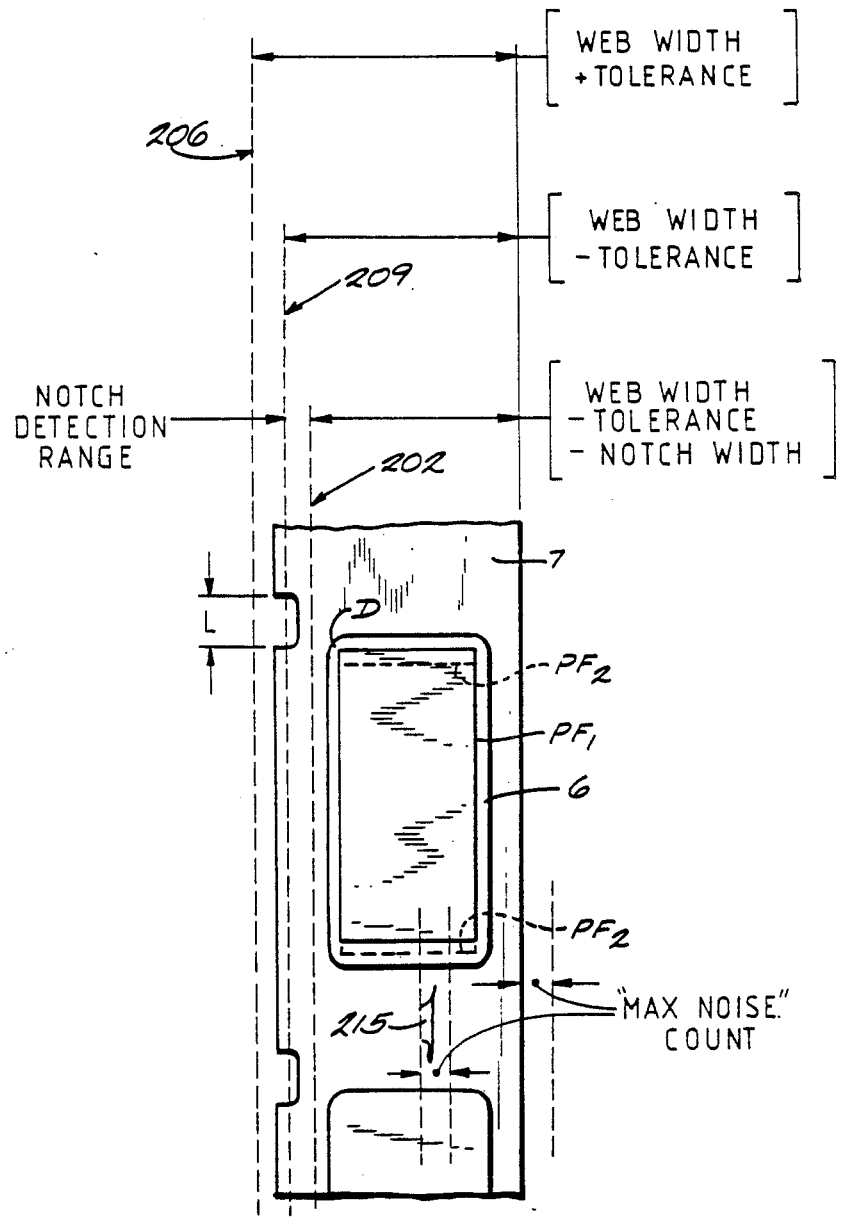
FIG. 18 is a detailed view of an assembly of devices useable with the machine of FIG. 1 showing the dimensions measured by the routines of FIGS. 15-18.

Referring momentarily to FIG. 18, the predetermined number of counts required to verify the true edge of the web 7 is designated as a MAX NOISE count. The actual number of counts used for the MAX NOISE count in this exemplary embodiment is 15, which corresponds to a distance: 0.0035 inch/count times 15 counts =0.052 inch, (0.09 mm/count times 15=1.35 mm). If a "white"-"black"-"white" transition occurs in fewer counts than the MAX NOISE count, then the transition is judged to be noise and not the true edge of the web 7.

When a "white" to "black" transition is detected, the NOISE flag is set. At the same time, the NOISE count is initialized to zero. For each pass through the MEASURE WIDTH routine that the web edge sensor 85 continues to detect "black", the NOISE count is incremented. The NOISE count is then compared against the MAX NOISE count. If a "white"-"black"-"white" transition occurs in fewer counts than the MAX NOISE count, then the transition is considered to be noise, and not the true edge of the web 7.

If on the other hand, a "white" to "black" transition occurs and another "white" edge is not detected before the MAX NOISE count has elapsed, then the transition is considered to be the true edge of the web 7.

Referring again to FIG. 17, if at decision block 161 the NOISE flag is not set, then the web edge sensor 85 had detected "white" on the previous pass through the MEASURE WIDTH routine, and processing proceeds to decision block 162. At decision block 162 a test is made to determine if the web edge sensor 85 is still detecting "white". If it is, then the WIDTH count is incremented at process block 163 and the MEASURE WIDTH routine then exits at 164.

If, on the other hand, the web edge sensor 85 at decision block 162 is no longer detecting "white", then a "white" to "black" transition has occurred, and a branch is made to process block 164.

At process block 164 the NOISE flag is set and the NOISE count is initialized to zero to begin a noise measurement cycle. After initiating the noise measurement cycle at process block 164, the MEASURE WIDTH routine exits at 164. On the next pass through the MEASURE WIDTH routine, the NOISE flag will be found to be set at decision block 161, and control transfers to decision block 166.

At decision block 166 a test is made to determine if the web edge sensor 85 is still detecting "black". If the web edge sensor 85 is no longer detecting "black", then a "white"-"black"-"white" transition has occurred before the MAX NOISE count has been exceeded, indicating that the transition was caused by noise rather than the true web edge. In that case, processing transfers to process block 167 where the NOISE flag can be cleared since the web edge sensor 85 is now in the "white" portion of the web 7 and noise processing is no longer in effect. From process block 167 control transfers to process block 168.

At process block 168, since the WIDTH count was not incremented during the noise processing, the NOISE count must be added into the WIDTH count to correct for the distance in which the noise measurement cycle was in effect. After performing this correction at process block 168, exit 164 is taken.

Back at decision block 166, if the web edge sensor is still detecting "black", then control transfers to process block 169 where the NOISE count is incremented. From process block 169, control transfers to decision block 170 where the NOISE count is tested to determine if it exceeds the MAX NOISE count. If not, then the noise measurement cycle continues and exit 164 is taken.

Conversely, if at process block 170 the NOISE count exceeds the MAX NOISE count, then it is presumed that the "white" to "black" transition that initiated the noise measurement cycle was a valid web edge, and processing continues at process block 171. At process block 171 the SCAN IN PROGRESS and SCAN ENABLE flags are reset to terminate the scan. At this point, the WIDTH count contains a count corresponding to the actual measured width of the web 7, since the WIDTH count is not incremented during noise measurement. Following process block 171, control transfers to block 172, where a CHECK WIDTH routine is performed to analyze the WIDTH count just completed.

Figure 19:
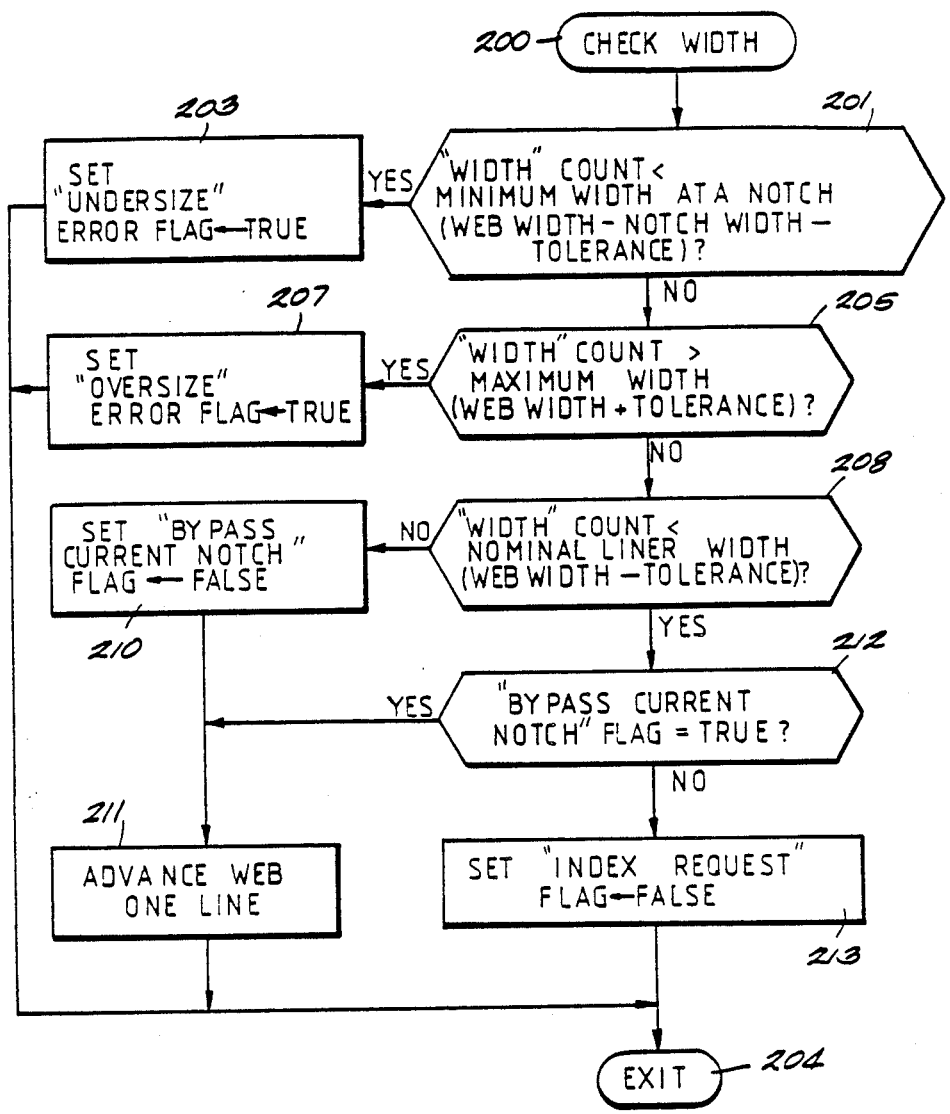
FIG. 19 is a flow chart of the CHECK WIDTH routine which forms a part of the routine depicted in FIG. 17.

Referring to FIGS. 18 and 19, the CHECK WIDTH routine processes the measured width of the web 7 indicated by the WIDTH count to determine (a) if the width of the web 7 is proper, and (b) if the web 7 is at a notch 90.

As described above, the web width may be configured by the operator to accommodate a variety of different web widths. In the CHECK WIDTH routine, a tolerance is allowed on either side of the web width in checking the web 7 for proper size. The width of the notch 90 is the same in webs 7 of all sizes, so that a difference in width, designated in FIG. 15 as the NOTCH DETECTION RANGE, can be used regardless of the web width.

It is a particular advantage of this invention that registration of the labels is achieved by discriminating between portions of the web 7 of different widths, rather than relying on a fixed feature. For example, the notch 90 can be on either side of the web 7 and still result in a width differential. In fact, notches 90 may be placed on alternating sides, and a width differential will still be detected. Further, any means of achieving a width differential in the web 7 may be used in this invention. For example, it should be apparent to one skilled in the art to modify the embodiments disclosed herein to detect a width differential using tabs (not shown) in place of notches, since it is a width differential that is detected, not any one particular feature.

The particular dimensions used in this exemplary embodiment are listed in the following table:

| DIMENSION | NO. OF COUNTS | CORRESPONDING DISTANCE |
|---|---|---|
| Narrow Web Width | 214 | .750 inch (19 mm) |
| Medium Web Width | 357 | 1.25 inches (31.75 mm) |
| Wide Web Width | 500 | 1.75 inches (44.45 mm) |
| Tolerance | 14 | .049 inch (1.24 mm) |
| Notch Width | 26 | .091 inch (2.31 mm) |

Further, the length of the notch, designated as L in FIG. 18, must be of a length greater than one line feed plus the field of view of the web edge sensor 85 to ensure that it is not skipped over by a single line feed. For the printer mechanism in this exemplary embodiment, a line feed may vary from 0.125 to 0.140 inches (3.17 to 3.56 mm). The field of view of the sensor 85 is 0.01 inches (0.25 mm), and so the length L must be at least 0.15 inches (3.8 mm).

The length L of the notch also has an effect on the registration of the printing on the label 6. This effect is due to the fact that the notch may be detected anywhere within the length L. A print field $PF_1$ is shown in FIG. 18 in the highest possible position on the label 6, corresponding to detection of the notch at an upper extreme of the length L. If the notch is not detected until later in the length L, the print field will be shifted downward on the label 6. For example, if the notch is detected at the lower extreme of the length L, then the print field will be shifted down to the position shown by dotted line $PF_2$ in FIG. 18. Therefore the length L of the notch is preferably chosen to be the minimum value, 0.15 inches (3.8 mm) in this exemplary embodiment, in order to minimize variation of placement of the print field on the label 6.

Printing is actually performed on the label 6 with respect to a datum point D at the upper left hand corner of the print field $PF_1$. The datum point and the left edge of the print field $PF_1$ are both aligned horizontally at a fixed, predetermined distance from the left edge of the web 7 Also, the datum point and the leading or top edge of the print field $PF_1$ are aligned vertically at a fixed, predetermined distance from the upper or leading edge of a notch 90. The width and length of the print field can be configured to correspond to a variety of label sizes. That is, since printing is referenced to the datum point D, labels 6 can be any size smaller than can be accommodated by a particular web width and notch spacing.

In this exemplary embodiment, several standard dimensions for print fields corresponding to labels of different standard sizes are stored in the ROM 103. With each standard size, there is also stored in the ROM 103 a configured width value, corresponding to the width of the web 7 expected to be loaded in the machine 1. The user may then specify, or configure, the size of the print field $PF_1$ in terms of the number of characters per line and the number of lines. From the configured size of the print field PF1, the configured width value for the web 7 is then determined.

Referring now to FIGS. 18 and 19, the CHECK WIDTH routine enters at 200 and proceeds to decision block 201. At decision block 201 the WIDTH count is checked to see if it is less than the MINIMUM WIDTH AT A NOTCH, as indicated by dotted line 202 in FIG. 15. The MINIMUM WIDTH AT A NOTCH is defined as:

MINIMUM WIDTH AT NOTCH = [WEB WIDTH − TOLERANCE − NOTCH WIDTH]

If the WIDTH count is less than the MINIMUM WIDTH AT A NOTCH 202, then a branch is taken to process block 203, where the UNDERSIZE ERROR flag is set. From process block 203, the CHECK WIDTH routine exits at 204.

If, at decision block 201, the WIDTH count is greater than or equal to the MINIMUM WIDTH AT A NOTCH 202, control transfers to decision block 205. At decision block 205 the WIDTH count is tested to see if it is greater than the MAXIMUM WIDTH, represented by dotted line 206 in FIG. 15. The MAXIMUM WIDTH is defined as:

MAXIMUM WIDTH = [WEB WIDTH + TOLERANCE]

If the WIDTH count is greater than the MAXIMUM WIDTH, then control transfers to process block 207 where the OVERSIZE ERROR flag is set before exiting at 204. If at decision block 205 the WIDTH count is less than or equal to the count corresponding to the MAXIMUM WIDTH, then control transfers to decision block 208.

At decision block 208, the WIDTH count is tested to determine if it is less than the WEB WIDTH minus the TOLERANCE as indicated by a dotted line 209 of FIG. 18. If not, then the width is outside of the NOTCH DETECTION RANGE, and control transfers to process block 210. In other words, the web width is nominal.

At decision block 210, if the indexing operation started at a notch, the notch has now been bypassed, since the web width is now nominal, and the BYPASS CURRENT NOTCH flag is set FALSE. This mechanism ensures that if an indexing operation is started on a notch 90, the notch 90 is bypassed completely to full nominal web width before seeking the next notch.

After setting the BYPASS CURRENT NOTCH flag at block 210, control transfers to block 211. At block 211, a pulse is produced on the CLUTCH SOLENOID output line 125 to cause the web 7 to advance to the next line. From block 211, the CHECK WIDTH routine exits at 204.

Back at decision block 208, if the WIDTH count does fall within the NOTCH DETECTION RANGE, then a notch 90 has been found, and control transfers to decision block 212. In decision block 212, the BYPASS CURRENT NOTCH flag is tested. The BYPASS CURRENT NOTCH flag at this point can be false for two possible reasons. First, if the indexing operation was invoked by the VERIFY NOTCH subroutine (FIG. 13), then the BYPASS CURRENT NOTCH was set FALSE as described above. Secondly, if the indexing operation was invoked by the ADVANCE TO NEXT NOTCH subroutine (FIG. 12), then the BYPASS CURRENT NOTCH flag is set FALSE in block 210 when full nominal web width is detected.

In either case, if the BYPASS CURRENT NOTCH flag is TRUE, a branch is taken to block 211 to advance another line. If the BYPASS CURRENT NOTCH flag is FALSE, then the notch 90 that is now found completes the indexing operation. Then in block 213 the INDEX REQUEST flag is cleared to signal completion of the indexing operation. From block 213, the CHECK WIDTH routine exits at 204.

As described above, the net outcome of the SCAN, MEASURE WIDTH, and CHECK WIDTH routines is either the successful indexing of the web 7 to the next notch 90, or the setting of an appropriate error flag. Referring back now to FIG. 15, the SCAN subroutine returns upon its completion to decision block 220. Decision block 220 is alternatively entered if the INDEX REQUEST flag was not set at decision block 136, bypassing the SCAN subroutine.

At decision block 220, the HEAD POSITION count is examined to determine if the carriage 71 is in a position to either energize the appropriate dot solenoids for printing, or to advance the web 7 (e.g. line feed). If either function is required, it is performed at block 221.

If printing is required at block 221, it is performed in the normal manner, by decoding the desired text to be printed into vertical dot columns. The dot solenoids corresponding to the current horizontal position as determined by the HEAD POSITION count are then energized. In this exemplary embodiment, vertical dot columns are printed every fourth count of the HEAD POSITION count, 0.0035 inch times 4=0.014 inch (0.09 mm times 4 counts =0.36 mm).

One special feature of the printing performed in block 221, however, is included in this invention. After the last line of text for the current device 6 is printed, the ADVANCE TO NEXT NOTCH subroutine is called by the printing routine. As previously described, this will cause the web to be advanced to the top of the next identification device 6.

Also as noted above, the setting of the INDEX REQUEST flag at the completion of an identification device 6 is not the only way in which the INDEX REQUEST flag is set. The INDEX REQUEST flag may be set by other programs whenever it is desired to advance to the top of an identification device 6, for example, in response to depression of the FEED key by the operator.

In blocks 220 and 221, web advancement takes place at both the right margin (HEAD POSITION count indicates helix at turn-around point) or after completing the reverse line (HEAD POSITION count beyond left edge of web 7 in reverse direction). An exception is that if the operator has selected "bold" printing, the web advancement at the right margin is suppressed and the same text is printed in reverse, offset by one dot position to create the "bold" effect. If the carriage 71 is found to be at the helix turn-around point, the HEAD DIRECTION flag is set to REVERSE.

After processing the print functions in blocks 220 and 221, processing continues at decision block 222. In decision block 222, the HEAD POSITION count is examined. If it has not yet reached the count corresponding to the left edge of the web 7 in the reverse direction, then the forward/reverse cycle is not yet complete and a return from the TIMING SIGNAL INTERRUPT routine is taken at 223. Otherwise, the forward/reverse cycle is complete, and a branch is taken to decision block 224.

At decision block 224, the INDEX REQUEST flag is checked. If it is not set, then indexing is not currently active, and control transfers to decision block 225. At decision block 225, a test is made to determine if either printing is in progress (text buffer not yet empty) or a line feed has been commanded (clutch solenoid engaged). If neither of these conditions exist, as would be the case after the carriage 71 has passed the left edge of the web 7 in the reverse direction but has not yet encountered the left margin, then the return from interrupt at 223 is taken. Otherwise, the printing, line feed, and indexing have all been completed, and the motor 35 is stopped at 226 before returning at 223.

Back at decision block 224, if the INDEX REQUEST flag is TRUE, then an indexing operation is in progress, and control transfers to decision block 227. At decision block 227, the SCAN IN PROGRESS flag is tested. If it is TRUE, then the trailing edge of the web 7 has not yet been detected, and a branch is taken to block 228. This condition is typically caused by the web 7 "creeping" too far to the left. Therefore, in block 228, the SKEW error flag is set TRUE to indicate the error.

From block 228, processing proceeds to block 229. Since an error has just been detected, the indexing operation is terminated by setting the INDEX REQUEST flag FALSE and stopping the motor 35. A branch is then taken to the RETURN FROM INTERRUPT block 223.

Back at decision block 227, if the SCAN IN PROGRESS flag is FALSE, as is the normal case, processing continues at decision block 239. In decision block 239, the indexing error flags are checked. If they are all clear, then no indexing errors were detected. In that case, control transfers to block 240. At block 240, the OUT OF LABELS error flag is again set TRUE in preparation for another scan, as described above, before returning at 223.

If, back at decision block 239, any of the indexing error flags are set, then an indexing error has been detected, and a branch is taken to block 229. At block 229, the INDEX REQUEST flag if cleared to terminate the indexing operation, and the motor 35 is stopped. Then the return from interrupt 223 is taken.

(h) Second Embodiment, FIGS. 20-46

As previously described, a margin switch (not shown) is included in the printer mechanism for detecting the point at which the carriage is at the extreme left margin of travel. The output of the margin switch is applied as the margin signal 120 to the microprocessor 100 (FIG. 11), and is either true or false to indicate whether the margin switch is open or closed, respectively. The margin switch is a magnetically activated reed switch which responds to a magnet mounted on the carriage such that the margin switch is closed when the carriage is at the extreme left edge of the helix. In the above described first embodiment, the margin signal 120 is sampled for each cycle of the carriage 71, and is used to establish a new reference position for each cycle.

As such, the control scheme for the printhead 70 in the first embodiment enjoys the advantage of simplicity of implementation, but has the disadvantage that the margin signal 120 may vary a small amount on each cycle due to mechanical variations in the exact point at which the margin switch opens. As a result, the reference position used for each cycle may also vary by a small amount, causing a slight mis-registration of the printed dot patterns. In this second embodiment, a different control scheme is implemented in which a reference position is established only once for each period of continuous motor operation. Once that reference position has been established, the position of the carriage is determined by the reference position and a count of the number of pulses received on the timing signal 129. This control scheme is described more fully below. Other features implemented in this second embodiment include adjustment of the print field relative to the edge of the assembly of markers, detection of excessive skew of the assembly of markers in the printer mechanism, detection of a failure in the web sensor, and an ability to override error conditions to cause a continuous feed of the assembly of markers. A machine according to this second embodiment has the same mechanism and electrical hardware elements as the machine 1 previously described and thus includes all such elements described in parts (a)–(c), (e) and (f) above but includes different programming to execute the new control scheme. In this part (h), the carrier web 7 on which identification devices are supported in an assembly thereof is referred to as a "liner" 7, it being understood that the term liner is the same element as a carrier web and is used herein synonymously with the term carrier web.

Referring to FIG. 20, as just mentioned, printhead position is maintained in this embodiment by counting the number of pulses received on the timing signal line 129 after a reference position has been established. In order to illustrate this principle, FIG. 20 shows a position line 270 calibrated with the POSITION COUNT, e.g. the number of counts occurring on the timing signal 129. As described above, the timing signal 129 is generated by an encoder connected directly to the shaft of motor 35. Since motor 35 is geared directly to the drive shaft 41, an approximately constant number of encoder pulses are produced on the timing signal 129 for each cycle of the helix. The entire mechanical assembly used in this embodiment is the same as that described above for the previous embodiment, and is geared such that 1,728 pulses on the timing signal 129 correspond to one complete cycle of the helix. In FIG. 20, the POSITION COUNT, or number of pulses occurring on the timing signal 129, are marked off in 100 count increments, starting from a count of "1" which represents the extreme left end of the helix. At a count of 1,728, one complete helix cycle has been traversed and the carriage position is one count short of arriving back at the starting extreme left edge position. On the next pulse from the timing signal 129, the POSITION COUNT is reset to "1", having completed exactly one complete helix cycle. The helix is symmetrical, such that a count of half of 1,728, which equals 864, corresponds to the extreme right end of the helix. One complete cycle of the helix then comprises the progression of the POSITION COUNT from 1 to 1,728, repeated indefinitely for as long as the motor runs.

The establishment of a single reference position can now be described. For the particular printer mechanism used, the margin switch closes approximately 167 counts before encountering the extreme left end of the helix, and opens approximately 167 counts after passing through the extreme left end of the helix. It is necessary for the margin switch to remain Closed for that period of approximately 334 timing signal counts because at the turnaround point of the helix the transverse movement of the carriage is essentially stopped, and it would not be practical to set the margin switch to close and open exactly at a single extreme point of transverse carriage position. In actuality, the exact position at which the margin switch opens and closes can be expected to vary by at least plus or minus 1 count from the count values just mentioned, and that precision may be adversely affected by age and other mechanical factors. As a result, the values corresponding to the positions mentioned are considered the nominal values for their respective events. The method for setting the reference position in this embodiment is to observe the first occurrence of the margin switch opening. At that point, the POSITION COUNT, representing the actual physical carriage position, is initialized by forcing it to the nominal value of 167 counts assumed for the nominal carriage position at the point at which the margin switch opens. After that initialization, subsequent openings of the margin switch are ignored; the POSITION COUNT from that point on is maintained solely by counting pulses on the timing signal 129. The POSITION COUNT is incremented for each pulse received on the timing signal 129, up until a helix cycle is completed at a POSITION COUNT of 1,728. When a POSITION COUNT of 1,728 is reached, the next pulse on the timing signal 129 causes the POSITION COUNT to wrap back to a count of "1", and again begin incrementing. In that way, only a single position is used as a reference position rather than re-initializing the reference position each time the margin switch opens. Also note that because the POSITION COUNT is loaded with a count corresponding to the nominal number counts after the extreme left end of the helix expected for the margin switch to open, the origin, e.g. a POSITION COUNT of "1", is referenced to the extreme left end of the helix rather than to the point at which the margin switch opens. In other words, a POSITION COUNT of 1 corresponds to the extreme left end of the helix. The fact that the margin switch may open within some range of counts away from the nominal only results in a small shift in the reference position, but since the reference is established only once, on the first opening of the margin switch, all subsequent helix cycles use the exact same reference, and printing on the assembly of markers will be in perfect registration.

The establishment of a reference position in this embodiment is illustrated in timing diagram form in Figs. 21 and 22. The normal case as shown in FIG. 21 occurs when the motor is started with the carriage already near the left margin, e.g. with the margin switch already closed. This is normally the case because the carriage is always stopped near the left margin upon completion of the previous printing operation; however, the carriage may be moved manually to a different position or may be positioned erroneously, for example, due to a power interruption. In FIG. 21, the motor is turned on at a time indicated by line 280, at which time the margin switch is already closed. Two software flags, a POSITION REFERENCE UPDATE flag and a COUNT VALID flag, are used to control the initialization of the POSITION COUNT. At the time 280 that the motor was started, the POSITION REFERENCE UPDATE and COUNT VALID flags had been initialized to "false" by a software routine to be described below. In that state, the POSITION COUNT is invalid. When the motor 35 begins turning, pulses begin to be produced on the timing signal 129 by the encoder connected to the motor shaft, each pulse producing an interrupt to the microprocessor causing the execution of a "timing signal interrupt" routine, also to be described below. On the very first such interrupt, the "timing signal interrupt" routine finds the margin switch already closed, and sets the POSITION REFERENCE UPDATE flag to "true". In that state, the POSITION COUNT is still invalid, as the software is now waiting for the margin switch to open. At the time indicated by line 281 the margin switch does open, causing POSITION COUNT to be set to a count of "167", the POSITION REFERENCE UPDATE flag to be set "false", and the COUNT VALID flag to be made "true". Having thus been initialized, the POSITION COUNT is incremented on each subsequent timing signal interrupt up to the full cycle count of 1,728. As shown in the timing diagram of FIG. 21, once the POSITION COUNT has been initialized, further closings of the margin switch are ignored; the wrap around of the POSITION COUNT from a count of 1,728 to a count of 1 occurs automatically based solely on a count of the pulses occurring on the timing signal 129.

In FIG. 22, the margin switch is open at the time 280 that the motor is started, for example due to the circumstances mentioned above, e.g. that the carriage was physically moved away from the left end of travel. In that case, the POSITION REFERENCE UPDATE flag remains "false" until the margin switch finally does close at time 291. Then when the margin switch opens at time 292, the POSITION COUNT is initialized in the same manner as described above in relation to FIG. 21.

Referring again to FIG. 20, a general description of a complete helix cycle will now be given as an aid in understanding the features of the control scheme implemented in this second embodiment. A complete helix cycle is conceptualized as including a forward sweep, as the carriage travels rightwardly across the platen from the extreme left end of the helix to the extreme right end of the helix, and a reverse sweep, as the carriage travels leftwardly across the platen from the extreme right end of the helix back to the extreme left end of the helix. It should be noted that the POSITION COUNT increases monotonically throughout the helix cycle, the forward sweep comprising values of the POSITION COUNT from 1 to 864, and the reverse sweep comprising values of the POSITION COUNT from 865 to 1728. Both the forward and reverse sweeps include a forward and reverse scan range in which the web sensor is actively monitored. During each scan, the leading and trailing edges of the liner are detected by the web sensor, thereby defining the ranges labeled "liner" in FIG. 20. Within each "liner" range, a nominal print field is defined as the area on the liner containing the identification devices. As will be described in detail below, another feature of the control scheme of this embodiment is that the actual printing on the identification devices is adjusted horizontally to adjust for liner skew away from the nominal. This is accomplished by monitoring the web sensor while indexing to the start of the next identification device. While indexing, "scans" are performed in "looking" for the next notch. During the scans, both forward and reverse, the positions of the liner edges are measured. When the notch is found, ending the indexing operation, the last measured position for the right edge of the liner is used to compute a SKEW OFFSET value. Then, during the following printing operations, the nominal print field is adjusted by the SKEW OFFSET value to produce an adjusted print field, thereby compensating for the skew of the liner.

Assemblies of identification devices are advanced vertically in the printer mechanism by a cam operated line feed mechanism which is triggered by a solenoid under control of the microprocessor 100. Line feeds, if requested by the particular print routine (not shown) are performed at fixed positions during the helix cycle, specifically at the end of the forward and reverse scans.

Figure 23:
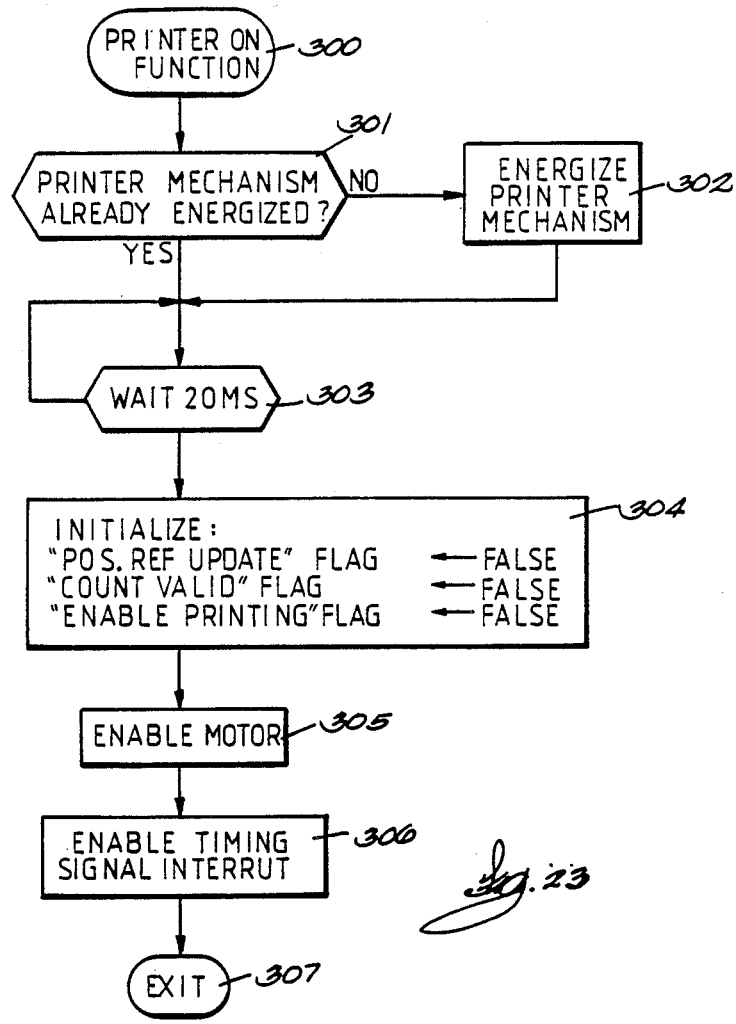
FIGS. 23-43 are flow charts of routines which execute on the microprocessor of the second embodiment, as follows.

Referring to FIG. 23, a printer-on function 300 is provided as a utility routine contained in the ROM 103 for execution by the microprocessor 100 (FIG. 11). The printer-on function 300 is called, for example, from print routines (not shown) when it is desired to begin printing one or more identification devices. At decision block 301 a test is made to see if a main relay (not shown) has already been energized to apply operating power to the printer mechanism. If it has not, then a branch is taken to block 302 where the relay is energized, applying main power to the printer mechanism. After assuring that the printer mechanism is energized, a 20 millisecond (mS) wait is performed at decision block 303 to insure that the main power supply voltage to the printer mechanism has stabilized. From decision block 303, control transfers to block 304, where several flags utilized for the establishment of a reference position according to this embodiment are initialized. As mentioned above, the POSITION REFERENCE UPDATE flag is used to detect closure of the margin switch. The POSITION REFERENCE UPDATE flag is initialized to "false". In order to complete the initialization sequence, the margin switch must first be detected in a closed position, causing the POSITION REFERENCE UPDATE flag to be set "true". Then upon transition of the margin switch from a closed to an open state, the reference position is established at that point. A COUNT VALID flag is initialized in block 304 to "false", and is set "true" upon establishing that reference position. Also in block 304, an ENABLE PRINTING flag is set "false". The ENABLE PRINTING flag is used to delay the start of printing operations until the carriage has moved to the extreme right end of the helix after the reference position has been established, e.g. one half cycle, to insure that the printer mechanism has stabilized to normal operating conditions. From block 304, control transfers to block 305 where the drive motor in the printer mechanism is enabled and begins operating. Then at block 306, the timing signal interrupt is enabled, allowing the microprocessor 100 to be interrupted for each pulse occurring on the timing signal 129. From block 306, the printer-on function exits at 307.

Figure 24:
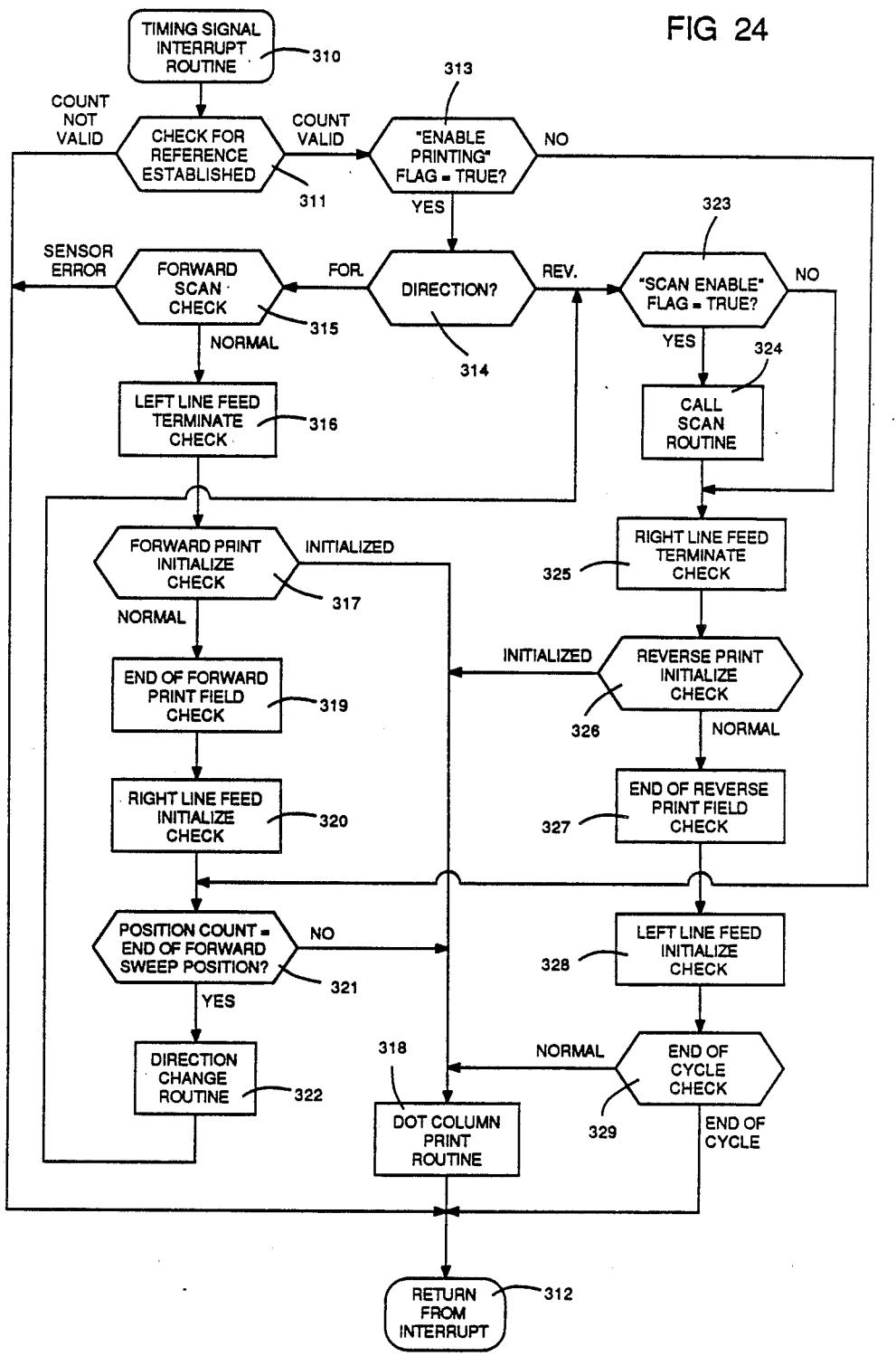

Referring to FIG. 24, once the printer mechanism has been initialized by a call to the printer-on function, interrupts start to be received due to the pulses on the timing signal 129, and each such interrupt causes the execution of a "timing signal interrupt" routine 310. The "timing signal interrupt" routine enters at block 310 and proceeds to decision block 311, where a test is made to determine if the reference position has been established. Decision block 311 contains two exits, one taken if the POSITION COUNT is valid, e.g. reference position already established, and the other taken if the POSITION COUNT is not valid. Block 311 performs a "check for reference established" routine, which is shown in detail in FIG. 25.

Figure 25:
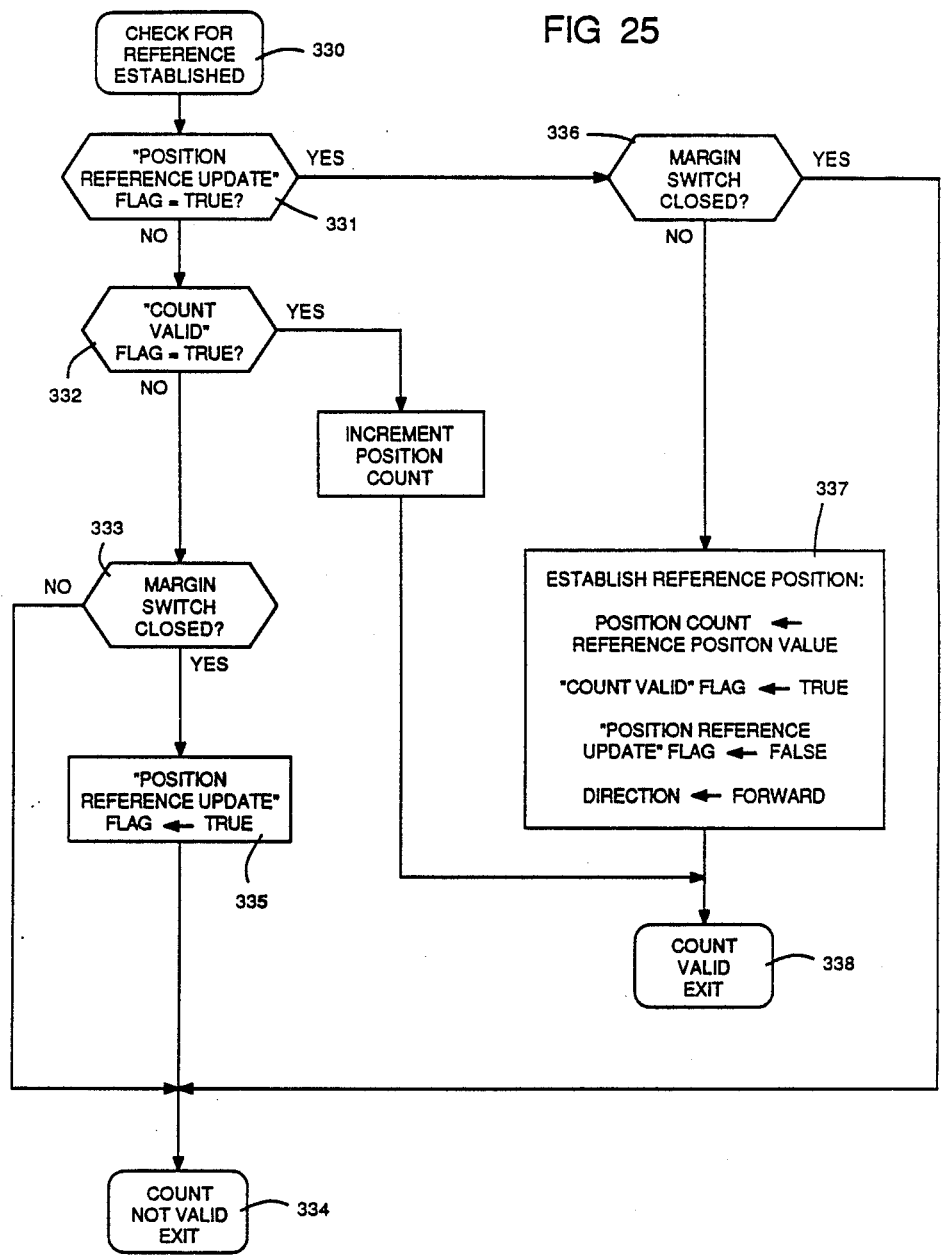

Referring to FIG. 25, the "check for reference established" routine enters at block 330 and proceeds to block 331. At decision block 331, the POSITION REFERENCE UPDATE flag is tested. If it is "false", as it is initialized by the printer-on function 300, a branch is taken to decision block 332. At decision block 332, a test is made of the COUNT VALID flag. The POSITION REFERENCE UPDATE flag is "false" both before the margin switch has been detected as being closed, and after the reference position has been established. The COUNT VALID flag is used to indicate which of those two conditions exists. If at block 332 the COUNT VALID flag is "false", then a branch is taken to block 333 where a test is made to determine if the margin switch is now closed. If the margin switch is still not closed, then a branch is taken directly to the "count not valid" exit 334. Alternatively, if the margin switch is now found to be closed, then a branch is taken to block 335 where the POSITION REFERENCE UPDATE flag is made "true". At this point, the reference position has not yet been established, but is now enabled to be established on the next subsequent opening of the margin switch. From block 335, a branch is taken to the "count not valid" exit 334. After setting the POSITION REFERENCE UPDATE flag "true" in block 335, subsequent passes through the "timing signal interrupt" routine 310 will find the POSITION REFERENCE UPDATE flag "true" at block 331, in which case a branch is taken to decision block 336. At decision block 336, a test is made to determine if the margin switch is still in the closed position. If it is, then a reference position is still not established, and a branch is taken directly to the "count not valid" exit 334. When the margin switch is finally detected as open at decision block 336, a branch is taken to block 337 where the reference position is established by initializing the following values. First, the POSITION COUNT is set to the reference position value, e.g. the nominal reference position assumed for the point at which the margin switch opens, which as mentioned above for this embodiment is a value of 167 counts. Secondly, the COUNT VALID flag is set "true", and the POSITION REFERENCE UPDATE flag is set "false". And thirdly, a DIRECTION flag, used to distinguish between the forward and reverse sweeps, is initialized to the forward direction. After performing the initializations in block 337, a branch is taken to the "count valid" exit 338. Now, on subsequent passes through the "check for reference established" routine 330, the POSITION REFERENCE UPDATE flag will be found "false" at decision block 331, causing a branch to decision block 332. At decision block 332, the COUNT VALID flag will be found "true" and a branch is taken to block 339 where the POSITION COUNT is incremented. It should be noted that in this state, e.g. with the POSITION REFERENCE UPDATE flag "false" and the COUNT VALID flag "true", the only action possible by the "check for reference established" routine is to increment the POSITION COUNT once for each pass through, i.e. it is locked in the "count valid" state for as long as the motor continues to run. Specifically, further opening and closing of the margin switch is ignored, and the COUNT VALID and POSITION REFERENCE UPDATE flags are ignored until the motor is stopped upon completion of the requested printer operation as described below. After incrementing the POSITION COUNT at block 339, a branch is taken to the "count valid" exit 338.

Referring again to FIG. 24, after performing the "check for reference established" routine at block 311, if the "count not valid" exit is taken, then a branch is taken directly to a return from interrupt block 312. In that case, subsequent passes through the "timing signal interrupt" routine will result only in the execution of the "check for reference established" routine until the reference position has been established. Once the reference position has been established, the "count valid" exit is taken from block 311 to decision block 313. At decision block 313, an ENABLE PRINTING flag is tested. The ENABLE PRINTING flag is used to inhibit printing until the carriage has made at least one pass across the platen, e.g. one half cycle of the helix. To accomplish that objective, the ENABLE PRINTING flag is set "true" at the rightmost turn around point of the helix as will be described below. Assuming that the ENABLE PRINTING flag has previously been set and is "true" at decision block 313, then processing proceeds to decision block 314 where the DIRECTION flag is tested. The DIRECTION flag is used as an indicator of the half-cycle, either forward or reverse, that the POSITION COUNT is currently in, so that processing can be performed faster by eliminating unnecessary checks for positions in the opposite half-cycle. If the DIRECTION flag indicates the "forward" direction, then a branch is taken to the "forward scan check" routine in block 315. The "forward scan check" routine, among other functions, performs a test to determine if the web sensor is operating properly, which is one of the features of this embodiment. The "forward scan check" routine therefore has two possible exits, a "normal" exit and a "sensor error" exit.

Figure 26:
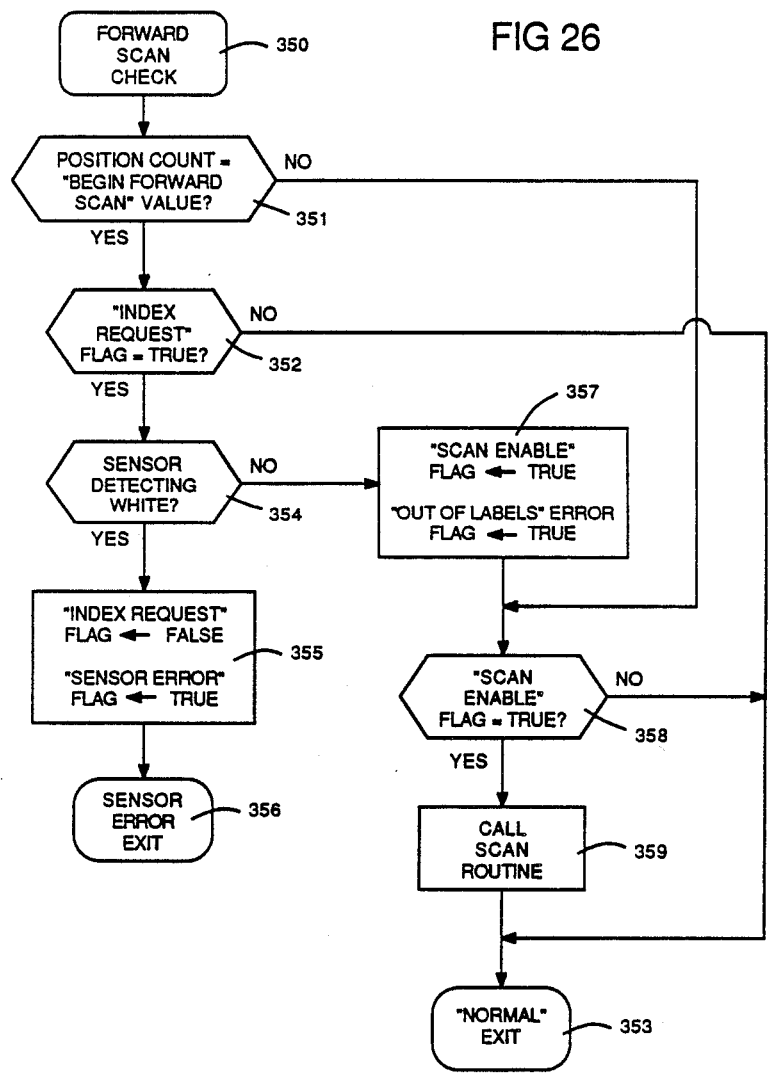

Referring to FIG. 26, the "forward scan check" routine is entered at block 350 and proceeds to decision block 351. In decision block 351, a test is made to determine if the POSITION COUNT is equal to a "begin forward scan" value. The term "scan" is used herein to refer to the process of utilizing the signals from the web sensor to perform measurements of the assembly of identification devices and to measure the location of an assembly in the printer mechanism, which process is described in detail below. The "begin forward scan" value is the count at which a forward scan is to be commenced if enabled by the INDEX REQUEST flag, and is usually the lowest count in the helix cycle, or a count of one in this embodiment. A similar test is made at the helix turn around point, as described below, to initiate a reverse scan at that point if enabled by the INDEX REQUEST flag. If the POSITION COUNT is equal to the "begin forward scan" value at block 351, then a branch is taken to decision block 352 where a test is made to determine if the INDEX REQUEST flag has been set "true". The INDEX REQUEST flag is controlled, or set, by the print routine (not shown) which activated the printer mechanism. The INDEX REQUEST flag is set "true" when it is desired to either verify that the assembly of identification devices is positioned at a notch in the printer mechanism, or to advance the assembly of identification devices to the next notch as described above in relation to FIGS. 12-14. If the INDEX REQUEST flag has not been set "true", then a branch is taken directly from decision block 352 to the "normal" exit at block 353. However, if the INDEX REQUEST flag is "true" at decision block 352, then a branch is taken to decision block 354. At decision block 354, a test is made to determine if the web sensor is operating properly. Recall that in order to reach decision block 354, the carriage must be positioned at a POSITION COUNT equal to the "begin forward scan" value of "one", or the extreme left end of the helix. In that position, the web sensor should always be looking at the black rubber platen, and could only be detecting "white" in the case of a web sensor failure or some other major obstruction. If the web sensor is detecting "white" at decision block 354, then a web sensor failure is assumed, and a branch is taken to block 355, where the indexing operation is terminated by setting the INDEX REQUEST flag "false", and a sensor error is indicated by setting a SENSOR ERROR flag to "true". From block 355, the "sensor error" exit is taken at block 356. Back at decision block 354, if the web sensor is operating normally, e.g. detecting black, then the initialization of the indexing operation is performed by proceeding to block 357, where a SCAN ENABLE flag is set "true" and an OUT OF LABELS ERROR flag is set "true". The SCAN ENABLE flag remains "true" for the remainder of the scan, or one pass across the liner, until reset at an "end of scan" position, and is used to enable execution of a "scan" routine described below. The OUT OF LABELS ERROR flag is used to detect either the black end of roll marker, indicating the end of an assembly of identification devices, or a complete absence of a liner in the printer mechanism. The use of the end of roll marker, however, is advantageous in that it allows detection of the end of a roll while the liner is still securely held in the printer mechanism, thereby allowing resumption of the printing sequence on a fresh roll. In either case where the black end of roll marker is found or the liner is absent form the machine, a leading edge of the liner will not be detected, and the OUT OF LABELS ERROR flag will remain "true", indicating the end of the roll. After initializing the flags in block 357, processing proceeds to decision block 358 where a test is made to determine if the SCAN ENABLE flag is "true". Decision block 358 may also be entered directly from decision block 351 when the POSITION COUNT is any value other than the "begin forward scan" value, which is typically the case. The test at block 358 is to determine then if a scan is to be performed in the forward direction. If the SCAN ENABLE flag is "true", then a branch is taken to block 359 where the "scan" routine is called. A detailed description of the "scan" routine is provided separately below. From block 359, the "normal" exit is taken at block 353. If at decision block 358 a scan is not enabled, as would be the case for example when a printing operation is in progress as opposed to an indexing operation, then a branch is taken directly from block 358 to the "normal" exit at block 353.

Figure 27:
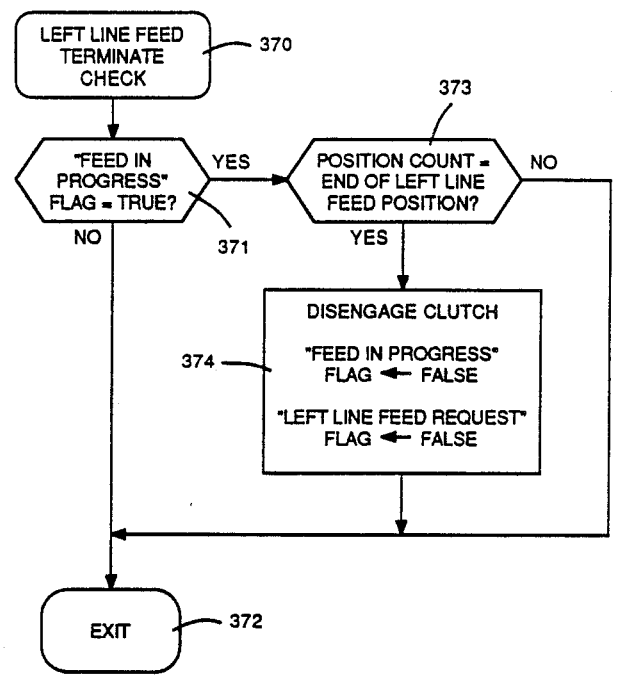

Referring again to FIG. 24, the "sensor error" exit from the "forward scan check" routine at decision block 315 leads directly to the "return from interrupt" exit at block 312, e.g. no other processing is performed when sensor error condition occurs. The "normal" exit from decision block 315 leads to block 316 where a test is made to determine if it is time to terminate the left line feed. Referring to FIG. 27, the "left line feed terminate check" routine is entered at block 370 and proceeds to decision block 371. At decision block 371 a FEED IN PROGRESS flag is tested. The FEED IN PROGRESS flag is set as described below to indicate that the clutch is engaged and a line feed is in progress. If a line feed is not in progress then a branch is taken directly to an exit at block 372. Alternatively, if a line feed is in progress, then a branch is taken to decision block 373 where a test is made to determine if the POSITION COUNT is equal to an "end of left line feed" position. The "end of left line feed" position is that position at which the solenoid for engaging the cam operated line feed clutch is to be disengaged. The "end of left line feed" position is shown in FIG. 20 at position 271, which in this embodiment is equal to a POSITION COUNT of 96. If the POSITION COUNT is equal to the "end of left line feed" position, then a branch is taken to block 374 where the clutch is disengaged, the FEED IN PROGRESS flag is set "false", and a LEFT LINE FEED REQUEST flag is set "false". The LEFT LINE FEED REQUEST flag is set by the print routine (not shown) which initiated the printer operation to indicate if a left line feed is desired. The setting of the LEFT LINE FEED REQUEST flag to "false" in block 374 provides an indication back to the print routine which requested the operation that the requested left line feed has been completed. After block 374, a branch is taken to the exit at block 372. If at decision block 373, the POSITION COUNT is not equal to the "end of left line feed" position, then a branch is taken directly to the exit at block 372.

Figure 28:
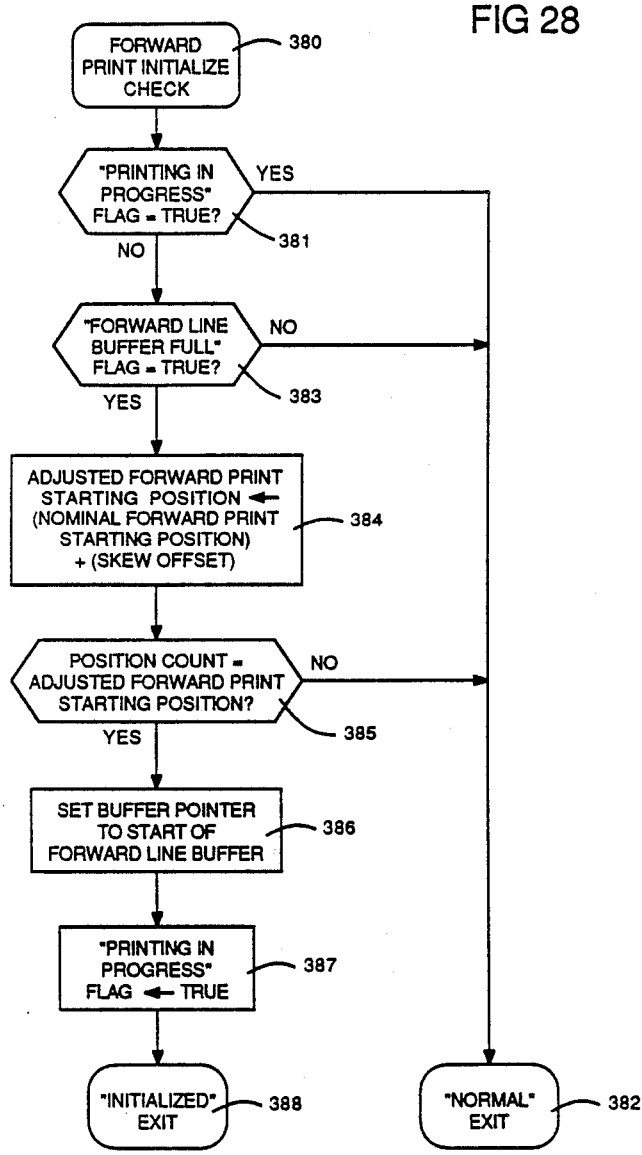

Referring again to FIG. 24, after the "left line feed terminate check" routine at block 316, processing proceeds to decision block 317 where a test is made to determine if the carriage position is such that printing of the dot columns in the print field is to commence. A "forward print initialize check" routine is performed in block 317, and may take either an "initialized" or a "normal" exit. Referring to FIG. 28, the "forward print initialize check" routine begins processing at block 380 and proceeds to decision block 381. At decision block 381, a PRINTING IN PROGRESS flag is tested. The PRINTING IN PROGRESS flag is used to indicate that printing for the current line, or sweep, has been initialized and is active. If the PRINTING IN PROGRESS flag is "true", then a branch is taken directly to the "normal" exit at block 382. Alternatively, if printing has not yet been initialized at block 381, then a branch is taken to decision block 383 where a FORWARD LINE BUFFER FULL flag is tested. The FORWARD LINE BUFFER FULL flag is set by a print routine (not shown) after it has loaded the desired dot column data into a forward line buffer for printing. If the FORWARD LINE BUFFER FULL flag is "false", then no data has been prepared for forward printing, and a branch is taken directly to the "normal" exit at block 382. On the other hand, if the FORWARD LINE BUFFER FULL flag is "true", then it indicates that dot column data has been prepared in the forward line buffer for printing, and processing continues at block 384. At block 384, an "adjusted forward print starting" position is calculated. The calculation of an "adjusted forward print starting" position is an important feature of this embodiment, since it is a dynamic calculation which insures proper registration of the print field on an identification device. A SKEW OFFSET value is calculated by the "scan" routine, as described in detail below, based on the detection of right edge of the liner during the last indexing operation. In block 384, the SKEW OFFSET value, which may be a positive or negative displacement, is added to a "nominal forward print starting" position to arrive at the "adjusted forward print starting" position. The "nominal forward print starting" position is the absolute position, or count, at which printing should commence if the liner were exactly aligned in the printer mechanism. As a result of compensating the "nominal forward print starting" position for liner skew, the "adjusted forward print starting" position indicates the start of the print field relative to the identification device, regardless of the mis-registration of the liner in the printer mechanism. Having calculated the "adjusted forward print starting" position in block 384, processing continues to decision block 385 where a test is made to determine if the POSITION COUNT is equal to the "adjusted forward print starting" position. If it is not, then a branch is taken directly to the "normal" exit 382. However, if the "adjusted forward print starting" position is equal to the POSITION COUNT, then the printing of the forward line is initialized in blocks 386 and 387. At block 386, a buffer pointer is set to point to the start of the forward line buffer. This buffer pointer is used by a "dot column print" routine 318, the details of which are well known in the art, for printing each dot column in the forward line buffer spaced at an interval comprising a fixed number of position counts. Then at block 387, the PRINTING IN PROGRESS flag is set "true" to indicate that printing has been initialized and is active. The PRINTING IN PROGRESS flag is monitored by the "dot column print" routine 318 to suppress printing of the dot columns if it is not set "true". From block 387, a branch is taken to the "initialized" exit at block 388.

Figure 29:
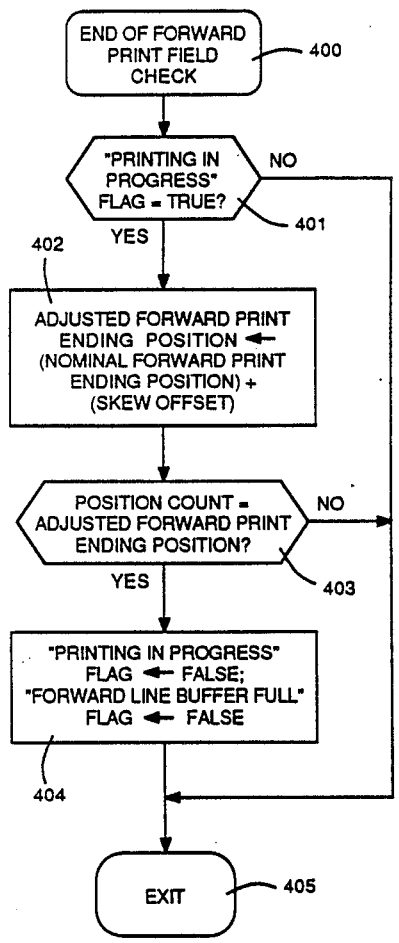
Figure 30:
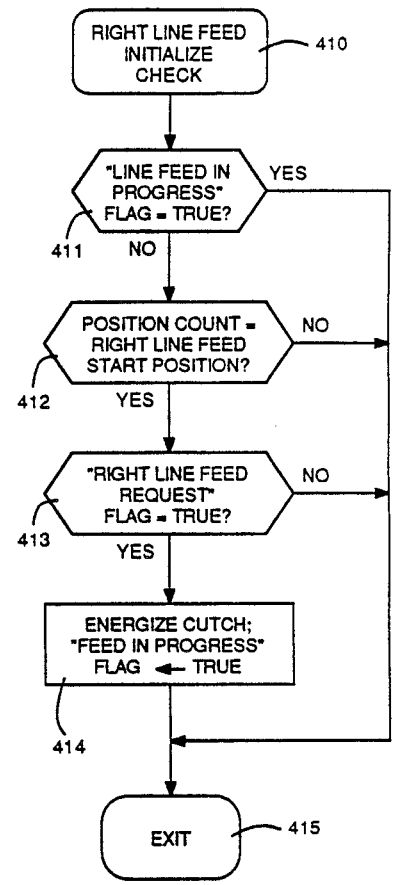

Referring again to FIG. 24, the "initialized" exit from the "forward print initialized check" routine at block 317 branches directly to the "dot column print" routine at block 318. The "normal" exit from the "forward print initialize check" routine at block 317 branches to an "end of forward print field check" routine at block 319. Referring to FIG. 29, the "end of forward print field check" routine enters at block 400 and proceeds to decision block 401. At decision block 401, the PRINTING IN PROGRESS flag is tested to determine if printing is active. If not, then a branch is taken directly to exit 405. If printing is in progress, then a branch is taken to decision block 402 where an "adjusted forward print ending" position is calculated in a manner similar to that described above for calculating the "adjusted forward print starting" position, i.e. by adding the the SKEW OFFSET value to a "nominal forward print ending" position. In this way, the "adjusted forward print ending" position, e.g. the end of the print field, is compensated for skew of the liner in the same way as the start of the print field. From block 402, control transfers to decision block 403, where a test is made to determine if the POSITION COUNT is equal to the "adjusted forward print ending" position. If it is, then a branch is taken to block 404 where the PRINTING IN PROGRESS and FORWARD LINE BUFFER FULL flags are reset to "false". Resetting of the FORWARD LINE BUFFER FULL flag is a signal to the print routine (not shown) which initiated the printing operation, indicating that the requested forward line has been printed, and that the forward line buffer is now available for loading the dot column data of the next forward line to be printed. From block 404, a branch is taken to the exit 405. At decision block 403, if the POSITION COUNT is not equal to the "adjusted forward print ending" position, then a branch is taken directly to exit 405.

Referring again to FIG. 24, after the "end of forward print field check" routine at block 319, control transfers to a "right line feed initialize check" routine at block 320. The "right line feed initialize check" routine is shown in detail in FIG. 30. From the entry point at block 410, processing proceeds to decision block 411 where the FEED IN PROGRESS flag is tested. Line feeds are requested by the print routine (not shown) to advance the liner during printing operations and by the "scan edge data check" routine to advance the liner during indexing operations. The line feed requests are made by appropriate setting of RIGHT LINE FEED REQUEST and LEFT LINE FEED REQUEST flags. Even though a right line feed may have been requested by setting the RIGHT LINE FEED REQUEST flag "true", a left line feed may actually still be in progress. If the FEED IN PROGRESS flag is "true" at decision block 411, a branch is taken directly to the exit at block 415. Otherwise, no other line feed is in progress and control transfers to decision block 412. At decision block 412, the POSITION COUNT is tested to determine if it is equal to a "right line feed start" position, e.g. that position, or count, at which a right line feed is to be initiated. If not, a branch is taken directly to the exit at 415. If the POSITION COUNT is equal to the "right line feed start" position, then a branch is taken to decision block 413 where the RIGHT LINE FEED REQUEST flag is tested. If the RIGHT LINE FEED REQUEST flag is "true", then control transfers to block 414 where the line feed clutch is energized and the FEED IN PROGRESS flag is set "true". The RIGHT LINE FEED REQUEST flag remains "true" and is reset later upon termination of the right line feed. From block 414, a branch is taken to the exit at block 415. If at decision block 413, the RIGHT LINE FEED REQUEST flag was "false", then block 414 is bypassed directly to the exit at block 415.

Referring again to FIG. 24, after the "right line feed initialize check" routine in block 320, processing proceeds to decision block 321. In block 321, a test is made to determine if the POSITION COUNT is equal to an "end of forward sweep" position, e.g. the turn around point of the helix. As stated above, in this embodiment the "end of forward sweep" position corresponds to a count of 864. Also, since the end of the forward sweep is the time at which the ENABLE PRINTING flag is to be set "true", as described above, decision block 321 may be branched to directly from block 313 if the ENABLE PRINTING flag was previously "false". If at decision block 321 the POSITION COUNT has not yet reached the "end of forward sweep" position, then a branch is taken to the "dot column print" routine in block 318. Alternatively, if the POSITION COUNT is equal to the "end of forward sweep" position, then control transfers to a "direction change" routine at block 322.

Figure 31:
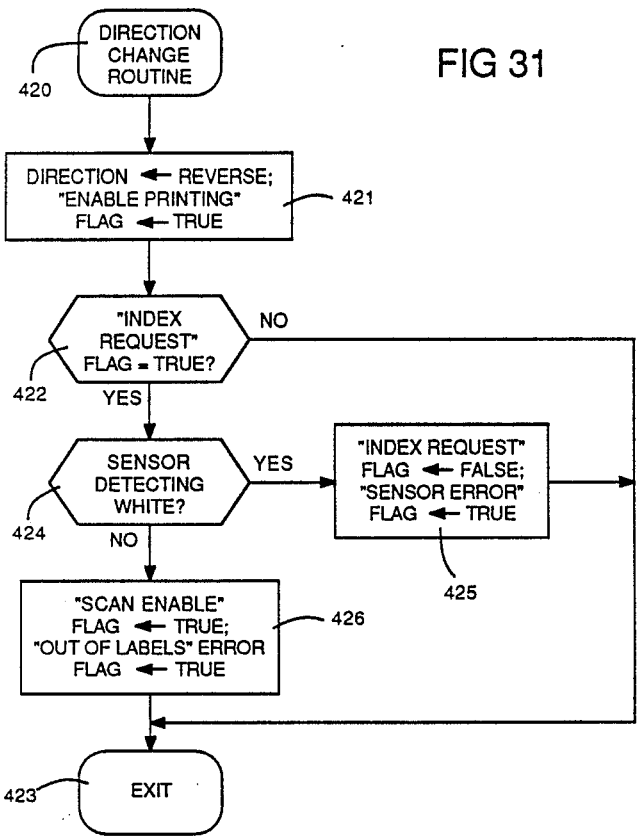
Figure 32:
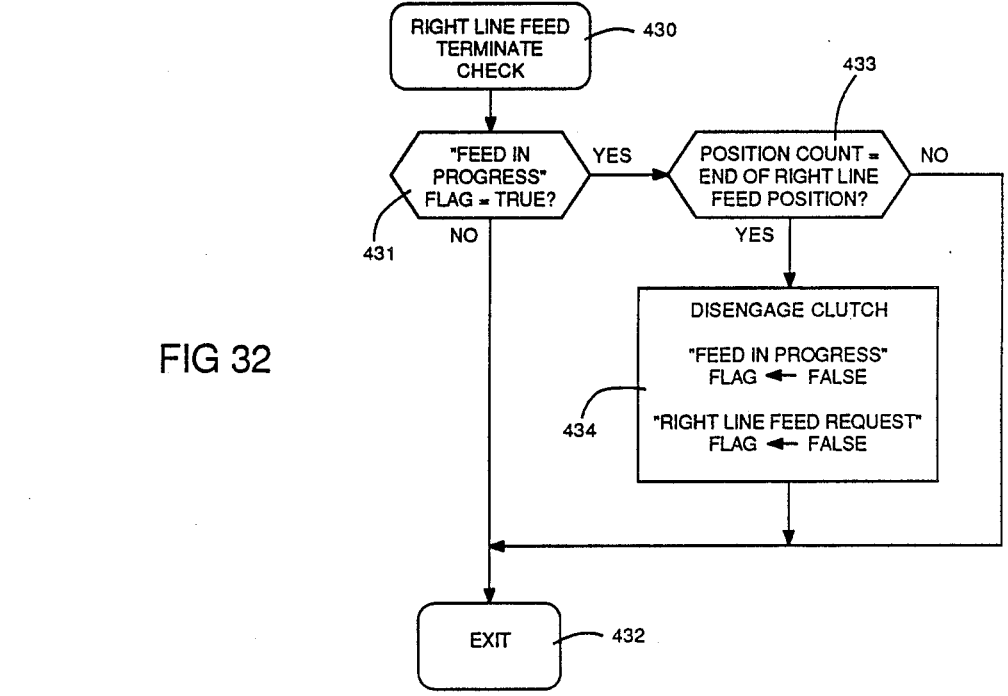
Figure 33:
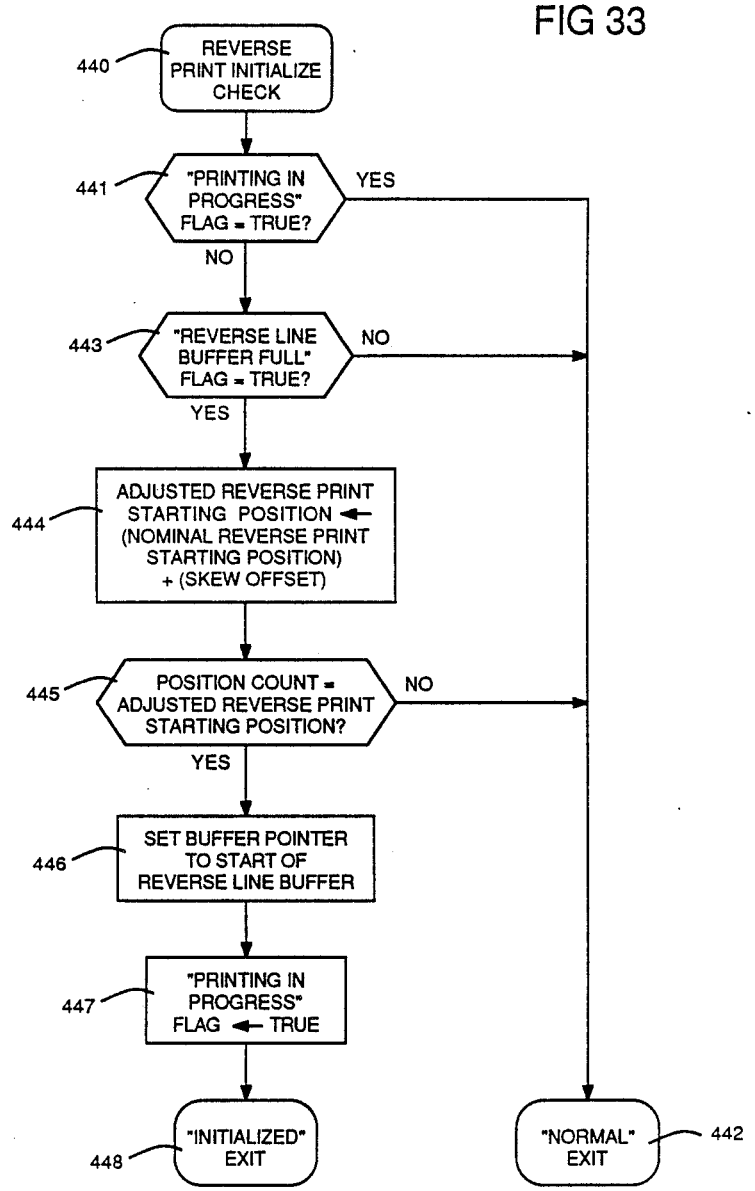
Figure 34:
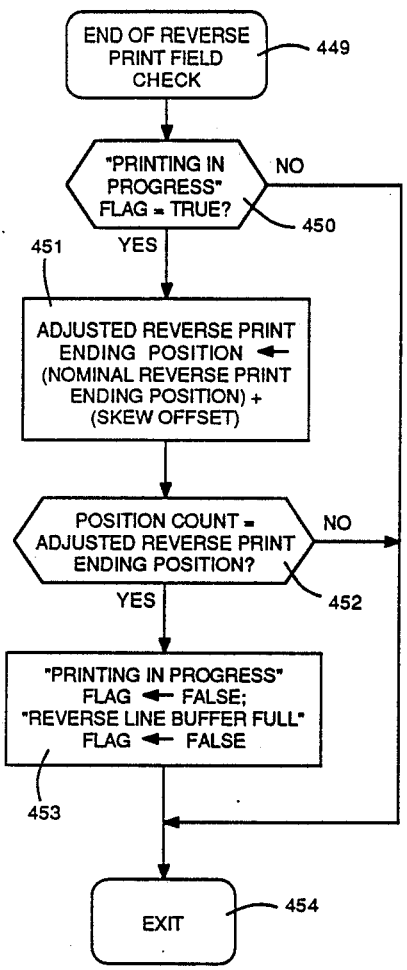
Figure 35:
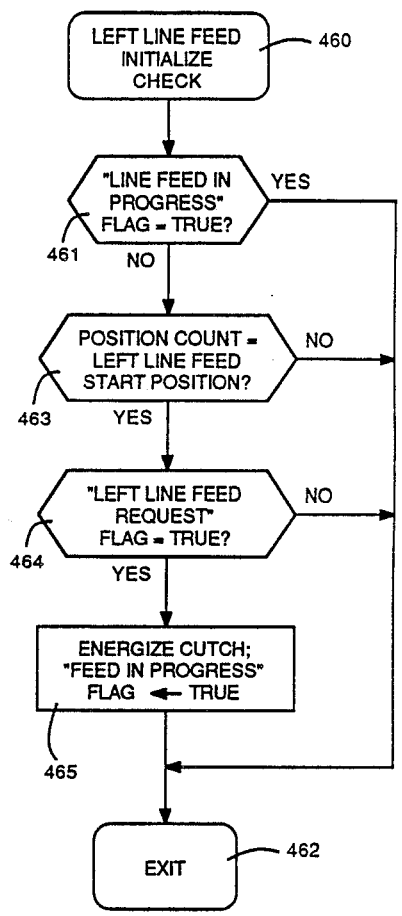
Figure 36:
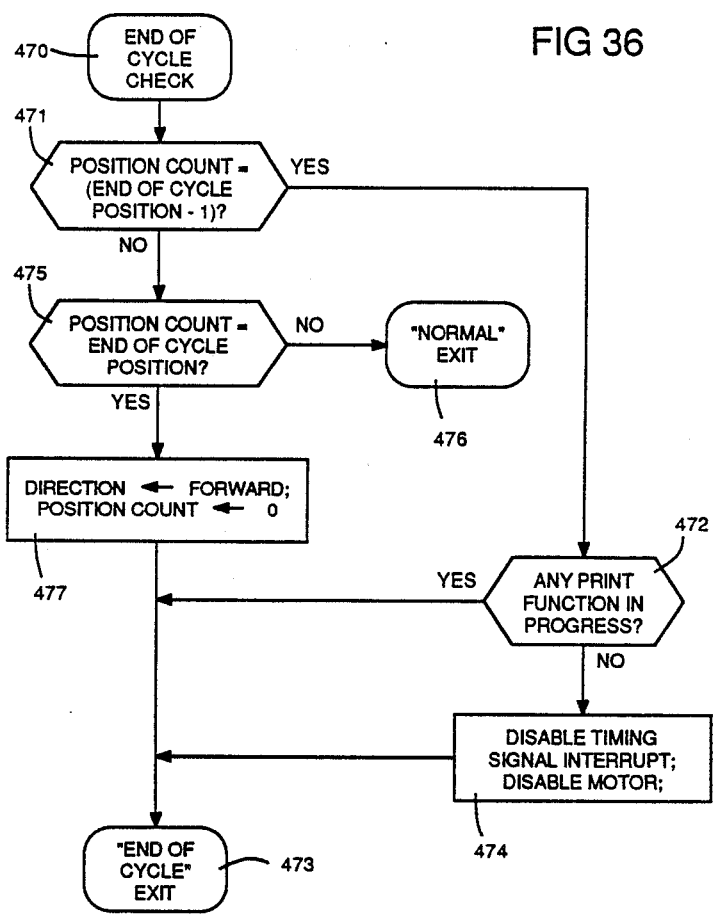

Referring to FIG. 31, the "direction change" routine enters at block 420 and continues at block 421, where the DIRECTION flag is set to "reverse" and the ENABLE PRINTING flag is set "true". Then at decision block 422, the INDEX REQUEST flag is tested. At this point, the movement of the carriage has just changed from a forward sweep to a reverse sweep. If an index has not been requested, then no further processing is required, and a branch is taken directly to the exit at block 423. Otherwise, an index is requested and it is necessary to initialize the scan in the reverse direction. In performing that initialization, another test of the web sensor is also made. If the INDEX REQUEST flag is "true" at decision block 422, a branch is taken to decision block 424 where the web sensor test is performed by checking the sensor output. With the carriage in the extreme right position, the sensor should be detecting the black background of the platen. If the sensor is instead sensing white, then it must be due to a malfunction of the web sensor or other significant obstruction. In that case, a branch is taken to block 425 where the index is terminated by setting the INDEX REQUEST flag "false" and indicating the error by setting the SENSOR ERROR flag "true". From block 425, a branch is taken to the exit at block 423; further initialization of the scan is unnecessary since the scan has just been terminated. Back at decision block 424, if the web sensor is detecting black, as should be the case, a branch is taken to block 426 where the scan is enabled by setting the SCAN ENABLE and OUT OF LABELS ERROR flags "true". These flags operate for the scan in the reverse direction in the same manner as that described above for the forward direction. From block 426, a branch is taken to the exit at block 423.

Referring again to FIG. 24, from the "direction change" routine at block 322, a branch is taken to decision block 323. Decision block 323 is the start of the processing for the reverse direction of carriage travel. As such, block 323 is also entered directly from decision block 314 when the DIRECTION flag is in the "reverse" direction. At decision block 323, a test is made to determine if the SCAN ENABLE flag is "true". If it is, then the "scan" routine is called at block 324. Otherwise, block 324 is bypassed to block 325. The "scan" routine performed in block 324 is the same routine as that performed in the forward direction, and the scan process is described in detail below. At block 325, a "right line feed terminate check" routine is performed. The "right line feed terminate check" routine is shown in detail in FIG. 32 and comprises blocks 430-434 which operate in an analogous manner to the "left line feed terminate check" routine described above in relation to block 316 of FIG. 27. Still referring to FIG. 24, from block 325 processing proceeds to decision block 326 where a "reverse print initialize check" routine is performed. The "reverse print initialize check" routine is shown in detail in FIG. 33 and comprises blocks 440-448, and operates in an analogous manner to the "forward print initialize check" routine described above in relation to block 317 of FIG. 28. It should be noted that the "reverse print initialize check" routine of FIG. 33 also includes a calculation of an "adjusted reverse print starting" position at block 444 in which a "nominal reverse print starting" position is compensated by the SKEW OFFSET value calculated by the "scan" routine for the actual position of the liner, and that "adjusted reverse print starting" position is used to determine the point at which printing in the reverse direction is registered. Therefore, printing in both the forward and reverse direction is compensated for liner skew. As with block 317, decision block 326 includes an "initialized" exit 448 and a "normal" exit 442. Referring again to FIG. 24, the "initialized" exit of block 326 branches to the "dot column print" routine at block 318 for printing of the first dot column in the reverse direction after reverse printing has been initialized. From the "normal" exit from the "reverse print initialize check" routine at block 326, processing proceeds to blocks 327 and 328. Blocks 327 and 328 are an "end of reverse print field check" routine and a "left line feed initialize check" routine, respectively, and are the symmetrical counterparts of the "end of forward print field check" routine and the "right line feed initialize check" described above in relation to blocks 319 and 320 of FIG. 24, respectively. The latter "end of reverse print field check" and "left line feed initialize check" routines are shown in detail in FIGS. 34 and 35 and operate in a manner analogous to that described above for the former "end of forward print field check" and "right line feed initialize check" routines described above in relation to FIGS. 29 and 30, respectively.

Still referring to FIG. 24, from block 328, processing continues at decision block 329 where an "end of cycle check" routine is performed. The "end of cycle check" routine is shown in detail in FIG. 36. Processing begins at block 470 and continues at block 471. In decision block 471, the POSITION COUNT is tested to determine if it is one count prior to the "end of cycle" position. The "end of cycle" position is the maximum count for the cycle, which is equal to 1,728 in this embodiment. Therefore, at block 471, the POSITION COUNT is tested for a value of 1,727. At that position, one count before the end of cycle, a branch is made to decision block 472 where a test is made to determine if any print function is in progress. The print functions include any line feed request flags, any buffer full flags, or an index request flag. If any of these flags are "true", then further cycles of the printer mechanism will be required to complete the requested printer operations, and in that case a branch is taken directly to the "end of cycle" exit at block 473 to allow continued operation of the printer mechanism. If at decision block 472 all the print functions have been completed, then a branch is taken to block 474 where the timing signal interrupt and the motor for the printer mechanism are both disabled. From block 474, the "end of cycle check" routine exits at block 473. Back at decision block 471, if the POSITION COUNT is not at the "end of cycle" position minus one, then a branch is taken to block 475, where a test is made to determine if the POSITION COUNT is equal to the "end of cycle" position, e.g. a count of 1,728 in this embodiment. If the "end of cycle" position has not yet been reached, then a branch is taken to the "normal" exit at block 476. If the POSITION COUNT has reached the "end of cycle" position, then it is time to change from a reverse sweep back to a forward sweep, and a branch is made to block 477. In block 477, the DIRECTION flag is set to "forward" and the POSITION COUNT is set to "zero". Note that a POSITION COUNT of zero is essentially equivalent to a count of 1,728, since the zero count is incremented to one during the following interrupt cycle in the "check for reference established" routine of block 311. After changing back to a forward sweep at block 477, the "end of cycle" exit at block 473 is taken.

Referring again to FIG. 24, the "normal" exit from the "end of cycle check" routine at block 329 branches to the "dot column print" routine at block 318. The "end of cycle" return from the "end of cycle check" routine branches directly to the "return from interrupt" exit at block 312.

The above described progression of the processing in relation to FIG. 24 pertains primarily to the actual printing operations of establishing a reference position and computing an adjusted print field which compensates for skew of the liner. After all of the lines requested to be printed on an identification device have been printed, the print routine (not shown) which controls that printing requests an indexing operation by setting the INDEX REQUEST flag "true" in order to position the assembly of identification devices at the next registration point. The indexing operation is controlled by the "scan" routine, which as described above is called in both the forward and reverse directions by the "timing signal interrupt" routine. The "scan" routine also computes the SKEW OFFSET value used in the printing operations by detecting the position of the leading and trailing edges of the liner, and performs a test to determine if the liner is skewed excessively. The INDEX REQUEST flag is used as a signal to the "timing signal interrupt" routine to "scan" the liner in order to both control the advancement of the liner to the next notch and to check for several possible error conditions concerning the positioning of the liner in the print mechanism. The "scan" routine performs these functions during an indexing operation, in addition to calculating the SKEW OFFSET value for use in the next subsequent printing operation. Before describing the scan process, an overview of the scan procedure is now presented in relation to FIG. 37. During a forward sweep, the web sensor detects a black to white transition at the liner left edge, thereby detecting the liner left edge as the leading edge during the forward sweep. As the forward sweep continues, the liner right edge eventually produces a white to black transition, identified as the forward sweep trailing edge. The carriage then continues to the right, turns around at the end of the helix indicated by the "end of forward sweep" position, and then begins a reverse sweep. During the reverse sweep, the liner right edge produces a black to white transition, thereby identifying the liner right edge as the leading edge in the reverse direction. Continuing in the reverse direction, the web sensor then detects the liner left edge as the trailing edge. This terminology is introduced for clarity and understanding the description below, and it should be understood that "positions" in this embodiment are represented in the microcomputer 100 by their corresponding "position" count.

Figure 37:
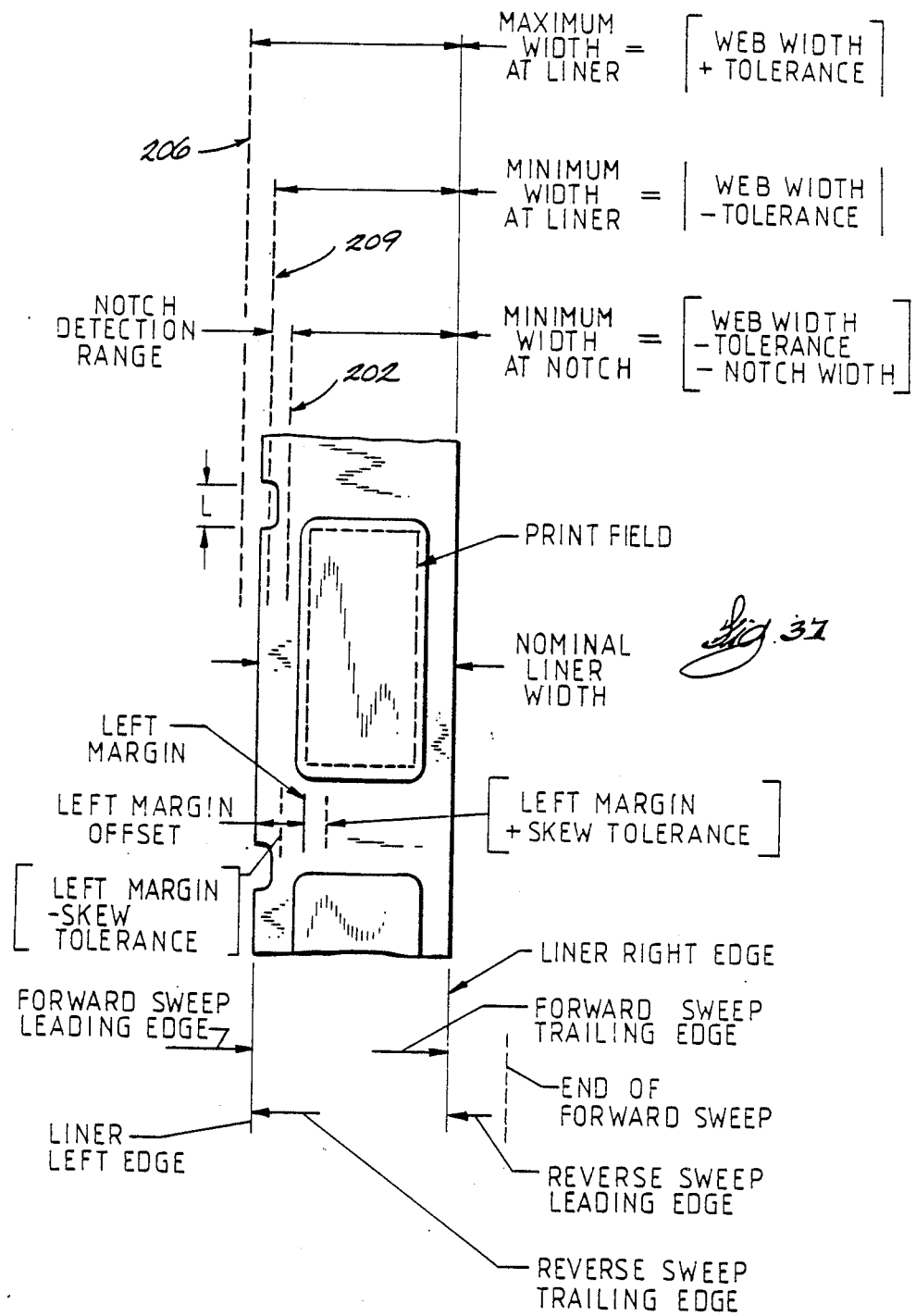
Figure 38:
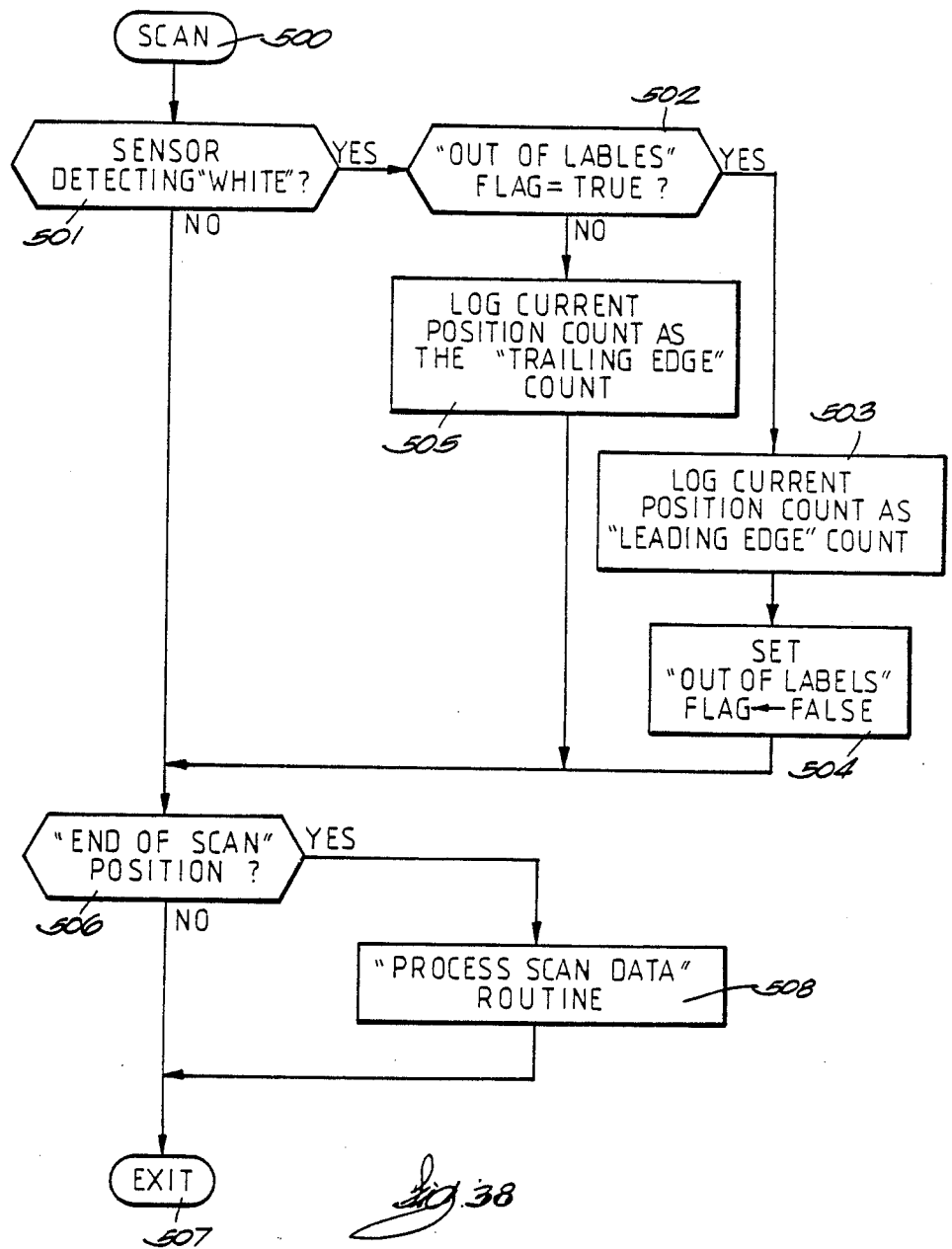

Still referring to FIG. 37, the method for positioning the liner at a notch used in this embodiment is similar to the above described first embodiment in that a notch is located by measuring the width of the liner and comparing the measured width to known widths at a notch and away from a notch. This embodiment also includes the additional feature of computing a SKEW OFFSET value to insure that all printing on the identification device is properly registered within the print field on the identification device. In computing the SKEW OFFSET value, a left margin is defined as the left edge of the print field, and is used as a reference point for determining the skew of the liner in the printer mechanism. The left margin is in turn referenced to the liner right edge, since the liner left edge includes notches which could otherwise adversely affect determination of the left margin position. Therefore, a left margin offset is defined as the distance between the left margin and the extreme left edge of the liner away from a notch. The left margin can therefore be computed by subtracting the left margin offset from the liner right edge. During a scan operation, the "actual left margin" position is computed based on the measured liner right edge position. The "actual left margin" position is compared with a "left margin reference" position, which is a fixed position, or count, on the printer mechanism where the left margin should be, i.e. with no skew of the liner. A skew tolerance is defined as a fixed number of counts by which the measured "actual left margin" position is allowed to deviate from the "left margin reference" position. If the measured "actual left margin" position is farther to the right than the "left margin reference" position plus the skew tolerance, then a SKEWED RIGHT error is indicated. If the measured "actual left margin" position is farther left then the "left margin reference" position minus the skew tolerance, then a SKEWED LEFT error is indicated. As long as the measured "actual left margin" position is less than plus or minus the skew tolerance away from the "left margin reference" position, then a skew error is not indicated. If a skew error is detected, an appropriate error flag is set and no further processing is performed.

If there are no skew errors, the "scan" routine goes on to compute the SKEW OFFSET value as the difference between the "left margin reference" position and the measured "actual left margin" position. The SKEW OFFSET value is then used, as described above, to dynamically adjust the actual count which corresponds to the starting and ending points, or left and right edges, of the print field.

As described above, once the SCAN ENABLE flag has been set, the "scan" routine is called by the "timing signal interrupt" routine at the indicated points in both the forward and reverse directions. A detailed description of the "scan" routine is now presented in relation to FIG. 38. The "scan" routine enters at block 500 and proceeds to block 501 where the web sensor is tested to determine if it is currently detecting "white". The web sensor will normally be detecting "black" while it is "looking" at the black platen on either side of the liner. In this embodiment, the first transition of the web sensor from detecting "black" to "white" is flagged as the leading edge of the liner. Each subsequent position in which a reading of "white" is obtained from the web sensor is flagged as a "trailing edge" position. In other words, a single "leading edge" position is established at the first black to white transition, and the "trailing edge" position is re-established at each position after that "leading edge" position in which the web sensor detects "white". If the web sensor at block 501 is detecting "white", a branch is made to decision block 502 where the OUT OF LABELS ERROR flag is tested. Recall that the OUT OF LABELS ERROR flag is set "true" upon initialization of scan. If the scan is completed without the web sensor ever detecting "white", then the OUT OF LABELS ERROR flag remains "true" to indicate either that the end of roll marker has been detected or that there is no liner in the machine. Looking at it another way, the OUT OF LABELS ERROR flag is also an indication that a "leading edge" position has been detected, which is the purpose of the test in decision block 502. If at decision block 502 the OUT OF LABELS ERROR flag is "true", then this pass through the "scan" routine is the first position at which "white" has been detected by the web sensor, e.g., the leading edge, and a branch is taken to block 503 where the current POSITION COUNT is logged as the "leading edge" count. From block 503 processing continues to block 504 where the OUT OF LABELS ERROR flag is set "false", indicating that at least some portion of the liner has been detected as being "white" (e.g. not an end-of roll marker), and that a "leading edge" position has been detected. Back at decision block 502, if the OUT OF LABELS ERROR flag is "false", then a "leading edge" position had previously been detected, and the "white" reading by the web sensor represents a further position for the "trailing edge" position along the width of the liner. In that case, a branch is taken to block 504 where the current POSITION COUNT is logged as the "trailing edge" count. It should be noted that as long as "white" continues to be detected, the "trailing edge" count will track the POSITION COUNT. When "white" ceases to be detected, e.g., after the trailing edge, then the last position at which "white" was detected will stand as the "trailing edge" count. It should also be noted that this technique for establishing the leading and trailing edge counts is immune to breaks, tears, welds, holes, preprinted indicia, etc. in the liner so that the "noise count" used in the previous embodiment is no longer necessary.

The latter case of pre-printed indicia on the identification devices is discussed in detail below. If one or more positions along the normally "white" liner are detected as "black", the "trailing edge" count remains as the last detected "white" position. Then when "white" is again detected after the "black" portion of the liner, the "trailing edge" count is re-established at that position as if the break had never occurred. The leading and trailing edge counts therefore represent at a true position of the first black-to-white and white-to-black transitions, respectively, detected by the web sensor. From blocks 504 and 505, processing continues at decision block 506. Decision block 506 may also be entered directly from decision block 501 in the case that the web sensor is not currently detecting "white". At decision block 506, the POSITION COUNT is tested to determine if it is equal to an "end of scan" position. There are actually two different "end of scan" position values, one for the forward scan and one for the reverse scan. Both "end of scan" positions are one count before the position at which a line feed is to be requested if it is determined by the scan that the liner is to be advanced. In that way, a line feed can be requested for both the forward and reverse scans, providing maximal rate of advancement of the liner during indexing. The test in block 506 selects the appropriate "end of scan" position by interrogating the DIRECTION flag. If the "end of scan" position has been reached, then a branch is taken to block 508 where a "process scan data" routine is performed. The "process scan data" routine performs a series of calculations and error checks based on the leading and trailing edge counts established during the scan. After executing the "process scan data" routine at block 508 the "scan" routine exists at 507. If at decision block 506, the "end of scan" position has not yet been reached, then the "process scan data" routine is bypassed and a branch is taken directly to exit 507.

Figure 39:
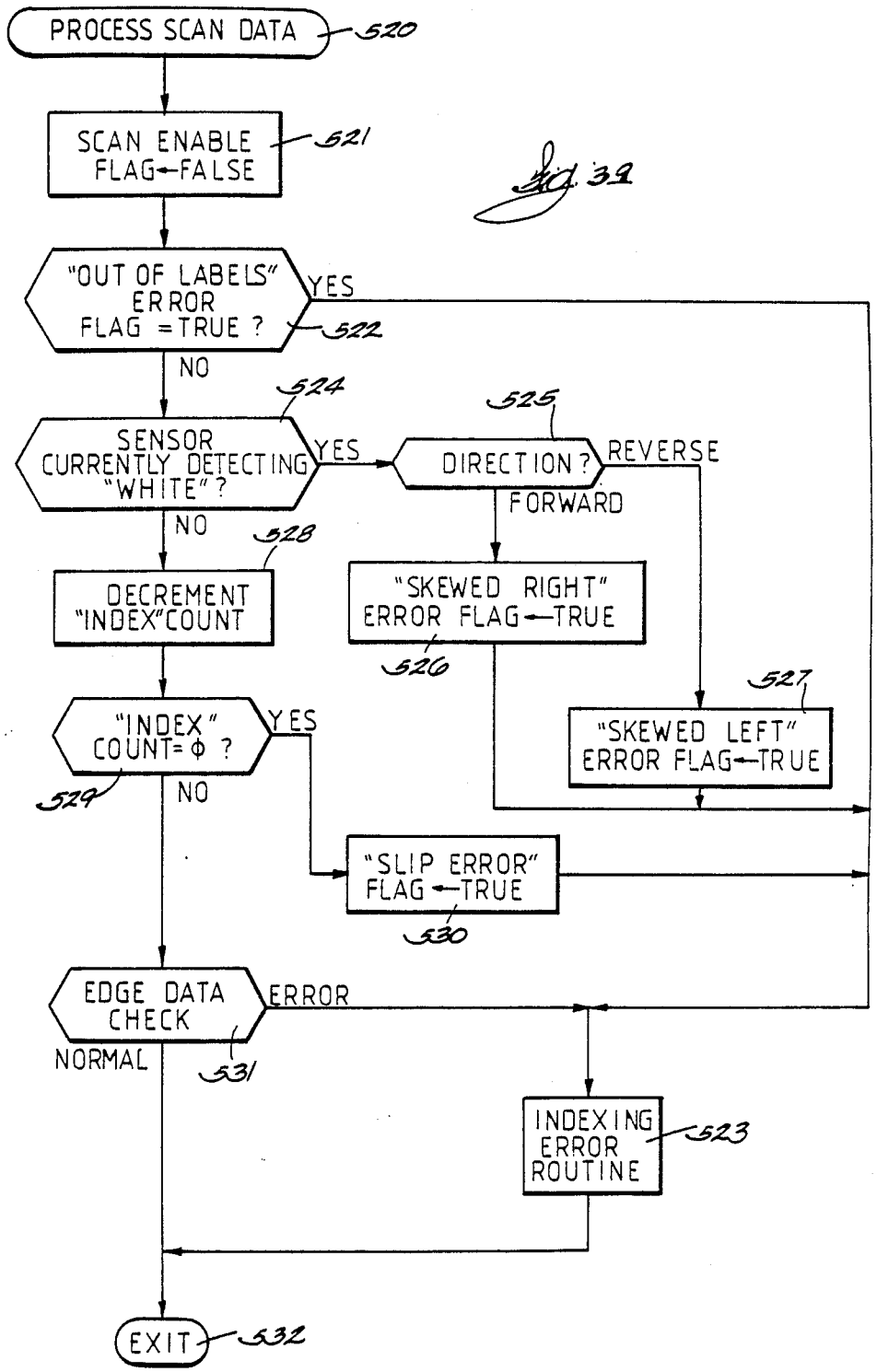
Figure 40:
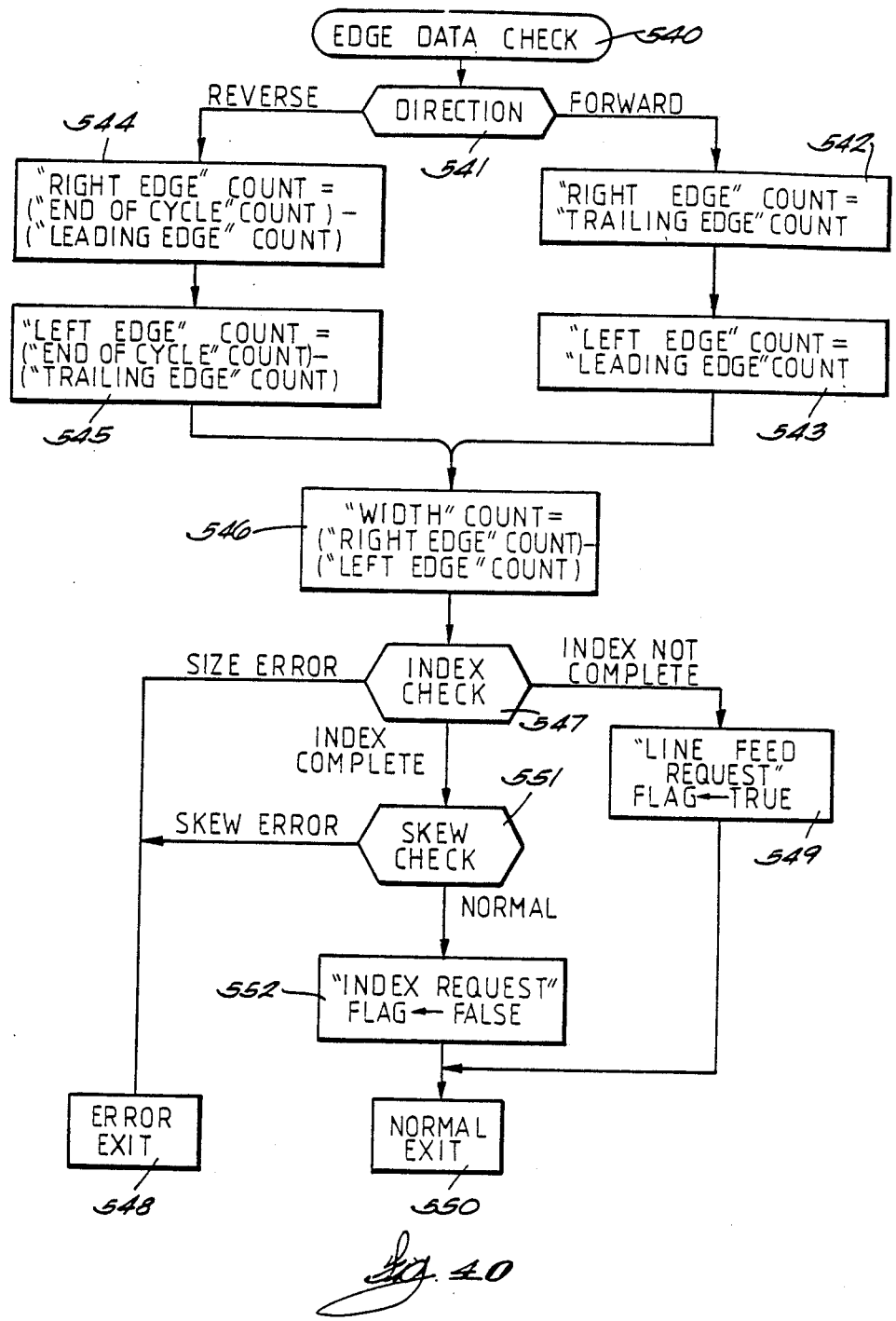
Figure 41:
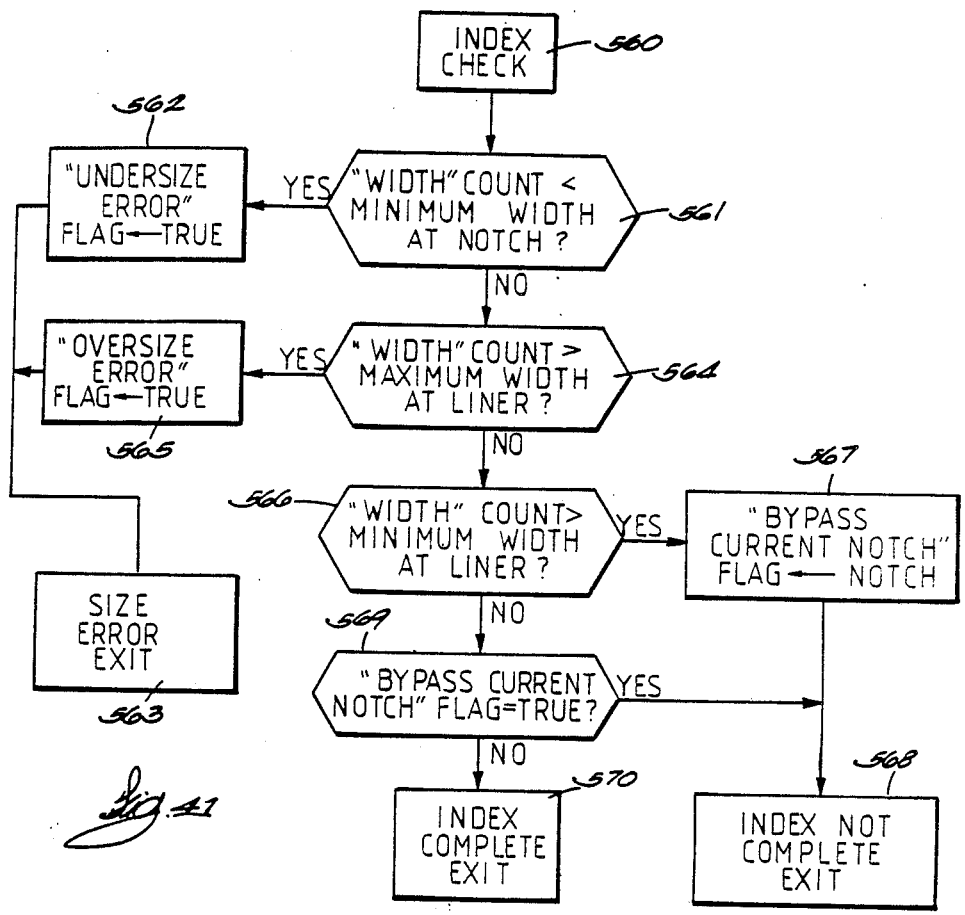

Referring to FIG. 39, the "process scan data" routine enters at block 520 and proceeds to block 521. At block 521 the SCAN ENABLE flag is set "false", indicating the completion of the current scan. From block 521 processing continues at decision block 522 where the OUT OF LABELS ERROR flag is tested. As mentioned above, if the OUT OF LABELS ERROR flag has remained "true" throughout the entire scan, then an "out of labels" error condition exists, and a branch is taken to an "indexing error" routine at block 523. Since the OUT OF LABELS ERROR flag is already set, no other action is necessary; the print routine (not shown) which requested the indexed function can detect the out of labels condition by testing the OUT OF LABELS ERROR flag. If at decision block 522 the OUT OF LABELS ERROR flag is "false", then a leading edge had been detected for the liner, and a branch is taken to decision block 524. At decision block 524 a test is made to determine if the web sensor is currently detecting "white". At this point, e.g. at the end of the scan, if the web sensor is still detecting "white" then it is assumed that the liner has somehow become highly skewed in the printer mechanism. In that case, a branch is taken to decision block 525 where the DIRECTION flag is tested to determine the direction of the skew. If the DIRECTION flag is set to "forward", then a branch is taken to block 526 where a SKEWED RIGHT ERROR flag is set "true". Otherwise, if the DIRECTION flag is set to "reverse", then a SKEWED LEFT ERROR flag is set "true" at block 527. After either blocks 526 or 527, processing transfers to the "indexing error" routine at block 523. Back at decision block 524, if the web sensor is not currently detecting "white", as is normally the case, then control transfers to block 528 where the INDEX count is decremented. The INDEX count is used in this embodiment in a manner similar to that in the above described first embodiment in that a fixed maximum number of line feeds are permitted to reach the next notch. The INDEX count is used as a counter for the number of line feeds performed looking for a notch, and if the maximum number of line feeds permitted is exceeded, then the liner is assumed to be jammed or slipping in the printer mechanism. After decrementing the INDEX count in block 528, processing proceeds to decision block 529 where the INDEX count is tested to determine if it has been decremented down to zero. If it has, then a branch is taken to block 530 where a SLIP ERROR flag is set "true" before branching to the "indexing error" routine at block 523. At decision block 529, if the INDEX count has not yet been decremented to zero, then further line feeds can be performed in seeking the notch, and a branch is taken to decision block 531. In decision block 531, an "edge data check" routine is performed which is described in detail in relation to FIG. 40. In FIG. 40, the "edge data check" routine enters at block 540 and proceeds to decision block 541. At decision block 541 the DIRECTION flag is tested. During a forward sweep, the "leading edge" count represents the left edge of the liner while the "trailing edge" count represents the right edge of the liner. However, in the reverse sweep direction, the "right edge" count and "left edge" count must be computed based on the leading edge and trailing edge counts, respectively, and the known end of cycle count as will be described below. At decision block 541, if the DIRECTION flag is in the "forward" direction, then a branch is taken to block 542 where the "right edge" count is set equal to the "trailing edge" count. Then at block 543 the "left edge" count is set equal to the "leading edge" count. Back at decision block 541, if the DIRECTION flag is set to "reverse" then a branch is taken to block 544 where the "right edge" count is obtained by subtracting the "leading edge" count from the "end of cycle" count. As noted above, the "end of cycle" count used in this embodiment is a count of 1,728 or the turn around point of the helix at the left margin. By subtracting the "leading edge" count from that "end of cycle" count, the right edge count obtained represents the distance, in terms of the number of counts, from the extreme left edge, or turn around point of the helix, to the right edge of the liner. Then at block 545, a "left edge" count is computed in a similar manner by subtracting the "trailing edge" count from the "end of cycle" count. After establishing the "right edge" count and the "left edge" count for either the forward or reverse direction, processing proceeds at block 546 where a "width" count is computed by subtracting the "left edge" count from the "right edge" count. Having thereby computed a "right edge" count, a "left edge" count and a "width" count, processing proceeds from block 546 to decision block 547. At decision block 547, an "index check" routine is performed which is described in detail in relation to FIG. 41. The "index check" routine enters at block 560 and proceeds to decision block 561. At decision block 561, the "width" count is compared with the count corresponding to the minimum width at a notch. If the "width" count is less than the minimum width at a notch, then a branch is taken to block 562 where an UNDERSIZE ERROR flag is set "true". From block 562, a branch is taken to a "size error" exit at block 563. Back at decision block 561, if the "width" count is greater than or equal to the minimum width at a notch, then processing proceeds at decision block 564 where the "width" count is compared to the maximum width away from a notch, termed herein as the maximum width at liner. If the "width" count exceeds that maximum width at liner, then a branch is taken to block 565 where an OVERSIZE ERROR flag is set "true". After setting the OVERSIZE ERROR flag at block 565, a branch is taken to the "size error" exit at block 563. Back at decision block 564, if the "width" count is less than or equal to the maximum width at liner, then a branch is taken to decision block 566 where the "width" count is compared to a minimum width away from a notch, termed herein as the minimum width at liner. If the "width" count is greater than the minimum width at liner, then it is presumed that a notch is not present, and a branch is taken to block 567. At block 567 the BYPASS CURRENT NOTCH flag is set "false", indicating that a full width of the liner has been detected, so that the next notch detected will complete the indexing operation. From block 567 a branch is taken to an "index not complete" exit at block 568. Back at decision block 566, if the "width" count is less than or equal to the minimum width at liner, then it is presumed that a notch has been detected, and a branch is taken to decision block 569. At decision block 569, a notch has been detected and the BYPASS CURRENT NOTCH flag is tested to determine if the currently detected notch should be bypassed or should terminate the indexing operation. If the BYPASS CURRENT NOTCH flag was set "true" by the printing routine (not shown) which requested the indexing operation, then the indexing continues past the currently detected notch, and a branch is taken to the "index not complete" exit at 568. On the other hand, if the BYPASS CURRENT NOTCH flag is "false", either from not having been set "true" initially or from being reset to "false" by a previously detected notch as described above, then detection of the current notch completes the indexing operation and a branch is taken to the "index complete" exit at block 570.

Referring again to FIG. 40, the "size error" exit from the "index check" routine 547 leads to an "error" exit 548 for the "edge data check" routine 540. The "index not complete" exit from decision block 547 branches to block 549, where the appropriate RIGHT LINE FEED REQUEST flag or LEFT LINE FEED REQUEST flag is set "true" in order to advance the liner by one line, continuing the indexing operation. From block 549, a branch is taken to the "normal" exit 550 for the "edge data check" routine. Again back at decision block 547, the "index complete" exit leads to decision block 551 where a "skew check" routine is performed. The "skew check" routine is described in detail in relation to FIG. 42.

Figure 42:
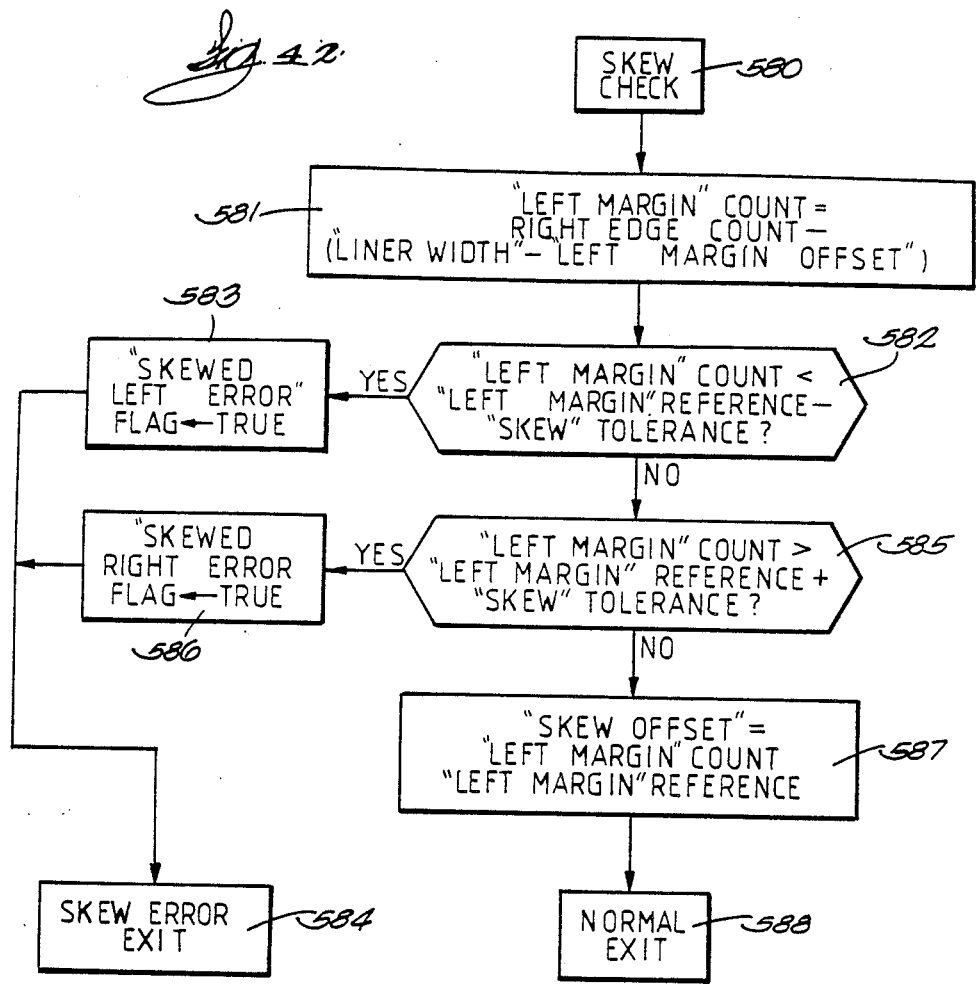

Referring to FIG. 42, the "skew check" routine enters at block 580 and proceeds to block 581. In decision block 581, the "left margin" count is computed. As described above, the left margin count corresponds to the left edge of the print field, and is computed as the "right edge" count minus [liner width minus left margin offset]. From block 581, processing proceeds to decision block 582, where the "left margin" count is compared to the left margin reference minus the skew tolerance, e.g., the left most position permitted for the print field. If the "left margin" count is less than the left margin reference minus the skew tolerance, then a branch is taken to block 583 where a SKEWED LEFT ERROR flag is set "true". From block 583, a branch is taken to a "skew error" exit at block 584. Back at decision block 582, if the "left margin" count is greater than or equal to the left margin reference minus skew tolerance, then a branch is taken to decision block 585, where a similar comparison is made to the right most position permitted for the "left margin" count, which is equal to the left margin reference plus the skew tolerance. If the "left margin" count is greater than the left margin reference plus the skew tolerance, then a branch is taken to block 586 where a SKEWED RIGHT ERROR flag is set "true" before branching to the "skew error" exit at block 584. Back at decision block 585, if the "left margin" count is less than or equal to the left margin reference plus the skew tolerance, then the left margin count is satisfactorily within the skew tolerance range from the left margin reference, and a branch is taken to block 587. At block 587, the SKEW OFFSET value is computed as the "left margin" count minus the left margin reference. As described above, the SKEW OFFSET value is then used to compensate the starting and ending printing positions so that the print field is accurately registered with respect to the identification device as it actually resides in the printing mechanism. From block 587, a branch is taken to the "normal" exit for the "skew check" routine at block 588.

Referring again to FIG. 40, the "skew error" exit from the "skew check" routine at decision block 551 leads to the "error" exit 584 for the "edge data check" routine. The "normal") exit for the "skew check" routine of decision block 551 branches to block 552, where the INDEX REQUEST flag is set "false", indicating completion of the indexing operation. No further line feeds are performed, although if the notch was detected on a forward scan, the motor will continue to run until the reverse scan has been completed, stopping the motor at the left end of the helix as described above. After resetting the INDEX REQUEST flag at block 552, a branch is taken to the "normal" exit at block 550.

Referring again to FIG. 39, the "error" exit from the "edge data check" routine at block 531 branches to the "indexing error" routine at block 523. The "indexing error" routine at block 523 is also entered, as noted above, by any of the other error conditions detected by the "process scan data" routine. The "indexing error" routine is another feature of this embodiment which is described in detail in relation to FIG. 43.

Figure 43:
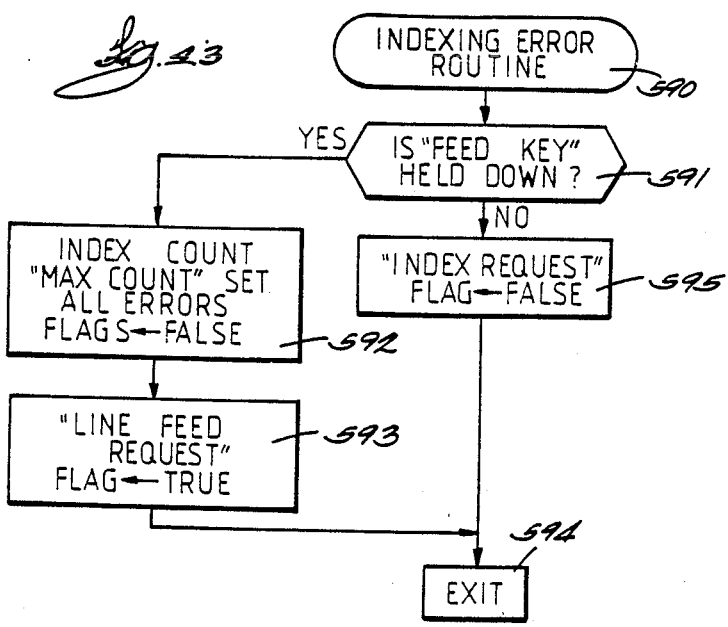

Referring to FIG. 43, the purpose of the "indexing error" routine is to provide the capability to manually override any detected error condition to allow the liner to continue to be initially fed or advanced in the printer mechanism. This feature is particularly useful, for example, when loading an assembly of identification devices in the printer mechanism, where the assembly may not yet be detected or may be initially skewed to the point that would otherwise cause an error. The "indexing error" routine enters at block 590 and proceeds to decision block 591. At decision block 591 a test is made to determine if the feed key on the keyboard is being held down. The feed key provides the manual override to allow continued advancement of the liner, and if it is being held down, then a branch is taken to block 592, where the INDEX count is reset to the maximum count, and all error flags are reset "false". From block 592, control transfers to block 593 where the appropriate line feed request flag, either right or left depending on the DIRECTION flag, is set "true", providing continued advancement of the liner through the printer mechanism. From block 593 a branch is taken to the exit for the "indexing error" routine at block 594. Back at decision block 591, if the feed key is not being held down, then a branch is taken to block 595 where the INDEX REQUEST flag is set "false", thereby terminating the indexing operation due to the detected error condition. The error flags remain set to indicate the cause of the error to the printing routine (not shown) which requested the indexing operation. From block 595, a branch is taken to the exit at block 594. It should be noted that the above described operation provides an override for error conditions only; e.g. it does not override the correct positioning of the liner at a notch when a notch is found. In that way, the feed key provides a convenient means for loading an assembly by holding down the feed key until the assembly has been threaded into the machine and automatically stops at the first notch detected. The machine is then ready to resume printing.

Referring again to FIG. 39, upon completion of the "indexing error" routine at block 523, a branch is taken to the exit for the "edge data check" routine at block 532. Then, referring back to FIG. 38, upon completion of the "process scan data" routine at block 508, a branch is taken to the exit for the "scan" routine at block 507.

A machine according to this second embodiment is capable of printing legends on all the assemblies of identification devices described previously with respect to machine 1 including, for example, the assemblies 5, 91 and 96 illustrated in FIGS. 6, 7 and 8 respectively. In addition however, the unique enhanced software routines described above enable a machine of the second embodiment to print indicia on assemblies that cannot be reliably printed with machine 1.

FIG. 44 illustrates an assembly 605 comprising individual die-cut labels 606 spaced from one another along a liner 7, each label 606 having a layer of pressure sensitive adhesive on its lower surface that is releasably adhered to the liner 7. Each label 606 further includes several preprinted legends 608 including the "CALIBRATION", "BY", "DATE", "DUE" and "INST ID" legends. A print field PF is shown in dotted line in connection with the upper label 606 in FIG. 44 and includes a datum point D at its upper left corner. The problem encountered with preprinted labels is that the sensor, in scanning across the assembly is subject to misinterpreting of the white-to-black and black-to-white transitions of the preprinted matter itself as the edges of the assembly. This problem is exacerbated by heavily lined preprinted matter in black or dark colored ink, such as the "CALIBRATION" legend 608 shown in FIG. 44. As such, machine 1 may, depending on the color and character of the preprinting, inaccurately index to the proper registration point. However, the machine of the second embodiment overcomes this problem by the way in which the leading and trailing edges are detected. As described above, the leading edge is detected as the first black-to-white transition during a scan, and the trailing edge is detected as the last white-to-black transition detected during a scan. Intermediary transitions, such as those caused by preprinted legends, are ignored and the true edge positions are detected. The machine of the second embodiment can therefore print designated indicia along selected portions of the print field PF of each label appropriately registered with the preprinted legends 608. FIG. 45 shows an assembly 605a including an alternate type of preprinted label 606a that also can be used wherein a preprinted legend 610 is printed along an end of a label, on either the right end as shown in full line or along the left end as shown in dashed line. In this case, blank spaces can be padded to the right or left as appropriate to avoid overprinting on the preprinted matter. A print field PF with datum D is illustrated in dashed line with respect to the upper and lower labels in FIG. 45. It should further be noted that the notch 90 need not necessarily correspond to the top of an identification device, but rather is referenced to the start of the print field. With the previously described blank identification devices, e.g. not preprinted, the notch 90 does in fact correspond approximately to the top of the identification device, since that is essentially also the start of the print field. However, in the case of preprinted identification devices, such as labels 606 and 606a, the print field may be anywhere on the identification device, and the notch is referenced to that print field. This can be particularly advantageous, for example as shown in FIG. 44, in that much closer spacing between identification devices on the assembly can be achieved when the preprinted matter is on the top or bottom edges of the identification devices. This closer spacing results in a substantial reduction of "waste" material in forming the assembly.

FIG. 46 illustrates an assembly 620 of identification devices comprising wire markers 621 supported on liner 7. The wire markers are in groups of four arranged in side-by-side relationship along the liner in this example, although there can be at least two or more wire markers in a group. Each wire marker is individually separable from the liner for application to a wire. A wire marker includes a layer of pressure sensitive adhesive along its bottom surface that is releasably adhered to the liner. In an exemplary construction, each wire marker is 0.25" (6.35 mm) wide in the transverse direction of the assembly and 1.25" (31.8 mm) long. The construction can be conveniently made by first forming a series of spaced rectangles of material for the wire markers along the liner that are 1.09" (27.7 mm) wide in the transverse direction by 1.25" (31.8 mm) long, and thereafter die-cutting each rectangle to form a series of parallel longitudinally extending slits that subdivide it into four wire markers. A print field PF having a datum D is established for each group of four wire markers as shown in dashed line with respect to the upper group in FIG. 46. A problem arises in printing very narrow identification devices, particularly the wire markers shown in FIG. 46, due to stringent horizontal spacing tolerance requirements. The assembly is subject to skew in the printer mechanism which can be much greater than the horizontal tolerance that needs to be held for printing the wire markers. Machine 1 according to the first embodiment contains no skew compensation, and so would experience difficulty in printing wire markers. Uncompensated, even a slight amount of skew would cause the printing on a wire marker to runover to an adjacent wire marker, resulting in unacceptable print quality. However, the second embodiment as described above includes skew compensation means in that a skew offset value is computed and used to dynamically adjust the starting and ending positions of the print field. As a result, horizontal registration is assured, even for narrow and wire marker types of identification devices. The machine of the second embodiment is capable of printing indicia on individual wire markers 621 in various formats such as illustrated with the upper three groups of wire markers in FIG. 46.

A notch 90 is formed along an edge of liner 7 in association with each label in the assemblies of FIGS. 44 and 45 and with each group of wire markers in the assembly of FIG. 46. The left edge of the print field and the datum point D in these assemblies are both aligned horizontally at a fixed, predetermined distance from the left edge of the liner 7. Also, the datum point and the leading or top edge of the print field PF are aligned vertically at a fixed, predetermined distance from the upper or leading edge of a notch 90. An end of roll marker 99 (not shown in FIGS. 44–46) is preferably included in assemblies 605, 605a and 620 in the manner described in part (d) above. The manner in which the machine of this second embodiment prints indicia on the labels 606 and wire markers 621 properly registered with respect to a print field is as described above in connection with the routines and diagrams of FIGS. 21–43.

CONCLUSION

There has thus been described two embodiments of electronic apparatus for providing identification devices with imprinted indicia, which apparatus includes a printing mechanism, feed means for advancing as assembly of identification devices, input means for the user to designate indicia to be printed on the devices, memory means storing a program of instructions to control the operation of the apparatus and read the user-designated indicia, and a microprocessor interfaced with the memory means and mechanical elements of the machine. The present invention provides an improved apparatus of this type in which the printing mechanism includes a printhead that is driven transversely back and forth across the width of an assembly of identification devices in the machine and a web edge sensor is attached to the printhead for transverse movement concurrently therewith, and further in which an assembly of identification devices loaded in the apparatus is especially configured to define two different transverse or width dimensions and the programmed instructions respond to signals generated by the web edge sensor upon transverse movement across the assembly to measure the preselected width dimensions and include instructions to control feed of the assembly through the apparatus and the application of printed indicia to individual identification devices of the assembly.

Assemblies of identification devices of the present invention do not have longitudinal edge holes such as are used with a tractor feed system. Instead, the assemblies are driven by feed rollers, and the present invention provides a system for obtaining accurate registration of individual identification devices vis-a-vis the printhead in a web drive system of the feed roller type, which is inherently subject to imprecise web advancement. The identification devices can be labels, wire markers, sleeves, tags, and the like, in any selected shape. In the illustrative assemblies of identification devices described above, notches 90 are shown as the means for defining two different width dimensions of the assemblies. Alternate constructions will be apparent to those skilled in the art, for example, the notches can be formed on a side of an assembly other than as illustrated above, be formed on both sides of an assembly and alternate with one another, or the notches can be formed on both sides of the assembly in transverse alignment with each other; it is also possible to replace the notches with tabs that project from one or more sides of an assembly.

The end of roll marker in the assemblies described above is a particularly useful feature in that it is used to halt printing as previously described, but also serves to prevent damage to the printhead and prevent overprinting of an identification device that has already been printed, typically the identification device preceding the end of roll marker.

A retro-reflective optical sensor is now considered to be a most useful type of web edge sensor to be employed with the present invention as it is fully capable of meeting the objectives of this invention, although it is expected that other web edge sensors can be used. The optical sensor has capabilities that enable further enhancements, if so desired, such as reading a bar code applied at the leading end of an assembly of identification devices that will contain suitable information with respect to size, etc., which the sensor can detect and generate signals that, with appropriate programmed instructions, can be used to automatically set operating parameters for the apparatus. Also, the sensor is capable of verifying a proceeding printed line or part of a printed line.

Still other changes can be made in the exemplary embodiments that are within the scope of the present invention. A dot matrix printhead has been described but other printheads suitable for microprocessor control can be employed, such as a daisy wheel or ink jet printer. Also, an LED display may be used instead of LCD display described above. Changes to these and other elements of the invention as described above are intended to be encompassed within the scope of the appended claims.

I claim:

1. In apparatus for providing identification devices with imprinted indicia of the type including (1) a printing mechanism, (2) feed means for advancing an assembly of a plurality of individual identification devices through the printing mechanism, (3) input means for designating indicia to be printed on individual identification devices, (4) memory means for storing a program of instructions for reading the designated indicia, controlling the feed means and controlling the printing mechanism, and (5) microprocessor means responsive to the program of instructions in the memory means and interfaced to control the printing mechanism and the feed means, the improvement wherein:
(1) the printing mechanism includes a printhead driven transversely back and forth across an assembly of identification devices loaded in the apparatus;
(2) a web edge sensor is attached to the printhead for concurrent transverse movement therewith, and the web edge sensor produces a signal connected to the microprocessor for indicating the presence or absence of the assembly under the current position of the web edge sensor;
(3) a continuous assembly of identification devices loaded in the apparatus for advancement by the feed means has a first longitudinal edge and a second longitudinal edge in which the first and second longitudinal edges define a preselected first width dimension over selected first longitudinal portions of the assembly and a preselected second width dimension over selected second longitudinal portions of the assembly, each second longitudinal portion is associated with one identification device of the assembly, and each second width dimension is different than the first width dimension; and (4) the program of instructions stored in the memory means includes a first set of instructions responsive to the signal generated by the web edge sensor upon transverse movement across the assembly of identification devices for (a) measuring first and second longitudinal edge positions corresponding, respectively, to the first and second longitudinal edges of the assembly, (b) computing a current width dimension of the assembly along the path of transverse movement of the web edge sensor based on the difference between the first and second longitudinal edge positions, and (c) controlling the feed means for advancing the assembly to a position where one of the identification devices is in registration for printing by detecting the position at which the calculated current width dimension of the assembly is within a preselected tolerance of the second width dimension, and a second set of instructions for (d) computing a skew offset value based on the difference between a predetermined reference position and one of the measured longitudinal edge positions, and (e) utilizing the skew offset value to adjust the horizontal position at which printing is performed on the identification device so that the printing on the identification device is registered with respect to at least one longitudinal edge of the assembly.

2. The apparatus of claim 1 in which the first set of microprocessor instructions performs a scan of the assembly comprising a single pass over the assembly to determine one of the longitudinal edge positions as the first position during the scan in which the web edge sensor indicates the presence of the assembly, and the other longitudinal edge position as the last position during the scan in which the web sensor indicates the presence of the assembly, thereby ignoring any change in web sensor reading while positioned over the assembly in the measurement of the longitudinal edge positions.

3. The apparatus as recited in claim 1 in which the printing mechanism further includes (a) timing means for producing a timing signal in which a pulse occurs on the timing signal for each incremental movement of the electric motor, and (b) sensing means for detecting the presence of the printhead near a predetermined reference position, the sensing means producing a margin signal when the printhead is detected as being near said approximate predetermined position; and in which the program of instructions stored in the memory means includes a third set of instructions for maintaining a current printhead position value by (a) initiating the current printhead position value to a predetermined position value upon a first activation of the margin signal, (b) updating the current printhead position value based on the incremental movement associated with the occurrence of each pulse on the timing signal, and (c) upon second and subsequent activations of the margin signal, the current printhead position continues to be updated solely based on the timing signal pulses and without regard to the second and subsequent activations of the margin signal, wherein the current printhead position value is used in measuring the longitudinal edge positions and in establishing the adjusted horizontal print position.

4. An assembly of identification devices for use in apparatus according to any one of claims 1, 2 or 3 wherein:

the assembly comprises a carrier web and a plurality of adhesive labels releasably adhered to the carrier web and spaced from one another longitudinally along the carrier web; and each label includes preprinted indicia on a portion thereof, and the imprinted indicia are to be applied to another portion thereof.

5. An assembly of identification devices for use in apparatus according to any one of claims 1, 2 or 3 wherein:

the assembly comprises a carrier web and a plurality of wire markers releasably adhered to the carrier web;

the assembly includes a first width dimension defined by opposed longitudinal edges of the carrier web and the means defining a preselected second width dimension consists of a notch defined in the carrier web, and the second width dimension is less than the first width dimension of the assembly; and the wire markers are arranged in groups comprising at least two wire markers in side-by-side relation, the groups are spaced from one another along the carrier web, and there is one notch associated with each said group of wire markers.

* * * * *

UNITED STATES PATENT AND TRADEMARK OFFICE
CERTIFICATE OF CORRECTION

PATENT NO.   : 4,920,882
DATED        : May 1, 1990
INVENTOR(S)  : Steven D. Hoyt It is certified that error appears in the above-identified patent and that said Letters Patent is hereby corrected as shown below:

Col. 6, line 44, "carriers" should be --carries--.
Col. 6, line 62, after "gear 46"., insert the following sentence --The gear train is also illustrated in Fig. 5."
Col. 7, line 17, "ratched" should be --ratchet".
Col. 21, line 25, "PF;" should be --PF$_1$--.
Col. 21, line 62, "PF1" should be --PF$_1$--.
Col. 23, line 35, after "web", insert --7--.
Col. 24, line 38, change "if" to --is--.
Col. 31, line 23, change "form" to --from--.
Col. 33, line 33, delete "the", second occurrence.
Col. 42, line 32, delete ")".

Signed and Sealed this

Twenty-third Day of April, 1991

*Attest:*

HARRY F. MANBECK, JR.

*Attesting Officer*  *Commissioner of Patents and Trademarks*